US 8,857,067 B2

(12) United States Patent
Moreno

(10) Patent No.: US 8,857,067 B2
(45) Date of Patent: Oct. 14, 2014

(54) SAW ASSEMBLY WITH FLOATING BEARING FOR WORM DRIVE AND MOTOR SHAFT

(75) Inventor: Jaime Moreno, Arlington Heights, IL (US)

(73) Assignee: Robert Bosch GmbH, Stuttgart (DE)

( * ) Notice: Subject to any disclaimer, the term of this patent is extended or adjusted under 35 U.S.C. 154(b) by 433 days.

(21) Appl. No.: 13/250,917

(22) Filed: Sep. 30, 2011

(65) Prior Publication Data
US 2013/0081841 A1 Apr. 4, 2013

(51) Int. Cl.
| B25F 5/00 | (2006.01) |
| B27B 9/00 | (2006.01) |
| B23D 47/12 | (2006.01) |
| B25F 5/02 | (2006.01) |
| B23Q 5/027 | (2006.01) |
| B23Q 9/00 | (2006.01) |

(52) U.S. Cl.
CPC ............... *B23D 47/12* (2013.01); *B25F 5/021* (2013.01); *B23Q 5/027* (2013.01); *B23Q 9/0028* (2013.01)
USPC ............................................. 30/388; 30/392

(58) Field of Classification Search
USPC ................... 30/388, 390, 391, 392, 393, 394; 74/724; 173/216
See application file for complete search history.

(56) References Cited

U.S. PATENT DOCUMENTS

| 1,775,692 | A | * | 9/1930 | Plut | 30/394 |
| 1,803,068 | A | * | 4/1931 | McKeage | 30/390 |
| 2,337,769 | A | * | 12/1943 | Redenbo | 30/394 |
| 2,348,612 | A | * | 5/1944 | Deacon | 30/382 |
| 2,623,283 | A | * | 12/1952 | Godfrey | 30/216 |
| 3,123,109 | A | * | 3/1964 | Bork | 30/388 |
| 3,216,278 | A | * | 11/1965 | Plume | 74/625 |
| 3,785,053 | A | * | 1/1974 | Michaelson | 30/394 |
| 4,876,797 | A | * | 10/1989 | Zapata | 30/388 |
| 5,930,903 | A | * | 8/1999 | Hurn et al. | 30/391 |
| 2008/0172892 | A1 | * | 7/2008 | Henrickson | 30/392 |
| 2009/0223337 | A1 | | 9/2009 | Wikle et al. | |
| 2009/0313831 | A1 | * | 12/2009 | Patel | 30/123 |
| 2013/0081841 | A1 | * | 4/2013 | Moreno | 173/216 |

FOREIGN PATENT DOCUMENTS

GB 749974 6/1956

OTHER PUBLICATIONS

Robert Bosch Tool Corporation, Bosch 1810PS 4.5 inch Paddle Switch Grinder, available at least as early as Sep. 29, 2011 (1 page).
Clarke, Crocodile Circular Saw Kit, Model #CT5000, available at least as early as Sep. 29, 2011 (1 page).

(Continued)

Primary Examiner — Hwei C Payer
(74) Attorney, Agent, or Firm — Maginot, Moore & Beck

(57) ABSTRACT

A saw assembly includes a housing, a motor, a worm gear, and a drive member. The housing defines an interior space. The motor is positioned in the housing and has a motor shaft, the motor being configured to rotate the motor shaft about a first axis. The worm gear is positioned in the housing and has a worm gear shaft. Rotation of the motor shaft causes rotation of the worm gear shaft. The drive member is operatively coupled to the worm gear. Rotation of the worm gear shaft causes movement of the drive member in a repeating pattern. The worm gear shaft includes a bore structure defining a blind bore and an opening leading to the blind bore. The bore structure defines a set of internal threads that are spaced apart from the opening. The motor shaft includes a set of external threads.

19 Claims, 51 Drawing Sheets

(56) References Cited

OTHER PUBLICATIONS

Craftsman, 10872 3 inch Mini Circular Saw, available at least as early as Sep. 29, 2011 (1 page).
Dewalt, DW802G 4.5 inch Paddle Switch Grinder, available at least as early as Sep. 29, 2011 (1 page).
Exakt, DC270 Deep Cut Saw, available at least as early as Sep. 29, 2011 (1 page).
Exakt, Mini Circular Saw with Five Blades and Tru-Cut Angle Guide, available at least as early as Sep. 29, 2011 (1 page).
Makita, GA4534 4.5 inch Paddle Switch Angle Grinder, available at least as early as Sep. 29, 2011 (1 page).
Rockwell, RK3440K Versacut 3.375 inch Corded Circular Saw, available at least as early as Sep. 29, 2011 (1 page).
Great Britain Search Report in corresponding GB application (i.e., GB 1217133.6) mailed Jan. 25, 2013 (3 pages).

* cited by examiner

SAW ASSEMBLY WITH FLOATING BEARING FOR WORM DRIVE AND MOTOR SHAFT

FIELD

This patent relates generally to power tools and particularly to power circular saws.

BACKGROUND

Power saws are a type of cutting tool, which are useful for quickly and easily cutting material, such as construction lumber and other building products. A common type of power saw is a portable circular saw, which includes an electric motor, a circular saw blade coupled to the electric motor, and a foot plate through which a portion of the circular saw blade extends. Typically, a user prepares for cutting a workpiece with a circular saw by resting the foot plate on the workpiece, aligning the saw blade with a desired cut path. Then the user energizes the electric motor and manually guides the rotating circular saw blade in the direction of the cut path, often following a marked line on the workpiece.

The drive train of a typical circular saw includes a motor shaft of the electric motor and a geared transmission assembly. A gear member of the transmission assembly is typically press fit onto the motor shaft. After being press fit onto the gear member the gear member rotates with the motor shaft to transfer torque from the electric motor to the transmission assembly and then to the circular saw blade. However, the gear member is generally not removable from the motor shaft should the circular saw require servicing.

Therefore, it is desirable to provide a circular saw drive train that effectively transfers torque from the electric motor to the circular saw blade and that is serviceable should the circular saw experience a fault.

SUMMARY

According to one embodiment of the disclosure a saw assembly includes a housing, a motor, a worm gear, and a drive member. The housing defines an interior space. The motor is positioned in the housing and has a motor shaft, the motor being configured to rotate the motor shaft about a first axis. The worm gear is positioned in the housing and has a worm gear shaft. Rotation of the motor shaft causes rotation of the worm gear shaft. The drive member is operatively coupled to the worm gear. Rotation of the worm gear shaft causes movement of the drive member in a repeating pattern. The worm gear shaft includes a bore structure defining a blind bore and an opening leading to the blind bore. The bore structure defines a set of internal threads that are spaced apart from the opening. The motor shaft includes a set of external threads. The set of external threads are located within the blind bore and meshingly engaged with the set of internal threads so as to couple the worm gear shaft to the motor shaft.

According to another embodiment of the disclosure, a saw assembly includes a housing, a motor, a worm gear, and a drive member. The housing defines an interior space. The motor is positioned in the housing and has a motor shaft. The motor is configured to rotate the motor shaft about an axis. The worm gear is positioned in the housing and has a worm gear shaft. Rotation of the motor shaft causes rotation of the worm gear shaft. The drive member is operatively coupled to the worm gear. Rotation of the worm gear shaft causes movement of the drive member in a repeating pattern. One of the worm gear shaft and the motor shaft includes a bore structure defining a bore and an opening leading to the bore. The bore structure defines a set of internal threads that are spaced apart from the opening. The other of the worm gear shaft and the motor shaft includes a set of external threads. The set of external threads are located within the bore and meshingly engaged with the set of internal threads so as to couple the worm gear shaft to the motor shaft.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
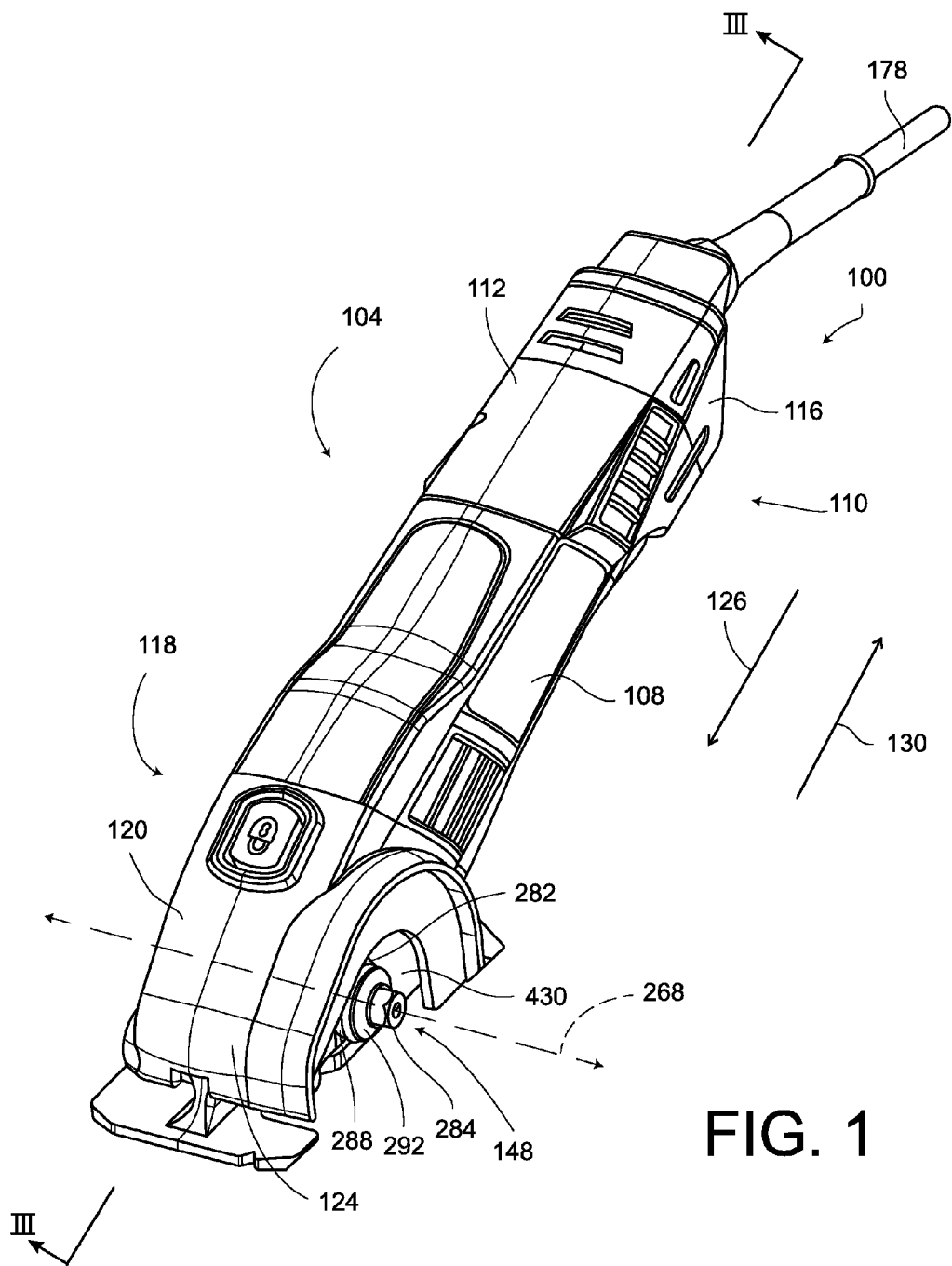
FIG. 1 shows a perspective view of a first side of a saw assembly as described herein.

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

Figure 2:
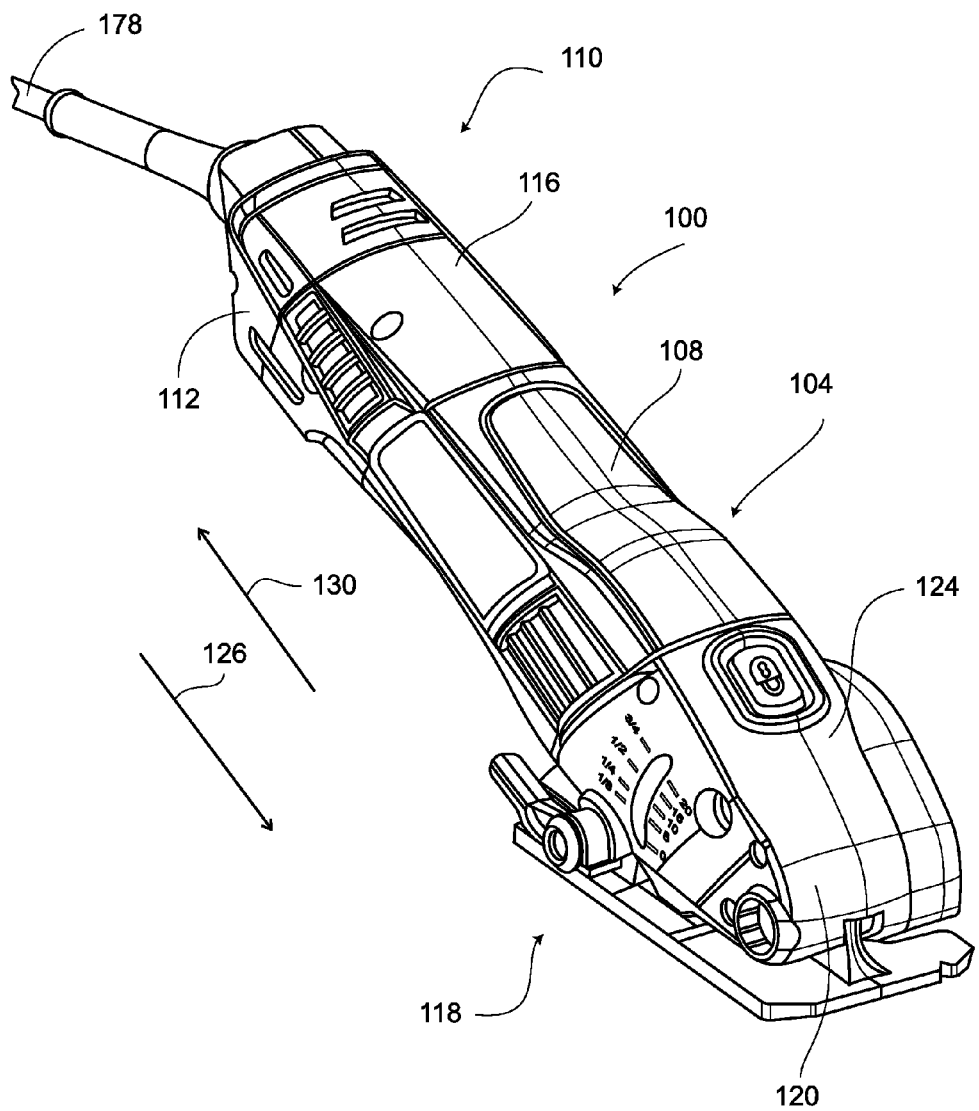
FIG. 2 shows a perspective view of an opposite side of the saw assembly of FIG. 1.

As shown in FIGS. 1 and 2, a saw assembly 100 includes a housing 104. The housing 104 includes a sleeve 108, a rearward housing portion 110 having an upper left shell 112 and an upper right shell 116, and a forward housing portion 118 having a lower left shell 120 and a lower right shell 124. The upper left shell 112 and the upper right shell 116 are connected to a rearward side of the sleeve 108, and the lower left shell 120 and the lower right shell 124 are connected to a forward side of the sleeve. Movement from the rearward housing portion 110 to the forward housing portion 118 is defined herein to be in the forward direction 126. While movement from the forward housing portion 118 to the rearward housing portion 110 is defined herein to be in the rearward direction 130. The housing 104 is formed from injection molded thermoplastic and defines an interior space 128 (FIG. 3) within the housing.

Drivetrain

Figure 3:
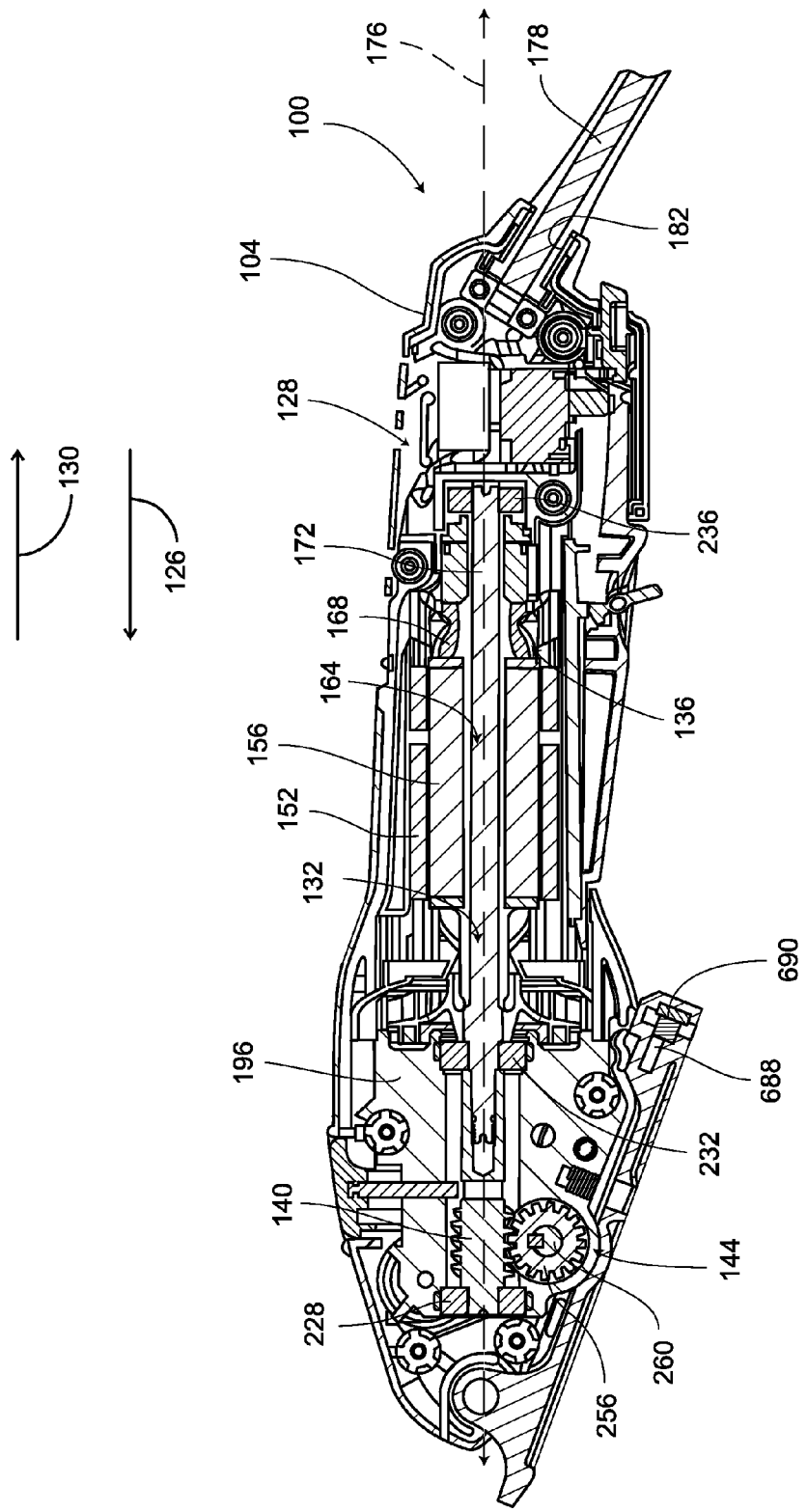
FIG. 3 shows a cross sectional view taken along the line III-III of FIG. 1.

As shown in FIG. 3, a drivetrain 132 is at least partially positioned within the interior space 128 defined by the housing 104. The drivetrain 132 includes an electric motor 136, a worm gear 140, a drive member 144, and an arbor assembly 148 (FIG. 1). The electric motor 136 is at least partially positioned within the interior space 128 and includes a stator 152 and a rotor 156. The stator 152 is fixedly connected to the sleeve 108 of the housing 104 within the internal space 128. The stator 152 generates a magnetic field within a rotor space 164.

The rotor 156 includes a winding portion 168 and a motor shaft 172. The winding portion 168 is fixedly connected to the motor shaft 172 and is positioned at least partially within the rotor space 164. The motor shaft 172 is a generally cylindrical metal shaft, which extends from the rotor space 164 and is supported for rotation relative to the stator 152 and the housing 104 about a motor axis 176. The rotor 156 and the motor shaft 172 rotate relative to the stator 152 and the housing 104 when the electric motor 136 is supplied with electrical energy.

With reference to FIG. 3, the motor 136 is supplied with electrical energy through an electrical cord 178 extending through a rear housing opening 182. It is noted that the forward direction 126 may also be defined herein as the path of movement from the electrical cord 178 toward the drive member 144

Figure 4:
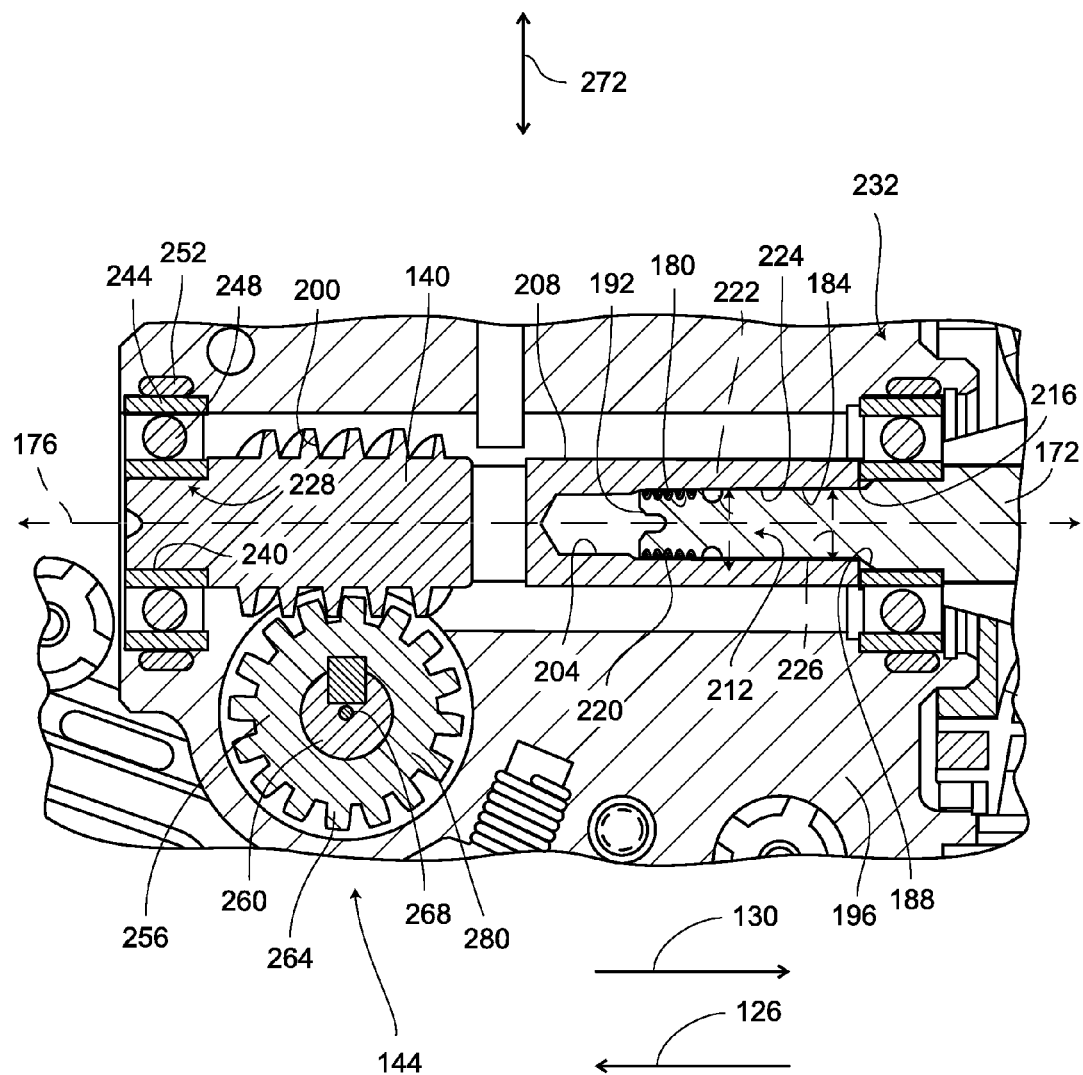
FIG. 4 shows a portion of the cross sectional view of FIG. 3.

As shown in FIG. 4, the motor shaft 172 includes a set of external threads 180 and a smooth shaft portion 184 and defines a shoulder 188. The external threads 180 are located on an end portion 192 of the motor shaft 172. The smooth shaft portion 184 is located between the external threads 180 and the shoulder 188. The smooth shaft portion 184 is a cylindrical portion of the motor shaft 172.

The worm gear 140 is positioned in the internal space 128 of the housing 104 and, in particular, is positioned within a metal gear housing 196 (FIG. 3). The worm gear 140 includes a set of worm gear teeth 200, a bore structure 204, and a worm gear shaft 208. The bore structure 204 defines a blind bore 212 and an opening 216, which leads to the blind bore. The bore structure 204 includes a set of internal threads 220 and a smooth bore portion 224. The internal threads 220 are positioned within the blind bore 212 at a position that is spaced apart from the opening 216. The internal threads 220 are configured to meshingly engage with the external threads 180 of the motor shaft 172 to connect the worm gear 140 to the motor shaft 172. The smooth bore portion 224 is positioned within the blind bore 212 between the internal threads 220 and the opening 216.

With reference to FIG. 4, the worm gear shaft 208 is coupled to the motor shaft 172, such that rotation of the motor shaft causes rotation of the worm gear 140 about the motor axis 176. In particular, the external threads 180 are located within the blind bore 212, such that the external threads are meshingly engaged with the internal threads 220 to connect the worm gear 140 to the motor shaft 172. As the external threads 180 are meshingly engaged with the internal threads 220, the opening 216 is moved closer to the shoulder 188. When the worm gear shaft 208 is coupled to the motor shaft 172, the opening 216 is positioned adjacent to the shoulder 188.

The smooth bore portion 224 of the bore structure 204 interacts with the smooth shaft portion 184 of the motor shaft 172 to accurately align the worm gear 140 with the motor shaft 172. To this end, the smooth shaft portion 184 defines an outside diameter 222 and the smooth bore portion defines an inside diameter 226. The outside diameter 222 and the inside diameter 226 are substantially equal (the outside diameter is slightly smaller than the inside diameter to allow entry of the motor shaft 172 into the bore 224), such that the smooth shaft portion 184 fills the smooth bore portion 224 causing the worm gear 140 to become aligned with the motor shaft 172.

As shown in FIG. 3, the motor shaft 172 and the worm gear 140 are supported by a floating bearing 228, a floating bearing 232, and a floating bearing 236. The floating bearing 236 supports a right end portion of the motor shaft 172, the floating bearing 232 supports a left end portion of the motor shaft, and the floating bearing 228 supports a left end portion of the worm gear 140.

As shown in FIG. 4, the floating bearing 228 includes an inner race 240, an outer race 244, numerous ball bearings 248, and an elastomeric support member 252. The inner race 240 is fixedly connected to the worm gear 140 for rotation with the worm gear. The ball bearings 248 are positioned between the inner race 240 and the outer race 244. The outer race 244 is received by the elastomeric support member 252. The elastomeric support member 252 is received by the gear housing 196. The inner race 240 is configured to rotate relative to the outer race 244 and the elastomeric support member 252 in response to rotation of the worm gear 140. The floating bearing 232 and the floating bearing 236 are substantially identical, except that the inner races of the floating bearings 232, 236 are fixedly connected to the motor shaft 172 and the elastomeric support of the floating bearing 236 is received by the housing 104.

The floating bearing 228 is referred to as "floating" since the elastomeric support member 252 enables movement of the inner race 240 and the outer race 244 relative to the gear housing 196 and the housing 104. Accordingly, the floating bearings 228, 232, 236 are suited to dampen vibrations of the motor shaft 172 and the worm gear 140, which occur due to machine tolerances and other factors, which cause the motor shaft and the worm gear to be slightly unbalanced. The floating bearings 228, 232, 236 dampen these vibrations so that the saw assembly 100 is comfortable to hold during cutting operations.

With reference to FIG. 4, the drive member 144 of the drivetrain 132 is operably coupled to the worm gear 140 and includes a pinion gear 256 and a driveshaft 260 both of which are at least partially positioned within the gear housing 196. The pinion gear 256 includes a set of gear teeth 264 positioned to meshingly engage the worm gear teeth 200. The driveshaft 260 is fixedly connected to the pinion gear 256, such that rotation of the worm gear 140 results in movement of the driveshaft in a repeating pattern. Specifically, when the electric motor 136 is energized, rotation of the motor shaft 172 and the worm gear 140 results in rotation of the driveshaft 260 about an axis of rotation 268 (see FIG. 1, extends into and out of the page in FIG. 4), which is perpendicular to the motor axis 176 of the motor shaft 172. The axis of rotation 268 and the motor axis 176 are not coincident. The motor axis 176 is perpendicular to a motor axis plane 272 and the axis of rotation 268 of the driveshaft 260 and the pinion gear 256 is perpendicular to a driveshaft plane 278 (not shown, parallel to a face 280 of the pinion gear 256). The motor axis plane 272 is perpendicular to the driveshaft plane 278. A portion of the driveshaft 260 extends through an opening 282 (FIG. 1) in the lower right shell 124 of the forward housing portion 118.

Figure 5:
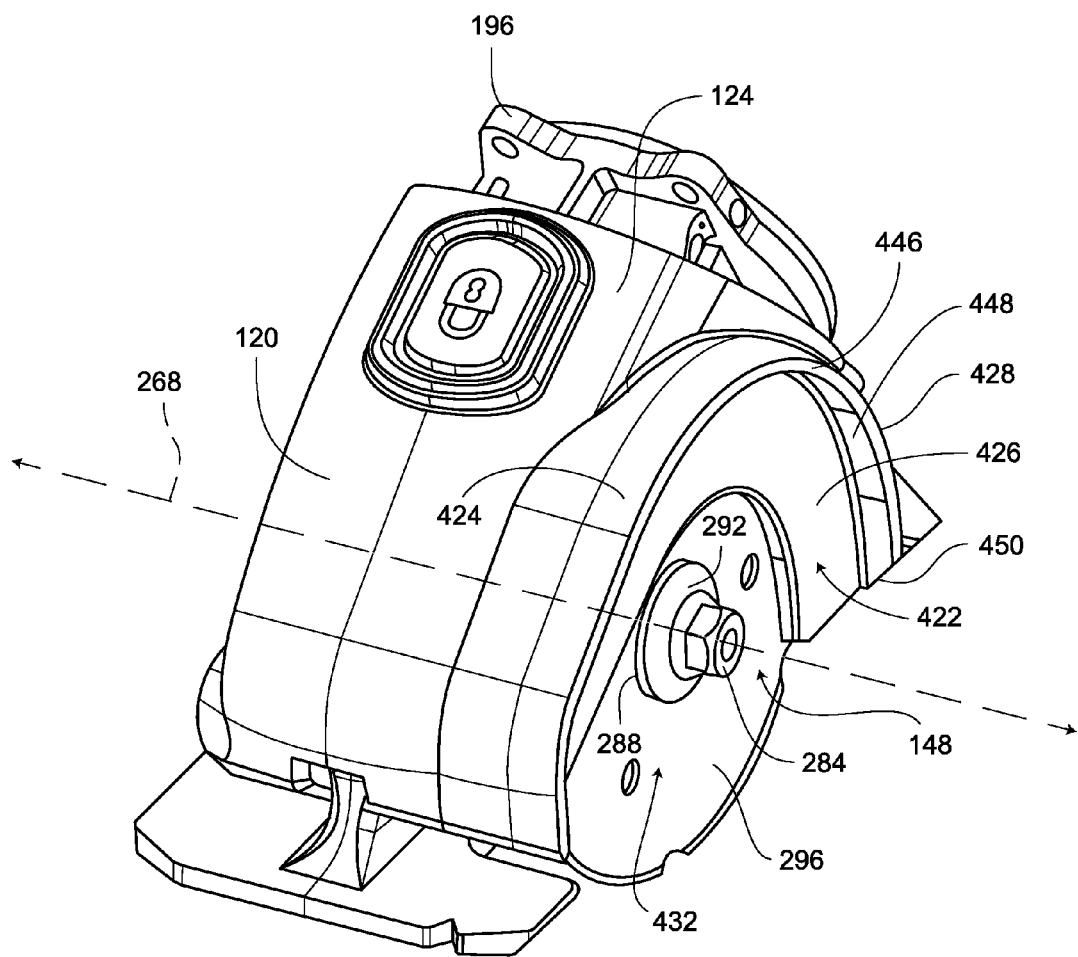
FIG. 5 is a front perspective view of a portion of the saw assembly of FIG. 1, showing a guard structure and a flat cutting wheel.
Figure 6:
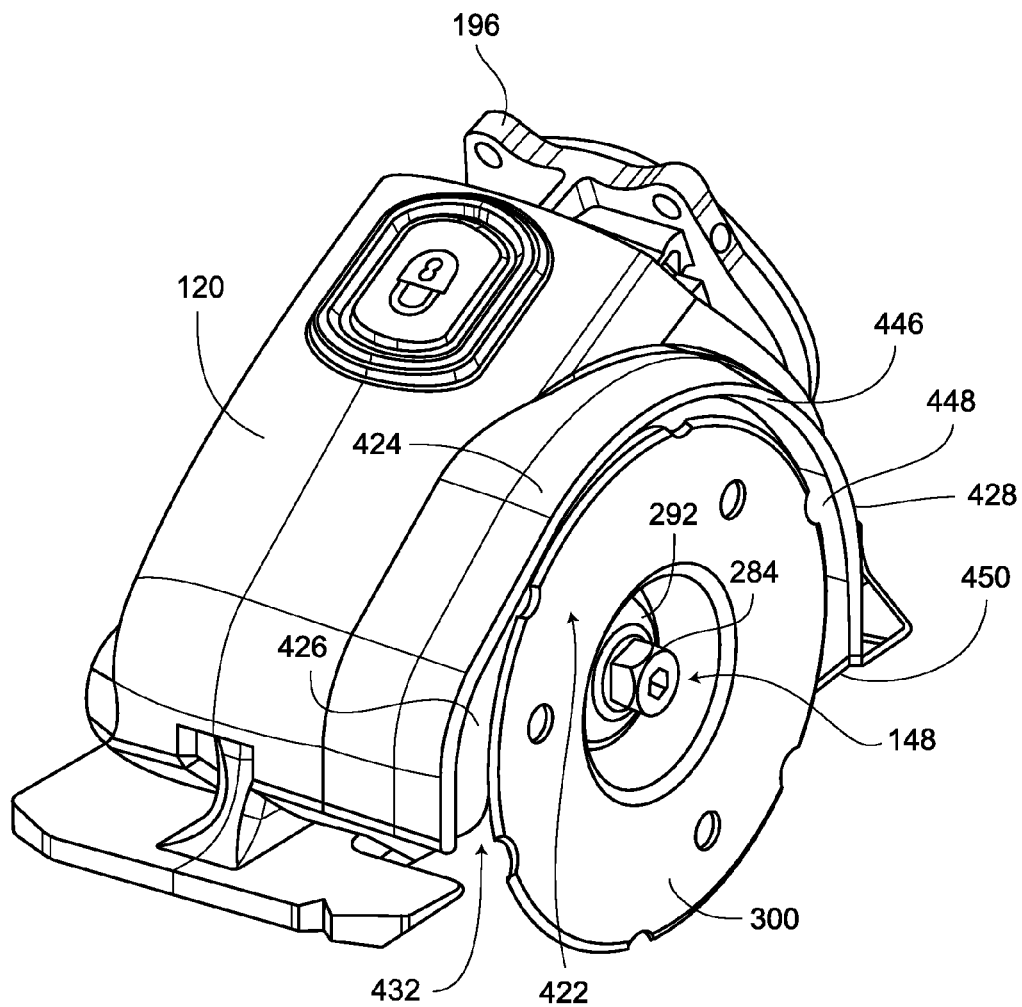
FIG. 6 is a front perspective view of a portion of the saw assembly of FIG. 1, showing the guard structure and a flush cutting wheel.

As shown in FIG. 5, the arbor assembly 148 includes an arbor bolt 284, a spacer 288 (also shown in FIG. 19), and a washer 292. The arbor bolt 284 extends through an opening (not shown) of the spacer 288, an opening (not shown) of the washer 292, and is threadingly received by a threaded opening (not shown) of the driveshaft 260. The arbor assembly 148 connects a flat cutting wheel 296 to the saw assembly 100 for rotation with the driveshaft 260. As shown in FIG. 6, the arbor assembly 148 connects a flush cutting wheel 300 to the saw assembly 100 for rotation with the driveshaft 260.

Figure 7:
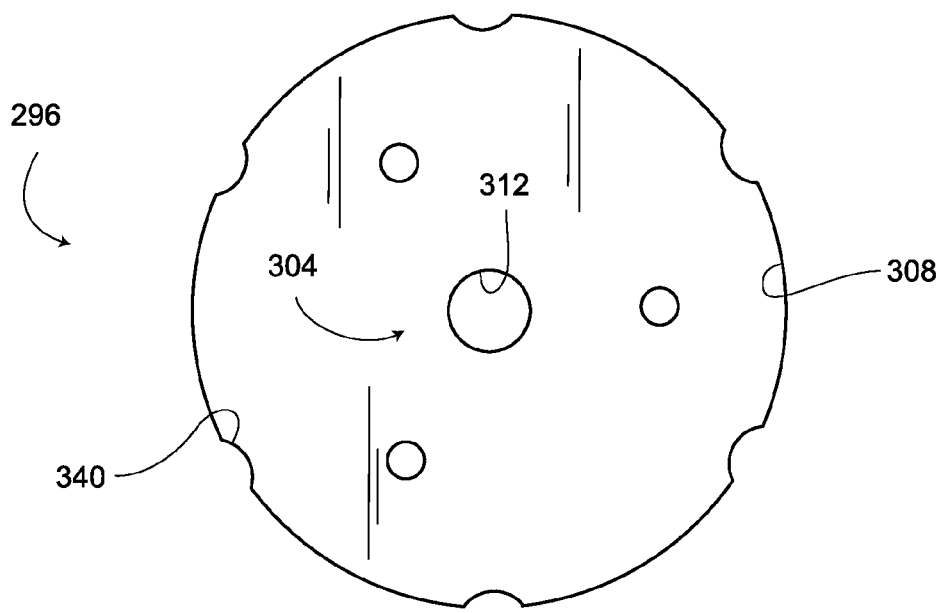
FIG. 7 shows a front elevational view of the flat cutting wheel for use with the saw assembly of FIG. 1.
Figure 8:
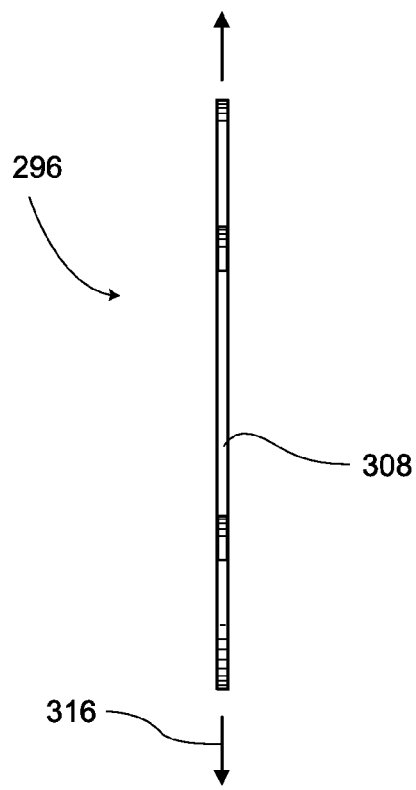
FIG. 8 shows a side elevational view of the flat cutting wheel of FIG. 7.

As shown in FIGS. 7 and 8, the flat cutting wheel 296, which is also referred to herein as a flat cutoff wheel or a flat saw member, is generally circular and includes a flat hub portion 304 and a cutting structure 308. The hub portion 304 defines an opening 312 in the center of the cutting wheel 296 through which the arbor bolt 284 extends when the cutting wheel is mounted to the driveshaft 260. The cutting structure 308 is positioned on the periphery of the cutting wheel 296. As shown in FIG. 8, a plane 316 extends through the hub portion 304 and the cutting structure 308. The cutting structure 308 is abrasive and is at least partially formed form carbide.

Figure 9:
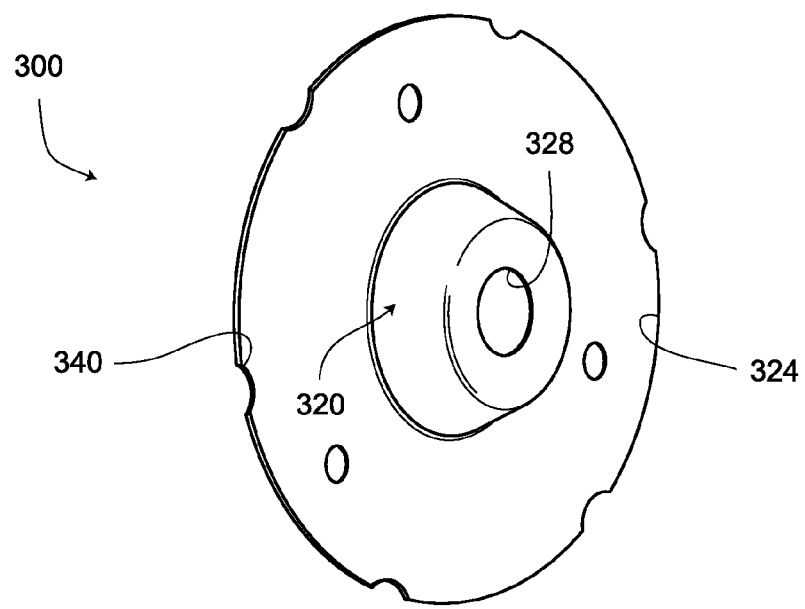
FIG. 9 shows a front perspective view of the flush cutting wheel for use with the saw assembly of FIG. 1.
Figure 10:
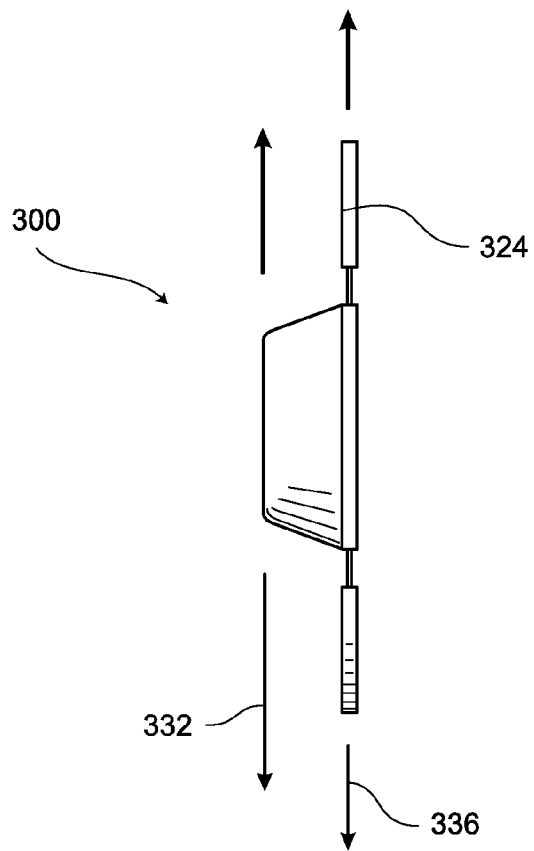
FIG. 10 shows a side elevational view of the flush cutting wheel of FIG. 9.

As shown in FIGS. 9 and 10, the flush cutting wheel 300 is generally circular and includes a domed hub portion 320 and a cutting structure 324. The domed hub portion 320 defines an opening 328 in the center of the cutting wheel 300 through which the arbor bolt 284 extends when the cutting wheel is mounted to the driveshaft 260. The cutting structure 324 is positioned on the periphery of the cutting wheel 300. A hub plane 332 extends through the hub portion 320, and a cutting plane 336 extends through the cutting structure 324. The hub plane 332 is parallel to the cutting plane 336 and is offset from the cutting plane, such that the cutting plane extends further from the arbor assembly 148 than does the plane 316 of the flat cutting wheel 296 when the cutting wheel 300 is mounted on the driveshaft 260.

The cutting structure 308 of the cutting wheel 296 and the cutting structure 324 of the cutting wheel 300 each include numerous scallops 340. The scallops 340 assist in removing debris from a kerf formed in a workpiece during cutting operations.

The cutting structure 308 and the cutting structure 324 differentiate the cutting wheel 296 and the cutting wheel 300 from traditional saw blades (not shown) that include cutting teeth. Accordingly, when one of the cutting wheels 296, 300 is connected to the saw assembly 100, the saw assembly may be referred to as a grinder or a circular saw. When a traditional saw blade is connected to the saw assembly 100, the saw assembly may be referred to as a circular saw.

Lockout Power Switch

Figure 11:
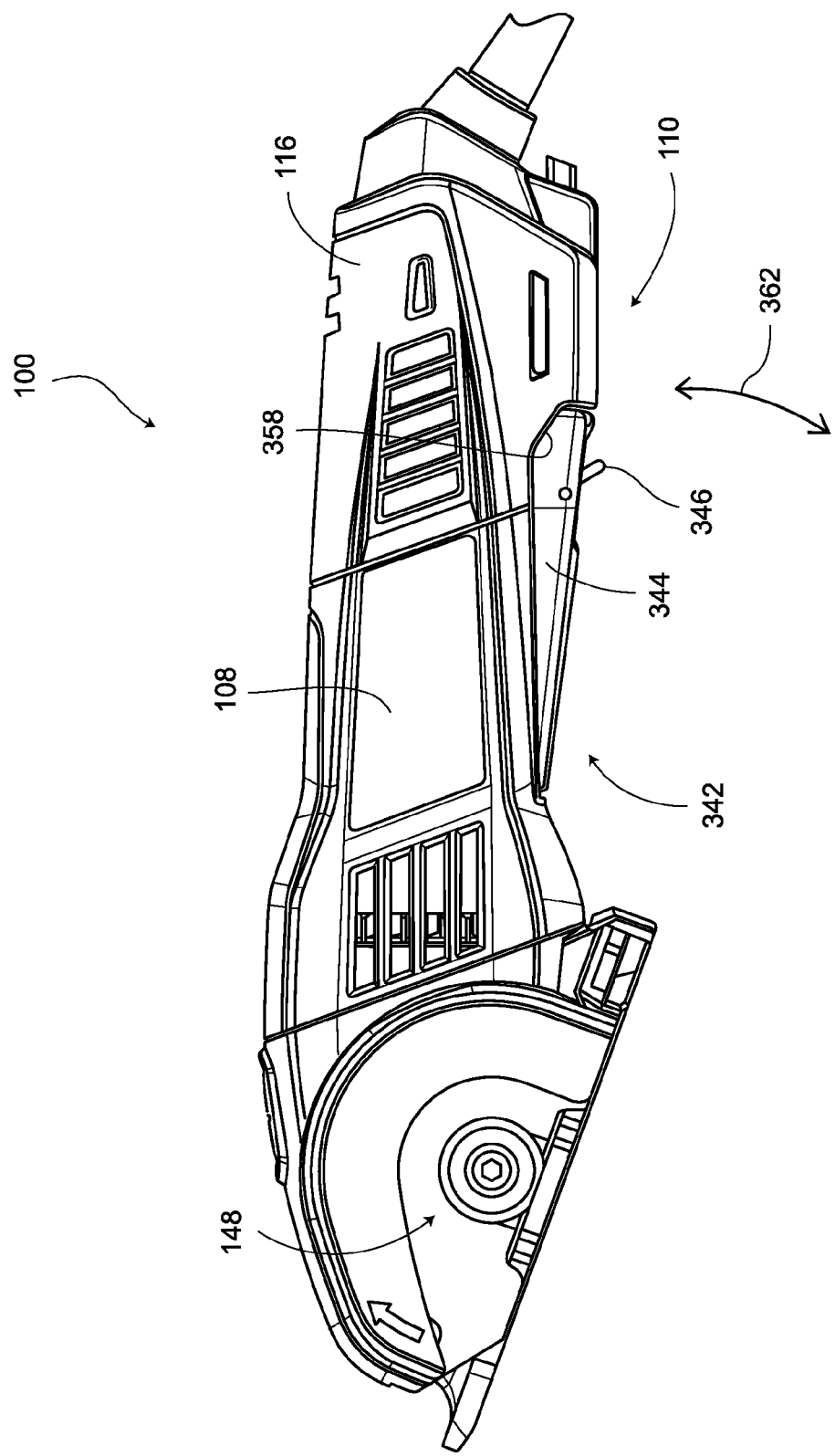
FIG. 11 is a side elevational view of the saw assembly of FIG. 1 showing a lockout power switch.
Figure 12:
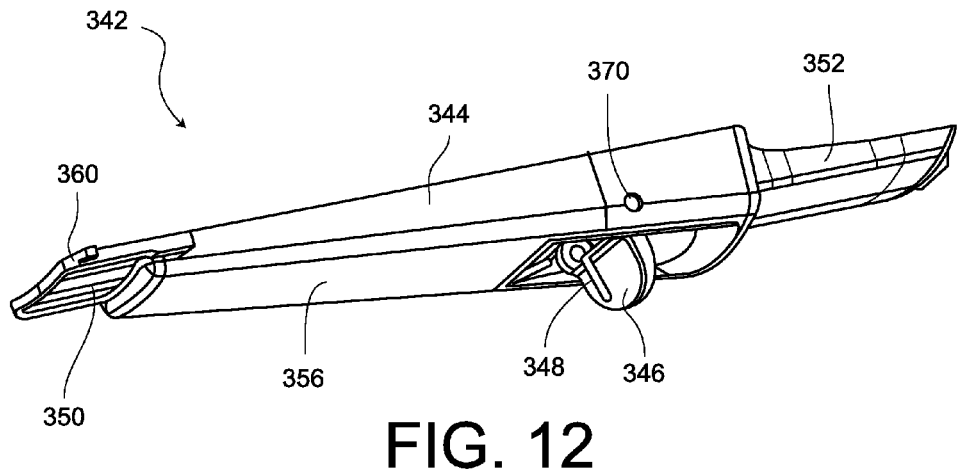
FIG. 12 is a perspective view of a portion of the lockout power switch of FIG. 11.
Figure 13:
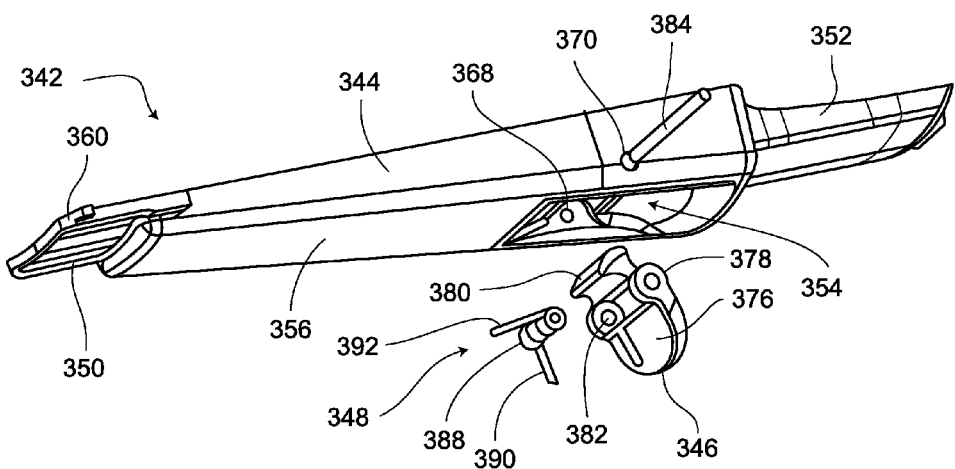
FIG. 13 is an exploded perspective view of a portion of the lockout power switch of FIG. 11.

As in FIGS. 11, 12, and 13, the saw assembly 100 includes a power lever 342 for operating a switch unit 394 (FIG. 14) that couples electrical energy to the electric motor 136. The power lever 342 includes a trigger referred to herein as a paddle 344, a lockout lever 346, and a spring 348 (FIGS. 12 and 13).

The paddle 344 includes a pivot structure 350 and an abutment structure 352 and defines a paddle cavity 354 and a contact surface 356. The pivot structure 350 is positioned on an end portion of the paddle 344 and includes a barb 360. The barb 360 of the pivot structure 350 is positioned within the interior space 128 defined by the housing 104. Specifically, when the barb 360 is inserted into the housing 104 it interlocks with the housing to prevent the paddle 344 from being removed from the housing.

The paddle 344 pivots about the pivot structure 350 between an off position (also referred to herein as the de-energized position) (FIG. 14) and an on position (also referred to herein as the energized position) (FIG. 15) about a path of movement 362. As shown in FIG. 11, the paddle 344 at least partially extends through a housing opening 358 formed in both the sleeve 108 and the rearward housing portion 110.

Figure 14:
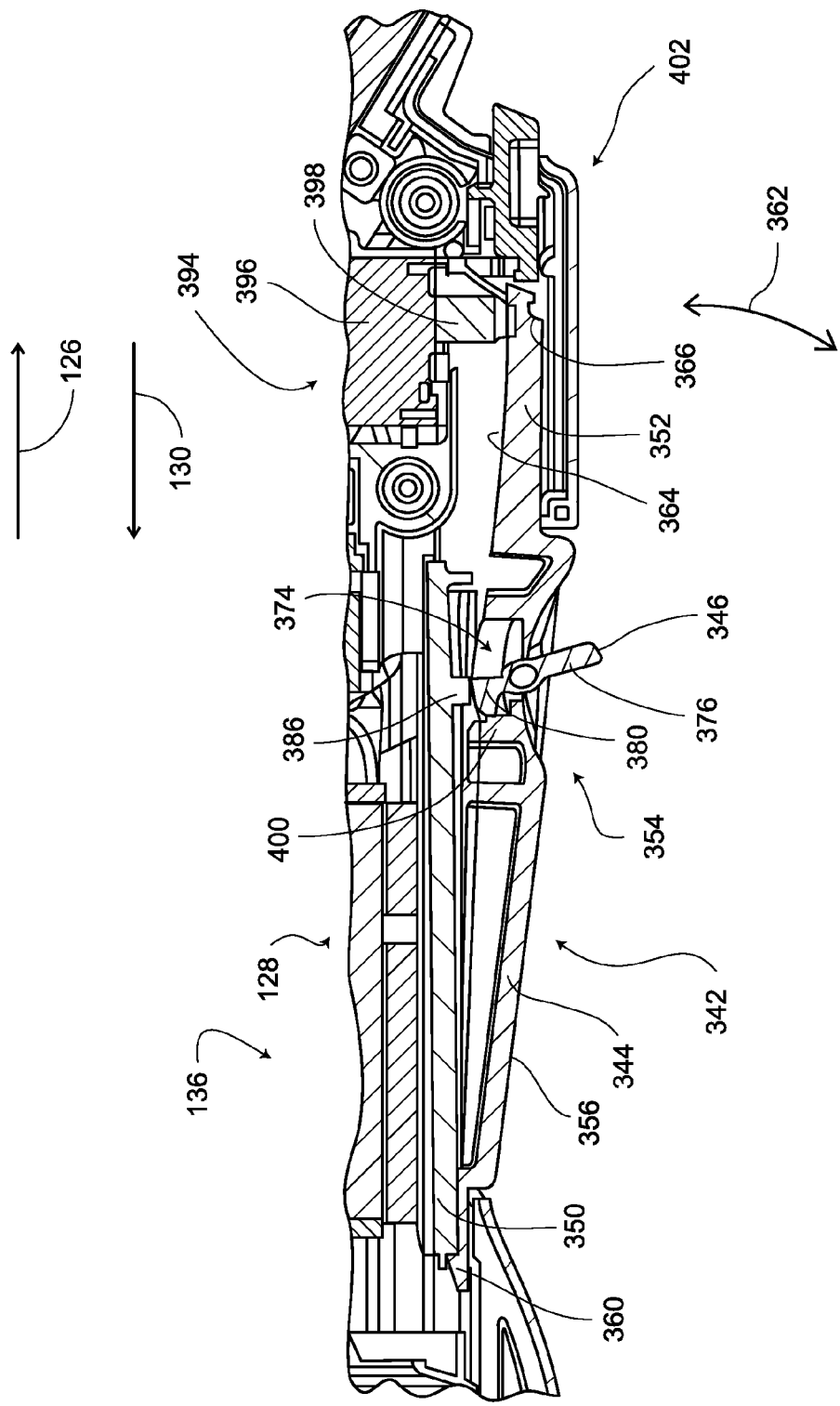
FIG. 14 is a cross sectional view of a portion of the saw assembly of FIG. 1, showing the lockout power switch in a de-energized position.

As shown in FIG. 14, the abutment structure 352 is positioned on an opposite end portion of the paddle 344 and is at least partially positioned within the interior space 128 of the housing 104. The abutment structure 352 includes a switch surface 364 located on a top side of the abutment structure and a catch feature or lock-on notch 366 located on a bottom/opposite side of the abutment structure. The switch surface 364 is positioned to engage an actuator 398 of a switch unit 394 of the saw assembly 100. The lock-on notch 366 cooperates with a lock-on structure 402 of the saw assembly 100, as described below.

Figure 15:
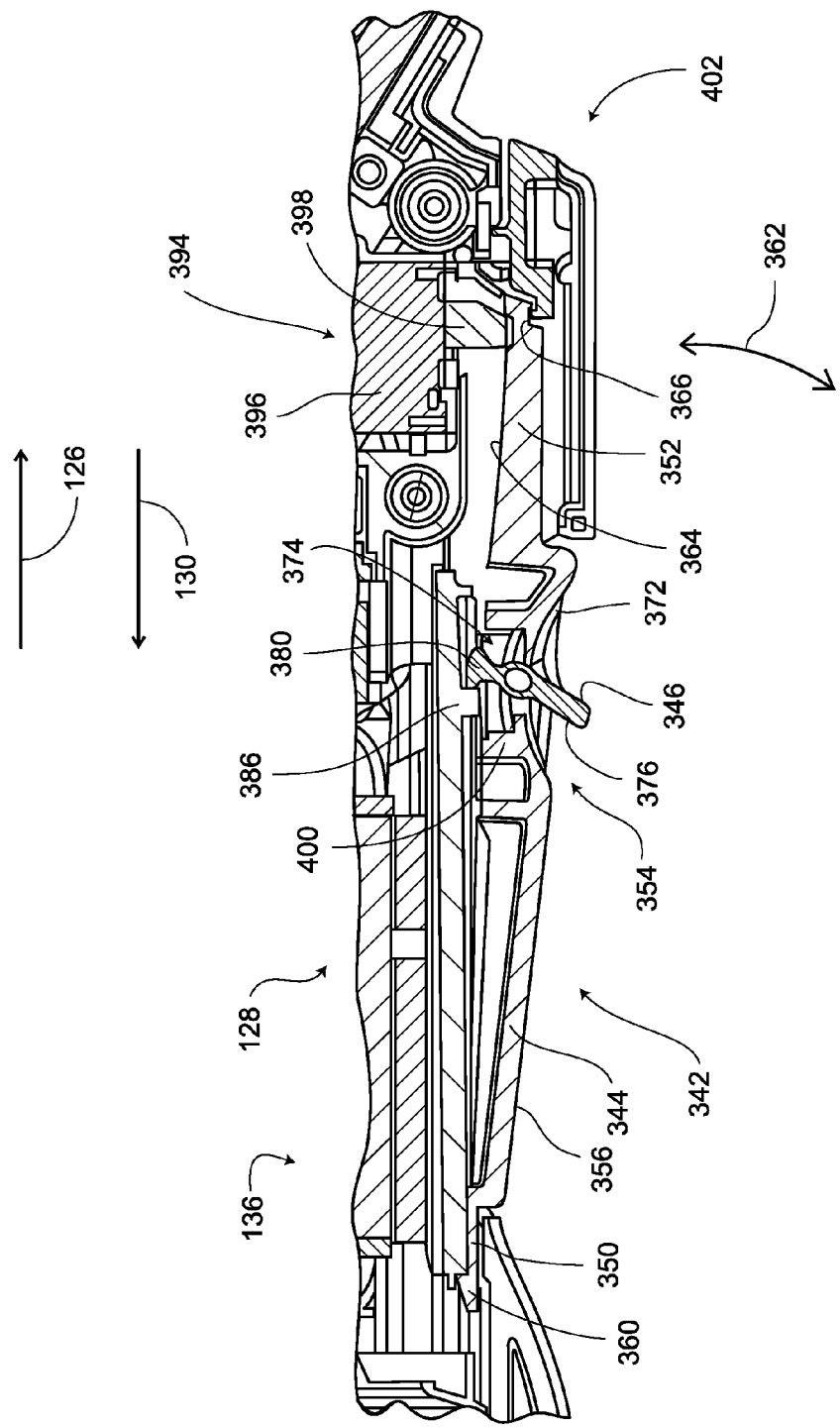
FIG. 15 is a cross sectional view of a portion of the saw assembly of FIG. 1, showing the lockout power switch in an energized position.

With reference to FIG. 13, the paddle cavity 354 is formed in the paddle 344 between the pivot structure 350 and the abutment structure 352 on an outer side of the paddle, which faces away from the electric motor 136. The paddle cavity 354 defines a generally concave paddle cavity surface 372 (FIG. 15). The paddle cavity 354 receives at least a portion of the lockout lever 346 and at least a portion of the spring 348. The paddle cavity 354 has a length of approximately 2.5 centimeters (2.5 cm) and a width of approximately 2.0 centimeters (2.0 cm).

The paddle 344 includes an opening 368, an opening 370, and a lever opening 374 (FIGS. 14 and 15). The opening 368 and the opening 370 are in fluid communication with the paddle cavity 354 and are used to pivotally connect the lockout lever 346 to the paddle, as described below. The lever opening 374 is formed in the cavity surface 372 and fluidly couples the interior space 128 to the paddle cavity 354.

The contact surface 356 is at least a portion of the outer side of the paddle 344. The contact surface 356 is a portion of the power lever 342 that a user contacts to use the power lever. The contact surface 356 is a convex surface such that fits comfortably in the hand of the user. The contact surface 356 has a width of approximately 2.3 centimeters (2.3 cm) and a length of approximately 6.0 centimeters (6.0 cm).

The lockout lever 346 includes a finger contact portion provided as an actuator portion 376, a connection structure 378, and a blocking member provided as a lockout tab 380. The actuator portion 376 extends from the connection structure 378 and is generally semicircular in shape.

The connection structure 378 defines a pivot opening 382 for receiving a pivot shaft 384. In particular, the pivot shaft 384 extends through the opening 368, the pivot opening 382, and the opening 370 to pivotally connect the lockout lever 346 to the paddle 344. The lockout lever 346 extends through the lever opening 374 formed in the paddle 344 and into the interior space 128. The lockout lever 346 pivots about the pivot shaft 384 between a lockout or locked position (FIG. 14) and a non-lockout or an unlocked position (FIG. 15).

The lockout tab 380 extends from the connection structure 378 and is at least partially positioned in the interior space 128. The lockout tab 380 is positioned on a generally opposite side of the connection structure 378 from the actuator portion 376. As shown in FIG. 14, when the lockout lever 346 is in the locked position, the lockout tab 380 is positioned in a first location relative to the paddle 344 against a stop structure 386 of the housing 104. As shown in FIG. 15, however, when the lockout tab 380 is in the unlocked position, the lockout tab is moved to a second position relative to the paddle 344 away from the stop structure 386.

With reference again to FIG. 13, the spring 348 is a torsion spring, which includes a coil 388, an arm 390, and an arm 392. The pivot shaft 384 extends through the coil 388 to position the arm 392 against the cavity surface 372 and the arm 390 against the actuator portion 376. The spring 348 biases the lockout lever 346 toward the locked position, as shown in FIG. 14. In particular, the spring 348 biases the actuator portion 376 in the rearward direction 130 (FIG. 14) and biases the lockout tab 380 in the forward direction 126 (FIG. 14).

As shown in FIG. 14, the switch unit 394 that is operated by the power lever 342 includes a switching element 396 and an actuator 398 positioned in the interior space 128 of the housing 104. The actuator 398 is movable between an actuated position (FIG. 15) and a deactuated position (FIG. 14). When the actuator 398 is in the actuated position the switching element 396 couples electrical energy to the electric motor 136 and the electric motor operates to move the driveshaft 260 in the repeating pattern. When the actuator 398 is in the deactuated position the switching element 396 decouples electrical energy from the electric motor 136 and the motor does not operate to move the driveshaft 260 in the repeating pattern. The actuator 398 is spring biased in the deactuated position. The actuator 398 contacts the switch surface 364 of the paddle 344 to bias the paddle toward the de-energized position.

The power lever 342 prevents users from inadvertently energizing the electric motor 136. As shown in FIG. 14, the paddle 344 is in the de-energized position and the lockout lever 346 is in the locked position. When the lockout lever 346 is in the locked position, the lockout lever prevents the paddle 344 from being moved to the energized position due to physical interaction of the lockout tab 380 and the stop structure 386. In particular, as shown in FIG. 14, the lockout tab 380 is positioned against the stop structure 386 to prevent movement of the paddle 344. Pivotal forces imparted on the paddle 344 which tend to move the abutment structure 352 toward the electric motor 136 about the path of movement 362, wedge the lockout tab 380 against the stop structure 386 and the portion 400 of the paddle, such that no pivotal movement of the paddle occurs.

With reference to FIGS. 14 and 15, when the lockout lever 346 is in the unlocked position movement of the paddle 344 to the energized position is enabled due to the lockout tab 380 being moved away from the stop structure 386. Accordingly, to energize the electric motor 136, first the lockout lever 346 is moved to the unlocked position and then the paddle 344 is pivoted to the energized position. The lockout lever 346 is pivoted to the unlocked position by moving the actuator portion 376 in the forward direction 126. Pivoting of the lockout lever 346 is typically done by pressing the tip of the little finger against the actuator portion 376 and then squeezing the actuator portion against the cavity surface 372. The forward direction 126 movement of the actuator portion 376 causes the lockout tab 380 to move in the rearward direction 130.

The actuator 398 is moved to the energized position and the switch 394 energizes the electric motor 136 in response to the paddle 344 moving to the energized position. As shown in FIG. 15, when the lockout lever 346 is in the unlocked position the lockout tab 380 is positioned behind the stop structure 386, such that the lockout tab is misaligned with the stop structure and does not interfere with pivoting of the paddle 344. The paddle 344 is moved to the energized position by squeezing the paddle. Typically, when moving the paddle 344 to the energized position, the fingers contact the contact surface 356 and the palm contacts an upper side of the sleeve 108. The user moves the paddle 344 to energized position by initiating a squeezing movement of the hand, which causes the paddle to pivot about the pivot structure 350 and also causes the switch surface 364 to abut the actuator 398 and to move the actuator to the energized position. It is noted that the saw assembly 100 is configured for one hand operation; therefore, the same hand that moves the lockout lever 346 to the unlocked position is used to move the paddle to the energized position. The same hand is also used to guide the saw assembly 100 through the workpiece.

To return the paddle 344 to the de-energized position from the energized position the user releases the squeezing force on the paddle 344. This causes the actuator 398 of the switch 394 to pivot the paddle 344 back to the de-energized position. When the paddle 344 is positioned in the de-energized position the actuator 398 is in the deactuated position and the motor 136 does not operate. Also, when the paddle 344 reaches or nearly reaches the de-actuated position, the torsion spring 348 returns the lockout lever 346 to the locked position.

The power lever 342 is positioned on the housing 104 in an ergonomic location. The power lever 342 is positioned to be easily contacted by the user's fingers on an underside of the sleeve 108. Additionally, the force that the user applies to the saw assembly 100 to move the saw through a workpiece assists the user in maintaining the paddle 344 in the energized position.

Figure 16:
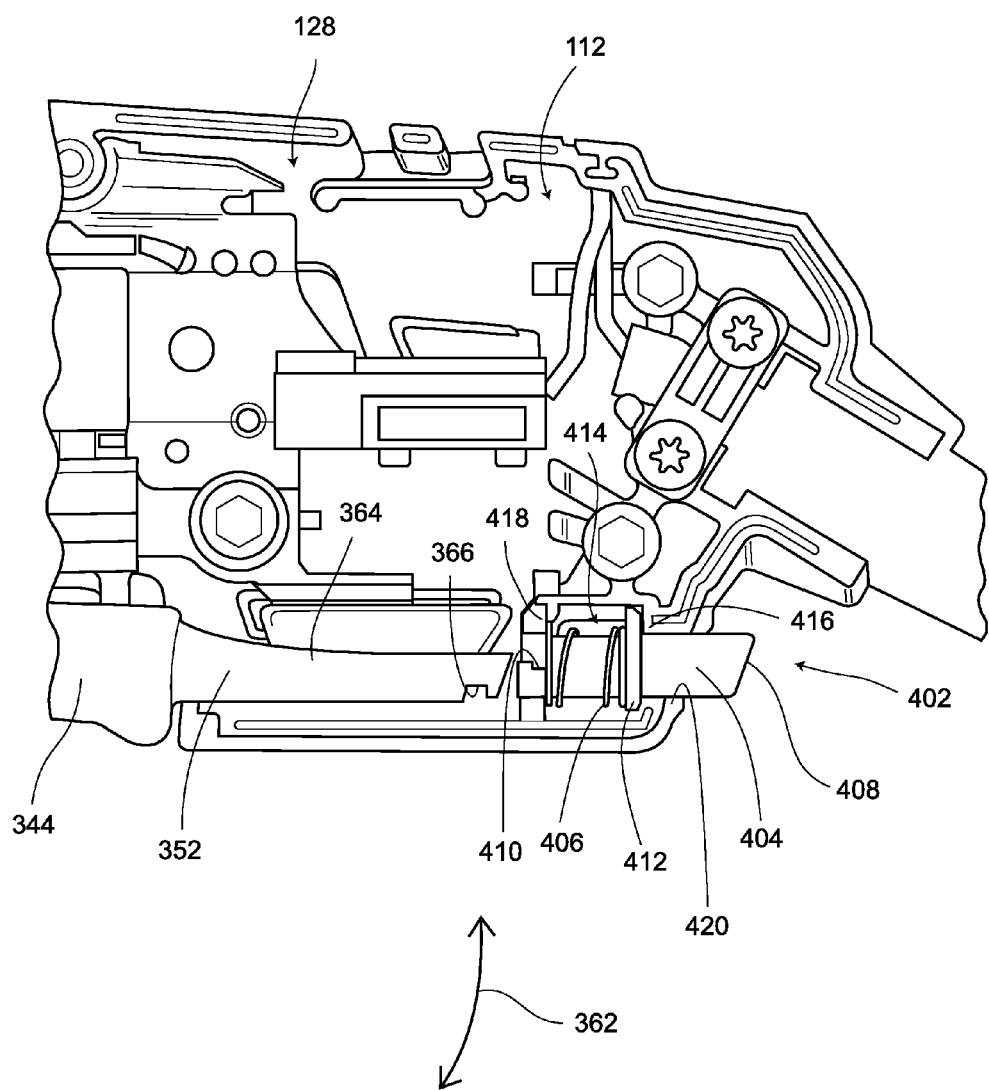
FIG. 16 is a cross sectional view of a portion of the saw assembly of FIG. 1, showing a lock on structure for maintaining the lockout power switch in the energized position, the lock on structure is shown in a disengaged position.
Figure 17:
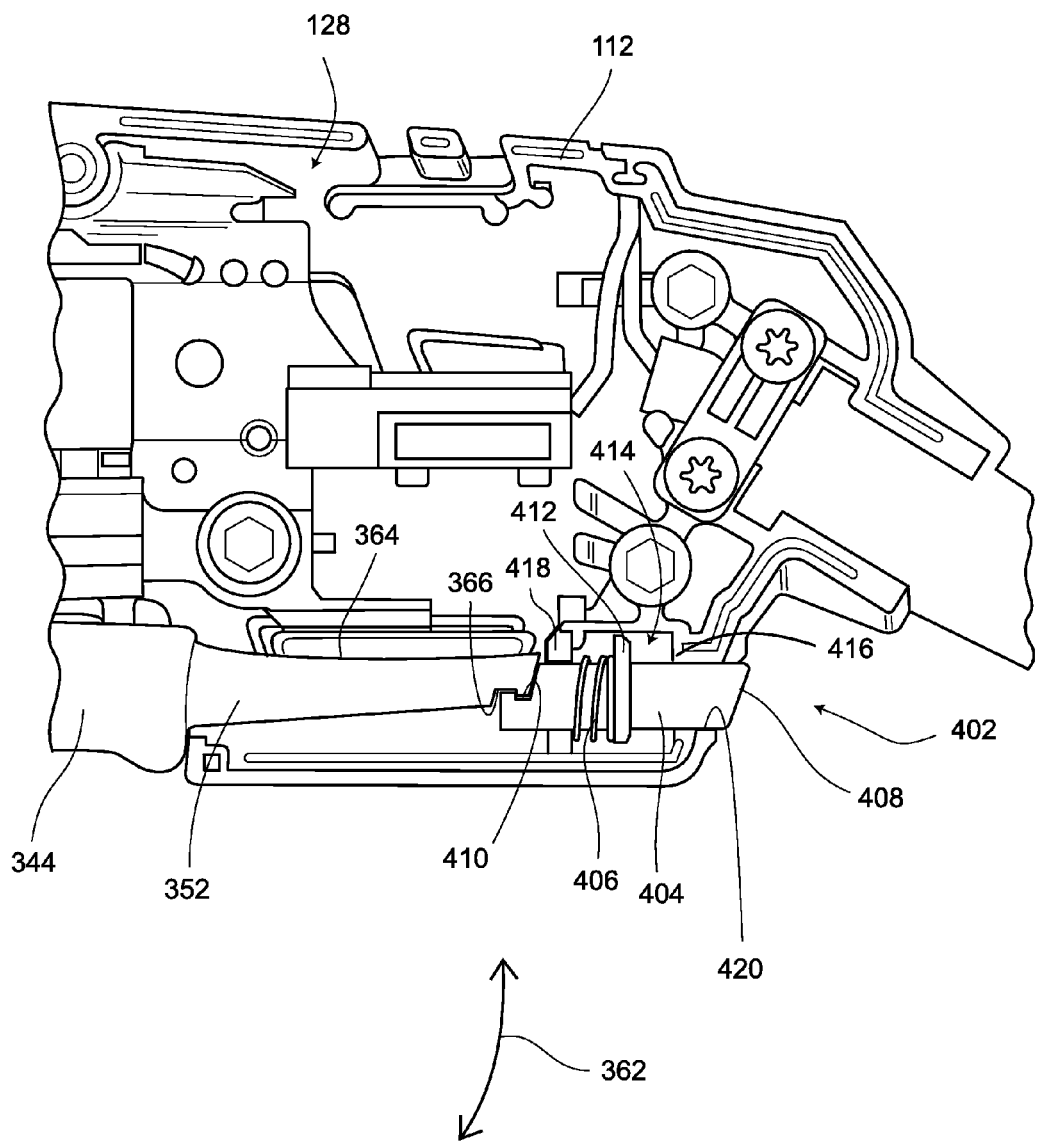
FIG. 17 is a cross sectional view of a portion of the saw assembly of FIG. 1, showing the lock on structure in an engaged position.

As shown in FIGS. 16 and 17, the saw assembly 100 also includes a lock-on member or structure 402, which includes a slider 404 and a spring 406. The slider 404 includes a push button portion 408 on a first end of the slider and a catch feature or a hook member 410 on an opposite second end of the slider. A flange 412 of the slider 404 is positioned between the push button 408 and the hook member 410.

The slider 404 is at least partially positioned within the internal space 128. In particular, the slider 404 is positioned in a slider cavity 414. The slider cavity 414 includes a shoulder 416, a shoulder 418, and a button opening 420. The slider 404 extends through the button opening 420, such that the push button portion 408 is positioned outside of the internal space 128 and the hook portion 410 is positioned within the internal space.

The spring 406 is an extension spring positioned between the flange 412 and the shoulder 418. The spring 406 biases the flange 412 against the shoulder 416.

The slider 404 is movable between a non-interference position or disengaged positioned (FIG. 16) and an interference position or an engaged position (FIG. 17). As shown in FIG. 16, the spring 406 biases the slider 404 in the disengaged position. As shown in FIG. 17, the slider 404 is movable to the engaged position by moving the slider toward the paddle 344 against the biasing force of the spring 406. When the slider 404 is in the engaged position, at least a portion of the slider is in the path of movement 362 of the paddle 344. When the slider 404 is in the disengaged position the slider is spaced apart from the path of movement 362.

The lock on structure 402 maintains the paddle 344 in the energized position without user intervention. To lock the paddle 344 in the energized position, first the paddle is moved to the energized position along the path of movement 362. Then, with the paddle 344 in the energized position, the slider 404 is moved the engaged position. Thereafter, the squeezing force on the paddle 344 is released and the slider 404 maintains the paddle in the energized position. The paddle 344 is maintained in the energized position without user-contact of the power lever 342 or the push button 408.

The hook portion 410 of the slider 404 engages the lock-on notch 366 to maintain the paddle 344 in the energized position. As shown in FIG. 17, when the paddle 344 is in the energized position and the slider 404 is in the engaged position, the lock-on notch 366 is positioned above the hook portion 410. Accordingly, when the force maintaining the paddle 344 in the energized position is released, the lock-on notch 366 becomes seated in the hook portion 410, thereby preventing the paddle from returning to the de-energized position. The spring 406 supplies a biasing force that ensures the hook portion 410 and the lock-on notch 366 remain engaged without user intervention.

To release the paddle 344 from the lock-on structure, the switch surface 364 of the paddle 344 is moved slightly closer to the switching element 396 (not shown in FIGS. 16 and 17), which moves the lock-on notch 366 away from the hook member 410 and disengages the lock-on notch from the hook member. When lock-on notch 366 and the hook member 410 are disengaged, the spring 406 returns the slider 404 to the disengaged position. Thereafter, the force on the paddle 344 may be released to allow the actuator 398 to return the paddle to the disengaged position.

Guard Structure

Figure 18:
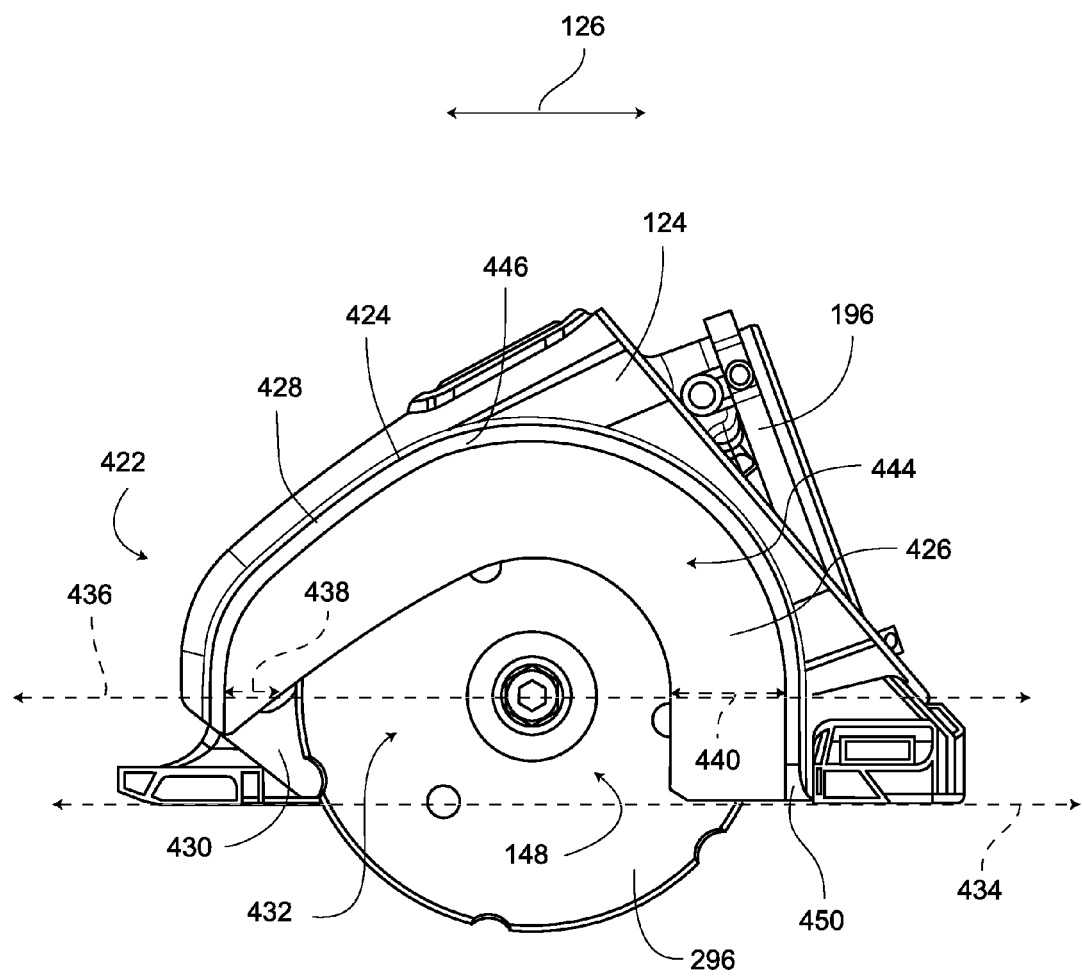
FIG. 18 is a side elevational view of a portion of the saw assembly of FIG. 1 showing the guard structure of the saw assembly and the flat cutting wheel.

As shown in FIGS. 5 and 18, the saw assembly 100 includes a guard assembly 422 in which one of the flat cutting wheel 296 and the flush cutting wheel 300 are partially positioned. The guard assembly 422 is secured to the housing 104 and includes a concave structure 424, a partition 426, and a flange 428.

The concave structure 424 extends from a wall portion 430 (FIG. 18) of the housing 104 and defines a protected space 432 for receiving at least a portion of one of the cutting wheel 296 and the cutting wheel 300. The partition 426 is secured to the concave structure 424 within the protected space 432. In particular, the partition 426 extends from the concave structure 424 toward the axis of rotation 268. The flange 428 projects from the partition 426 in a direction parallel to the axis of rotation 268 (FIG. 5). The wall portion 430, the concave structure 424, the partition 426, the flange 428, and the lower right shell 124 are integrally molded together in a monolithic part formed from injection molded thermoplastic.

As shown in FIG. 18, the shape of the partition 426 is defined in relation to a workpiece contact plane 434 and an arbor plane 436. The workpiece contact plane 434 is defined by a workpiece contact surface 466 (FIG. 19) of a foot 456 (FIG. 19) of the saw assembly 100. As described in detail below, the workpiece contact surface 466 is positioned against and moved across a workpiece during cutting operations of the saw assembly 100. The workpiece contact surface 466 is in the workpiece contact plane 434. The axis of rotation 268 is parallel to the workpiece contact plane 434.

The arbor plane 436 is parallel to the workpiece contact plane 434 and intersects the axis of rotation 268. The arbor plane 436 also intersects a leading portion 438 and a trailing portion 440 of the partition 426. The leading portion 438 is located forward of the axis of rotation 268 in relation to the forward direction 126 of movement of the saw assembly 100. The arbor plane 436 intersects the leading portion 438 for an amount referred to as the leading intersection distance. The trailing portion 440 of the partition 426 is located behind the axis of rotation 268 in relation to the forward direction 126 of movement of the saw assembly 100. The arbor plane 436 intersects the trailing portion 440 for an amount referred to as the trailing intersection distance. The leading intersection distance is less than the trailing intersection distance.

Figure 19:
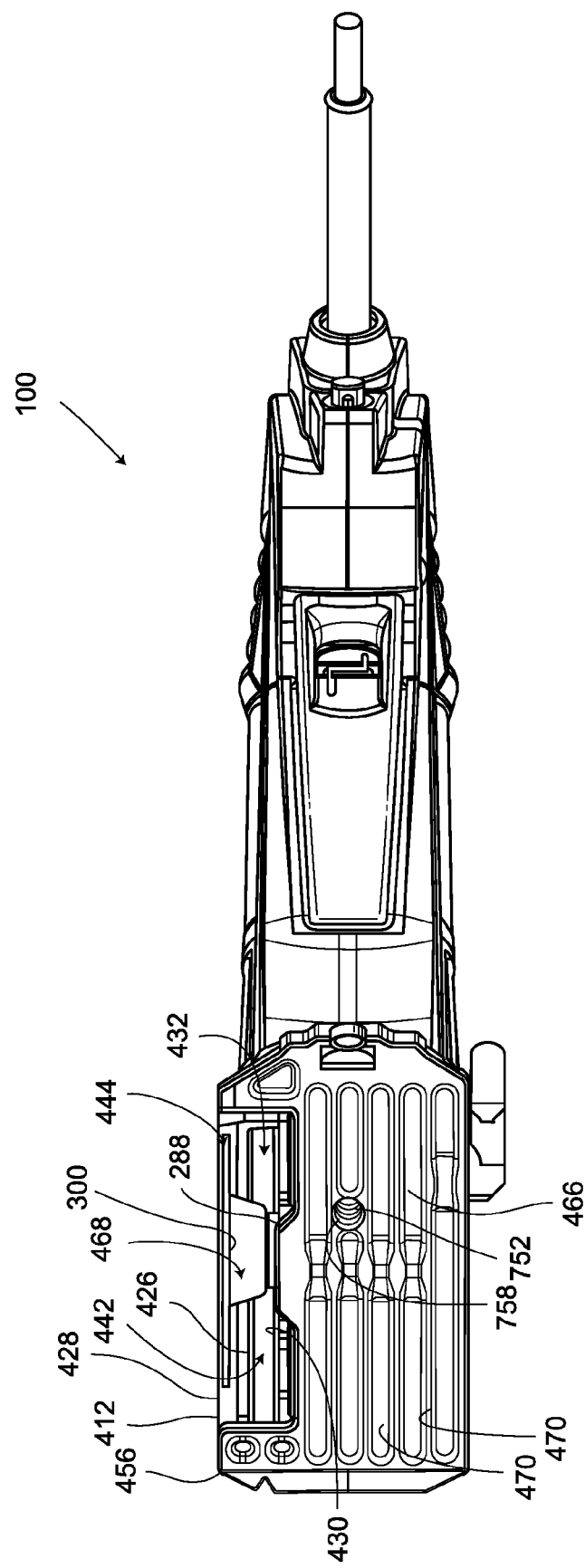
FIG. 19 is a bottom plan view of the saw assembly of FIG. 1 showing the flush cutting wheel positioned in a protective pocket of the guard structure.

As shown in FIG. 19, the partition 426 divides the protected space 432 into a cutting wheel space 442 and another cutting wheel space 444. The cutting wheel space 442 is positioned on a side of the partition 426 nearest the wall portion 430, such that the cutting wheel space 442 is interposed between the wall portion 430 and the partition 426. The cutting wheel space 444 is positioned an opposite side of the partition 426 and is defined by the flange 428.

With reference to FIG. 5, the flange 428, which is also referred to herein as a guard wall, defines a lateral guard wall surface 446 and a lower guard wall surface 448. The lateral guard wall surface 446 is positioned against a workpiece or cutting guide during cutting operations that utilize the flush cutting wheel 300. The lateral guard wall surface 446 is angled with respect to the lower guard wall surface 448 by approximately ninety degrees (90°). A bevel portion 450 of the lateral guard surface 446/concave structure 424 is beveled with respect to the lower guard wall surface 448.

The guard assembly 422 guards at least two types of cutting wheels including the flat cutting wheel 296 and the flush cutting wheel 300 without requiring any user configuration of the guard assembly when switching between the cutting wheels. As shown in FIG. 5, the flat cutting wheel 296 is connected to the arbor assembly 148 and is at least partially positioned in the cutting wheel space 442 (FIG. 19). When the electric motor 136 is supplied with electric energy the driveshaft 260 rotates the cutting wheel 296 about the axis of rotation 268 so that the cutting structure 308 is advanced through the cutting wheel space 442.

Figure 20:
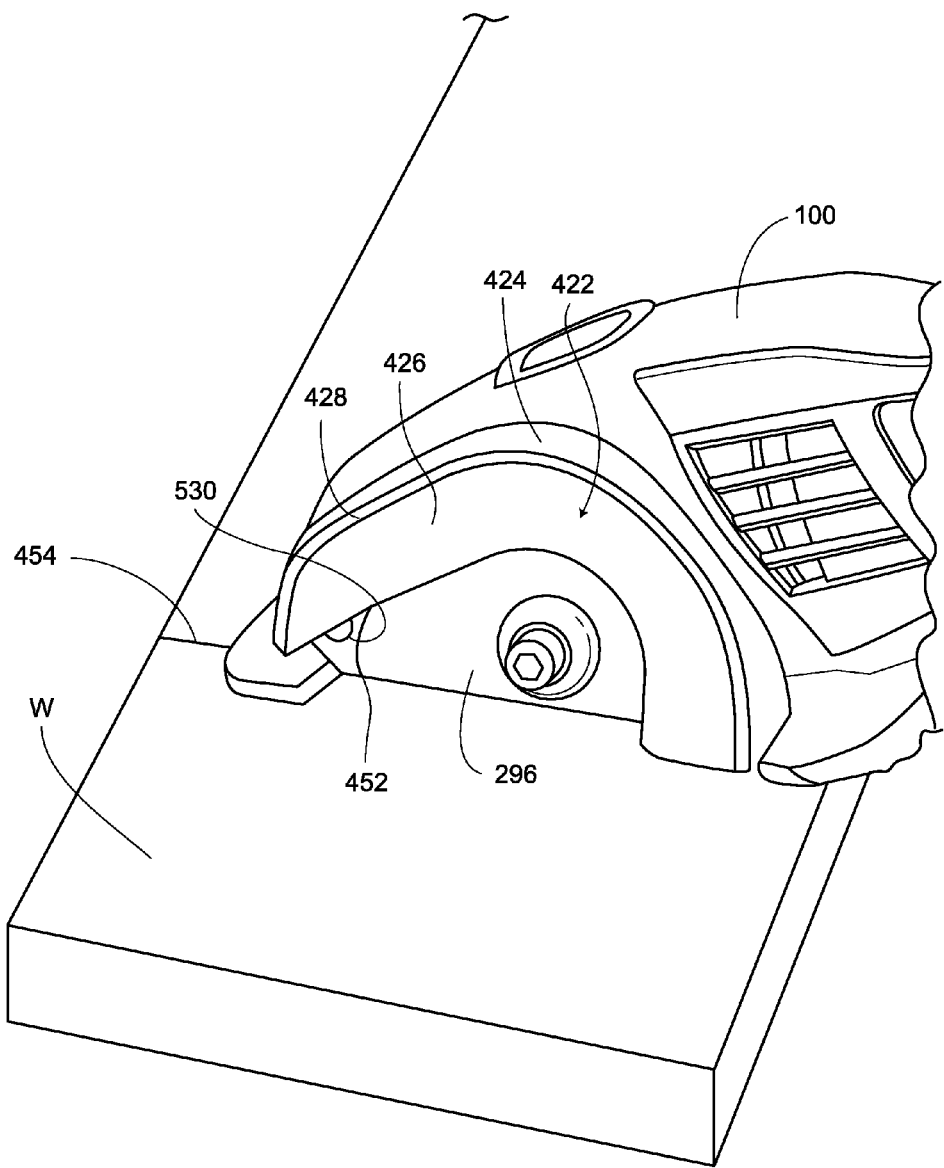
FIG. 20 is a side perspective view of the saw assembly of FIG. 1 showing the saw assembly part way through a workpiece cutting operation.

As shown in FIG. 20, the shape of the partition 426 enables a user of the saw assembly 100 to view a leading edge 452 of the cutting wheel 296 positioned in the cutting wheel space 442 as it moves through a workpiece W. For example, a cutting line 454 may be drawn on the workpiece W, representative of a desired cutting path. The shape of the partition 426 enables the user to view the point of intersection between the leading edge 452 and the cutting line 454 during the cutting operation. This simplifies the task of guiding the saw assembly 100 along a desired cutting line 454.

As shown in FIG. 6, the flush cutting wheel 300 is connected to the arbor assembly 148 and is at least partially positioned in the cutting wheel space 444 (FIG. 18). When the electric motor 136 is supplied with electric energy the driveshaft 260 rotates the cutting wheel 300 about the axis of rotation 268 so that the cutting structure 324 is advanced through the cutting wheel space 444.

Pivotable Foot

Figure 21:
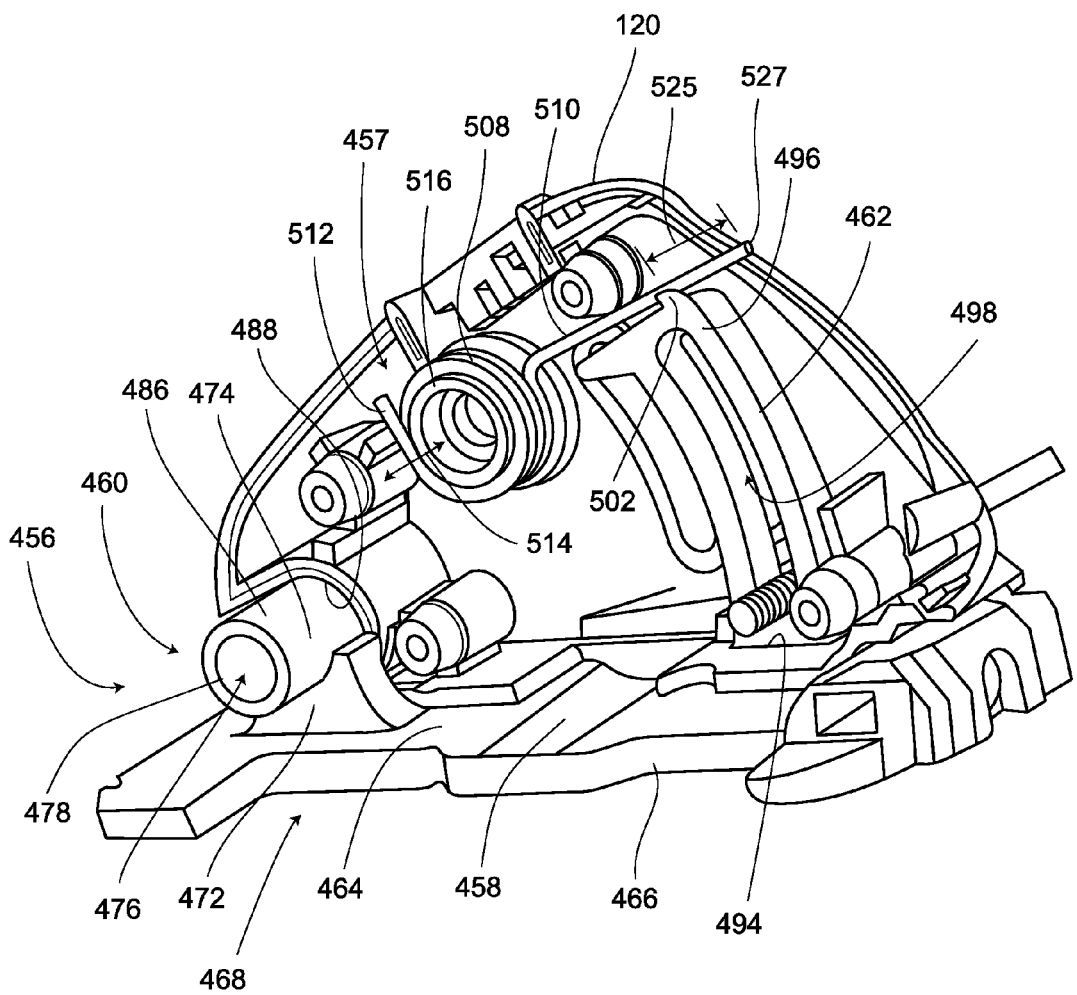
FIG. 21 is a side perspective view of a portion of the saw assembly of FIG. 1 showing a foot of the saw assembly in a position of maximum cutting depth and also showing a spring for biasing the foot.
Figure 22:
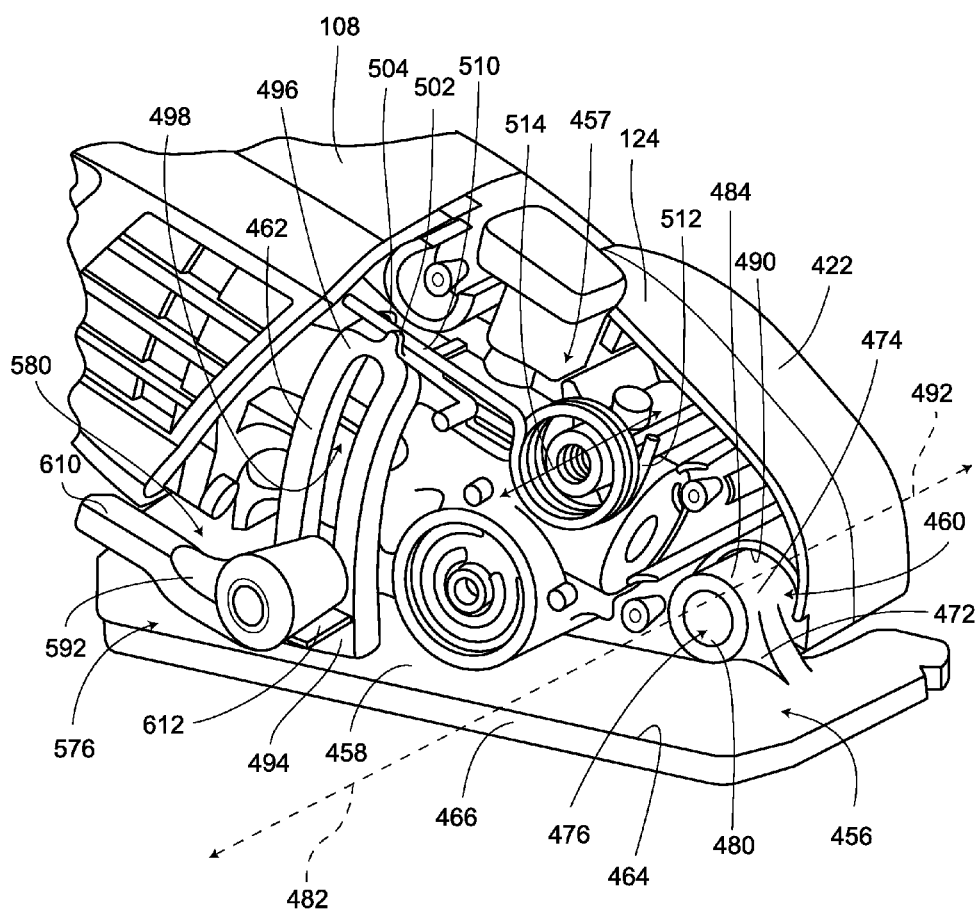
FIG. 22 is a side perspective view of a portion of the saw assembly of FIG. 1 showing the foot of the saw assembly in the position of maximum cutting depth and also showing the spring for biasing the foot.

As shown in FIGS. 21 and 22, the saw assembly 100 includes a foot 456 pivotally connected to the housing 104 and biased by a spring 457. The foot 456 includes a base 458, a hinge structure 460, and an extension structure 462, which are integrally molded together in a monolithic part formed from injection molded thermoplastic.

As shown in FIG. 21, the base 458 defines an upper surface 464, a workpiece contact surface 466, and a cutting wheel passage 468. The workpiece contact surface 466 is positioned against a workpiece W or a guide 780 (FIG. 39) during cutting operations. The base 458 includes numerous grooves 470 (FIG. 19) to reduce the surface area of the workpiece contact surface 466, such that the workpiece contact surface slides easily on most workpieces.

Figure 23:
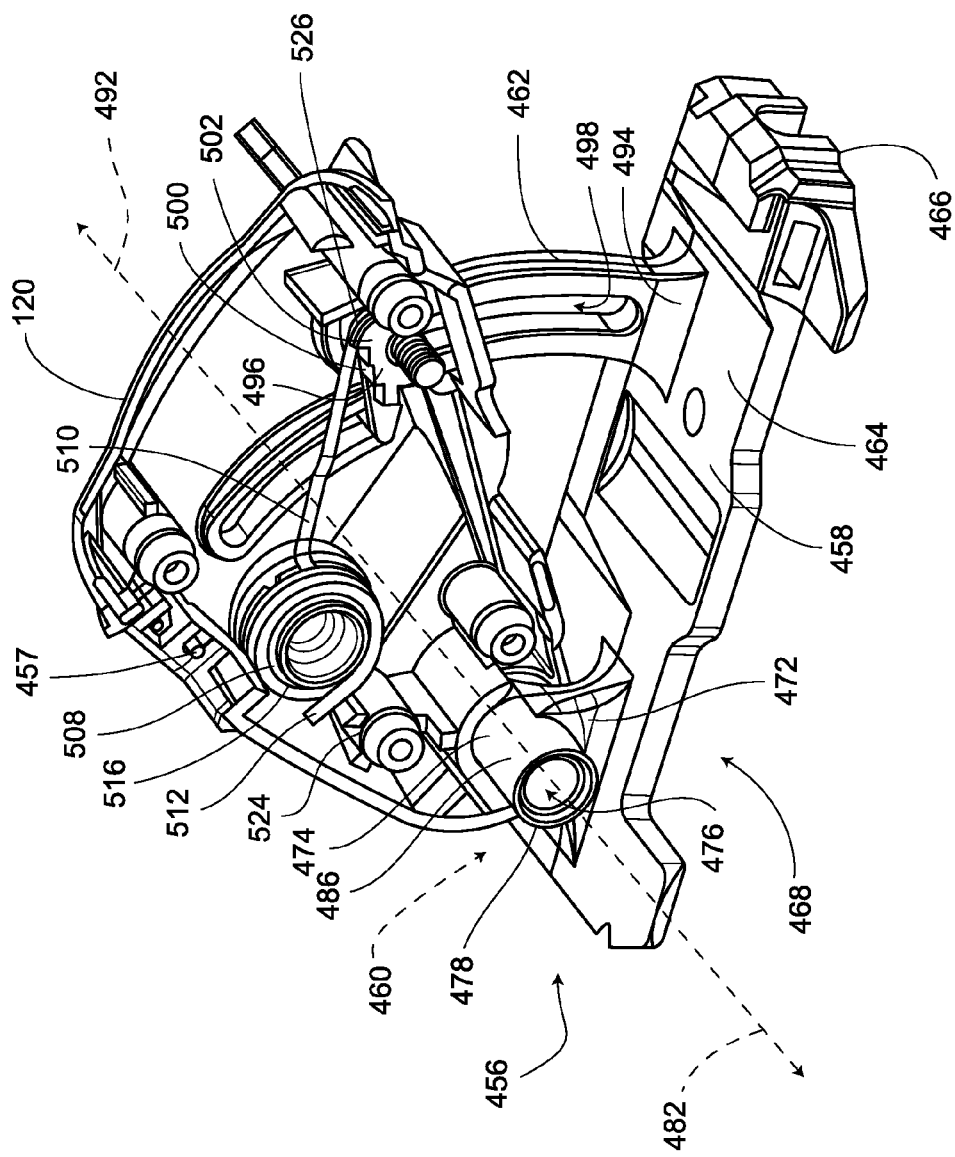
FIG. 23 is a side perspective view of a portion of the saw assembly of FIG. 1 showing the foot of the saw assembly in a position of minimum cutting depth and also showing the spring for biasing the foot.

As shown in FIG. 23, the cutting wheel passage 468 is formed in the base 458 and is defined on three sides by the base. The passage 468 has a generally rectangular shape. The passage 468 is positioned on the side of the base 458 near the arbor assembly 148, such that a portion of the cutting wheel 296, 300 extends therethrough. The cutting wheel passage 468 may also be referred to herein as a base opening.

The hinge structure 460 includes a riser 472 extending from the base 458 and a conduit structure or a generally cylindrical member 474 extending from the riser. The riser 472 extends from the upper surface 464. The cylindrical member 474 defines a central channel 476 that extends completely through the cylindrical member and which is defined by an opening 478 and an opening 480 (FIG. 22). The cylindrical member 474 also defines a longitudinal axis 482, which is parallel to the axis of rotation 268. A left portion 484 (FIG. 22) of the cylindrical member 474 is positioned on a left side of the riser 472, and a right portion 486 (FIGS. 21 and 23) of the cylindrical member is positioned on a right side of the riser.

The cylindrical member 474 of the hinge structure 460 is received by the housing 104 to enable the foot 456 to pivot relative to the housing or, stated differently, to enable the housing to pivot relative to the foot. In particular, as shown in FIG. 21, the lower left shell 120 defines a hinge bore 488 or a hinge receptacle, and as shown in FIG. 22, the lower right shell 124 defines a hinge bore 490 or a hinge receptacle. The hinge receptacles 488, 490 have an inside diameter that is approximately equal to an outside diameter of the cylindrical member 474 to enable the hinge receptacle 488 to receive the left portion 484 and to enable the hinge receptacle 490 to receive the right portion 486. The foot 456 is pivotable about the hinge structure 460 relative to the housing 104 about a pivot axis 492 that is coaxial with the longitudinal axis 482. The foot 456 is shown in FIGS. 21 and 22 pivoted to a position of maximum cutting depth (also referred to as the non-rest position) and is shown in FIG. 23 pivoted to a position of minimum cutting depth (also referred to as the rest position).

As shown in FIG. 23, the extension structure 462 includes a lower end portion 494 and an upper end portion 496 and defines an opening 498. The lower end portion 494 is attached to the upper surface 464. The extension structure 462 extends from the base 458 along a generally arcuate path into the interior space 128, such that the upper end portion 496 is positioned in the interior space. The opening 498 is a generally arcuate opening that extends from near the lower end portion 494 to near the upper end portion 496. The opening 498 cooperates with a base lock assembly 576 (FIG. 27) for fixing the position of the foot 456 relative to the housing 104.

Figure 24:
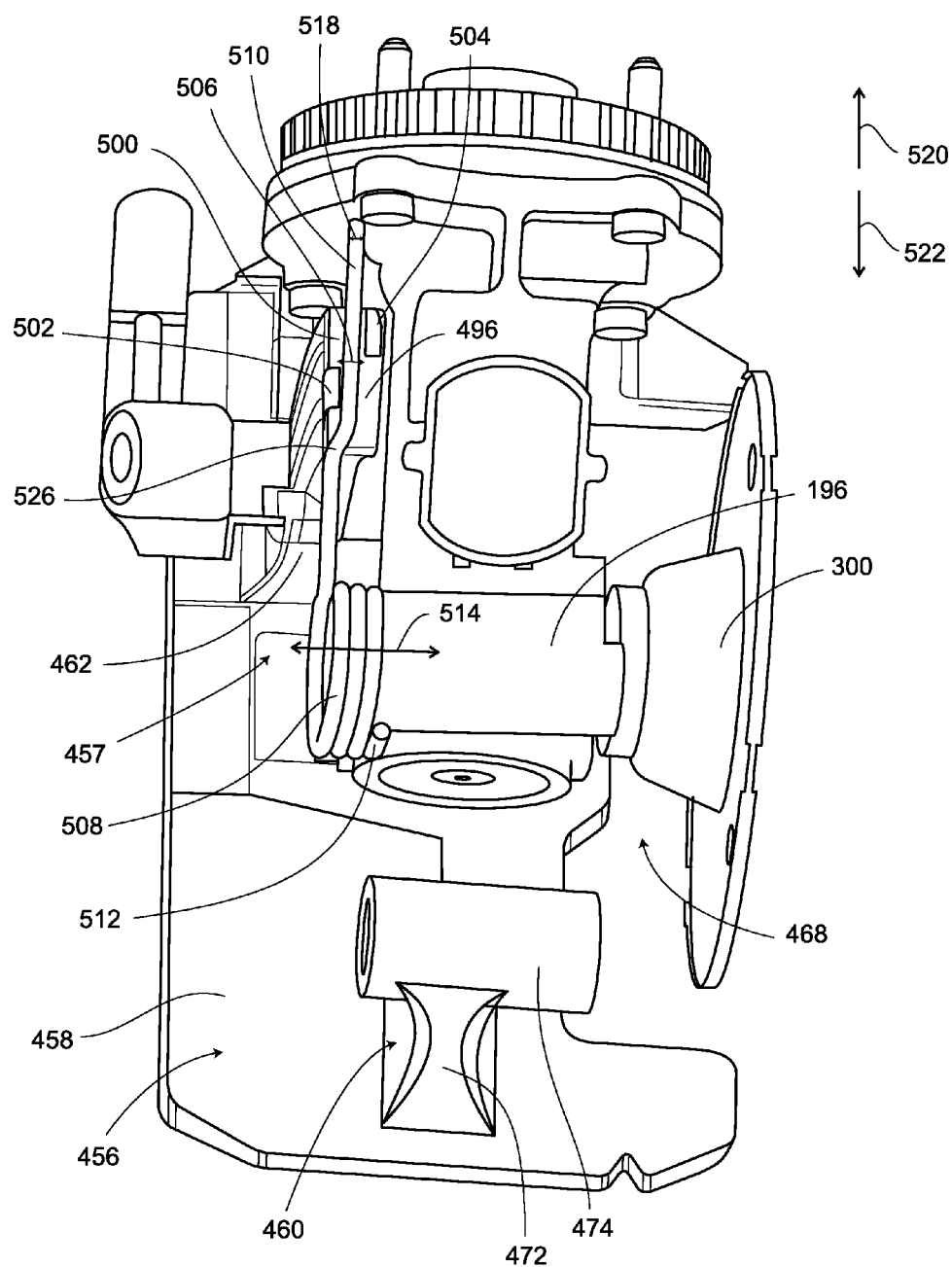
FIG. 24 is a top perspective view of a portion of the saw assembly of FIG. 1 showing the spring of FIG. 21 as it is received by the foot.

As shown in FIG. 24, the upper end portion 496 defines a spring arm contact surface 500 for contacting the spring 457 and includes a protrusion 502 and a protrusion 504. The protrusion 502 extends from the upper end portion 496, such that a portion of the protrusion 502 is positioned above the spring arm contact surface 500. Similarly, the protrusion 504 extends for an approximately equal distance from the upper end portion 496, such that a portion of the protrusion 504 is positioned above the spring arm contact surface 500. The protrusion 502 is spaced apart from the protrusion 504 so as to define a gap 506 therebetween that is slightly wider than an arm 510 of the spring 457.

With reference again to FIG. 21, the spring 457 is a torsion spring, which includes a coiled portion 508, an arm 510 connected to the coiled portion, and another arm 512 connected to the coiled portion. The coiled portion 508 is a generally circular coil including approximately three (3) coils of the wire used to form the spring 457. The coil 508 defines a center axis 514, and the spring 457 generates a resistive force when the arm 510 is pivoted about the center axis relative to the arm 512 (and vice versa).

The spring 457 is arranged in the interior space 128. Specifically, the coil 508 is supported by a mount 516 extending from the left lower shell 120. The mount 516 defines a generally circular periphery having a diameter that is slightly smaller than a diameter of the coil 508, such that the mount extends through the coil.

As shown in FIG. 24, the arm 510 is positioned on the spring contact surface 500 between the protrusion 502 and the second protrusion 504. The protrusions 502, 504 prevent the arm 510 from sliding off the spring contact surface 500 in the directions parallel to the axis 514. A width 518 of the arm 510 is less than the gap 506. Accordingly, the protrusions 502, 504 enable the arm 510 to move relative to the spring contact surface 500 in the direction 520 and in the direction 522 in response to the movement of the foot 456. The spring 457 includes an elbow 526 so that the arm 510 is in the proper position for being positioned on the spring contact surface 500.

As shown in FIG. 23, the arm 512 of the spring 457 is positioned against a stop tab 524 of the left lower shell 120. The arm 512 remains in a generally fixed position in response to pivoting of the foot 456.

The arm 510 of the spring 457 slides on the spring contact surface 500 during pivoting of the foot 456 relative to the housing 104, which may alternatively be described as pivoting of the housing relative to the foot. The spring 457 biases the foot 456 toward the position of minimum cutting depth (FIG. 23). In this position, an end 527 of the arm 510 is positioned adjacent to the protrusion 502. As the foot 456 is pivoted to the position of maximum cutting depth (FIG. 21) the spring arm 510 slides on the spring contact surface 500 such that the end 527 is separated from the protrusion 502 by the distance 525. The arm 510 slides on the spring contact surface 500 as a result of the axis 514 being offset from the axis 482. Additionally, pivoting the foot 456 from the position of minimum cutting depth (FIG. 23) to the position of maximum cutting depth (FIG. 21) causes at least a portion of the cutting wheel 296, 300 to be advanced through the cutting wheel passage 468.

Dust Port

Figure 25:
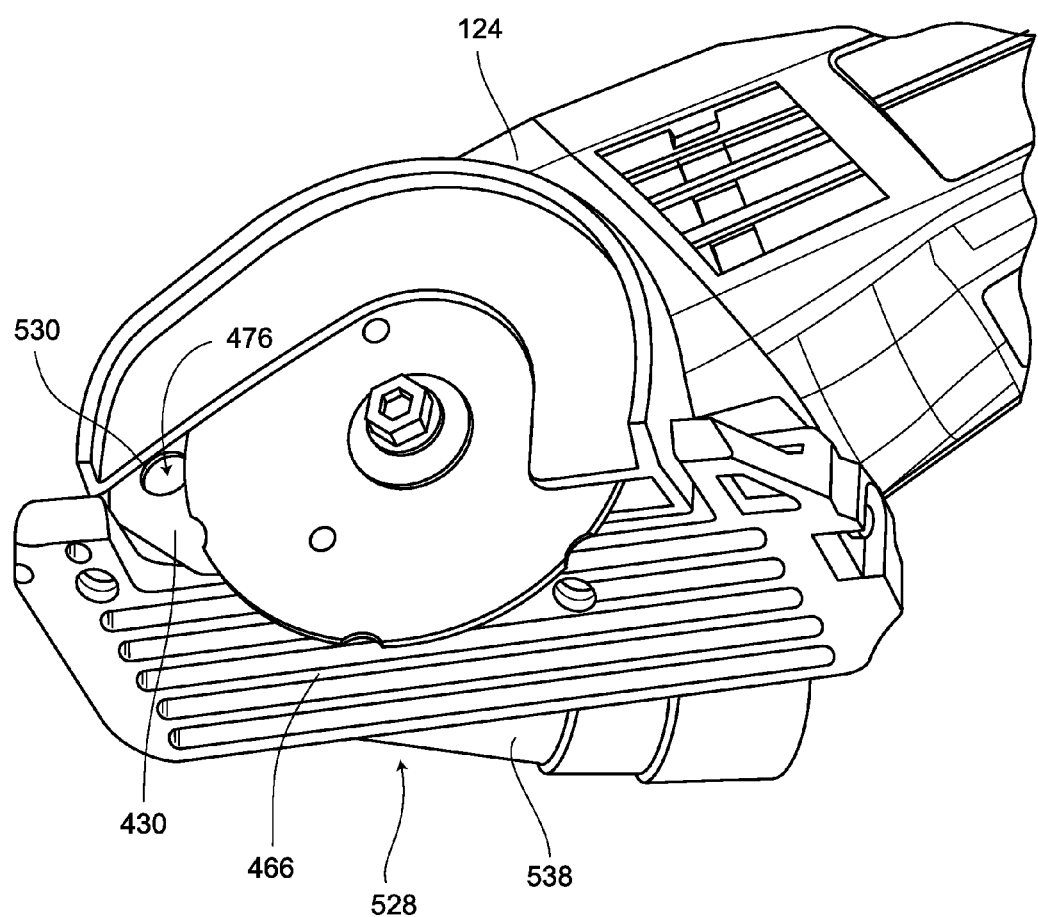
FIG. 25 is a perspective view of a portion of the saw assembly showing an inlet dust port and an adapter.
Figure 26:
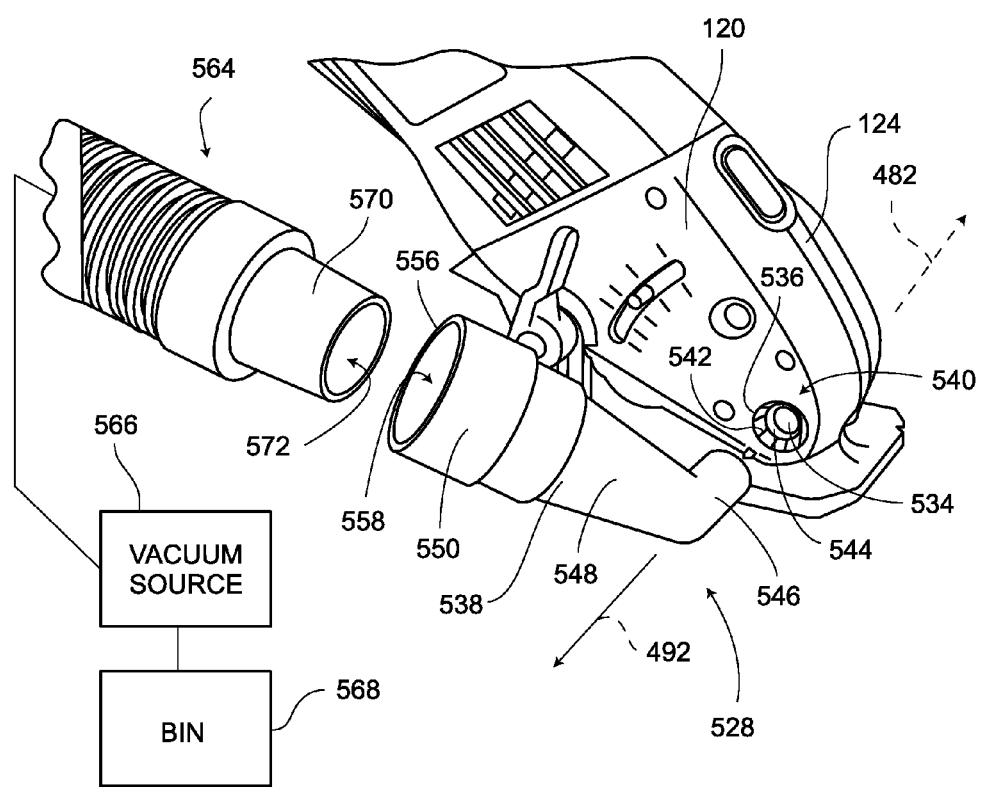
FIG. 26 is a perspective view of a portion of the saw assembly of FIG. 1, the adapter, and a vacuum hose, additionally a schematic view of a vacuum source and a bin is also shown.

As shown in FIGS. 25 and 26, the saw assembly 100 includes a dust port assembly 528, which includes a dust inlet or an inlet port 530, a dust channel or central channel 476, a dust outlet or an outlet port 534, a coupling component or a connection structure 536, and a hose adapter 538. The inlet port 530 is a generally circular opening formed in the lower right shell 124. The inlet port 530 is formed in the wall portion 430 and is in fluid communication with the hinge receptacle 490 (FIG. 22). The inlet port 530 defines a center point and has a diameter of approximately eight millimeters (8 mm). The center point of the inlet portion 530 is aligned with the pivot axis 492 of the foot 456. As shown in FIG. 20, during a cutting operation the inlet port 530 is positioned near the point of intersection between the leading edge 452 of the cutting wheel 296, 300 and the cutting line 454. The inlet port 530 is aligned with the opening 478 and is juxtaposed with the protected spaced 432 defined by the flange 428.

With reference to FIG. 21, the dust channel is provided as the central channel 476 in the cylindrical member 474 of the hinge structure 460. The dust channel 476, which may also be referred to as a conduit passage, is a bore that extends from the opening 478 on a first side of the cylindrical member 474 to the opening 480 (FIG. 22) on an opposite end of the cylindrical member. The dust channel 476 is a generally cylindrical channel that defines the longitudinal axis 482 (FIG. 22), which is coaxial with the pivot axis 492 (FIG. 22) of the foot 456.

Figure 27:
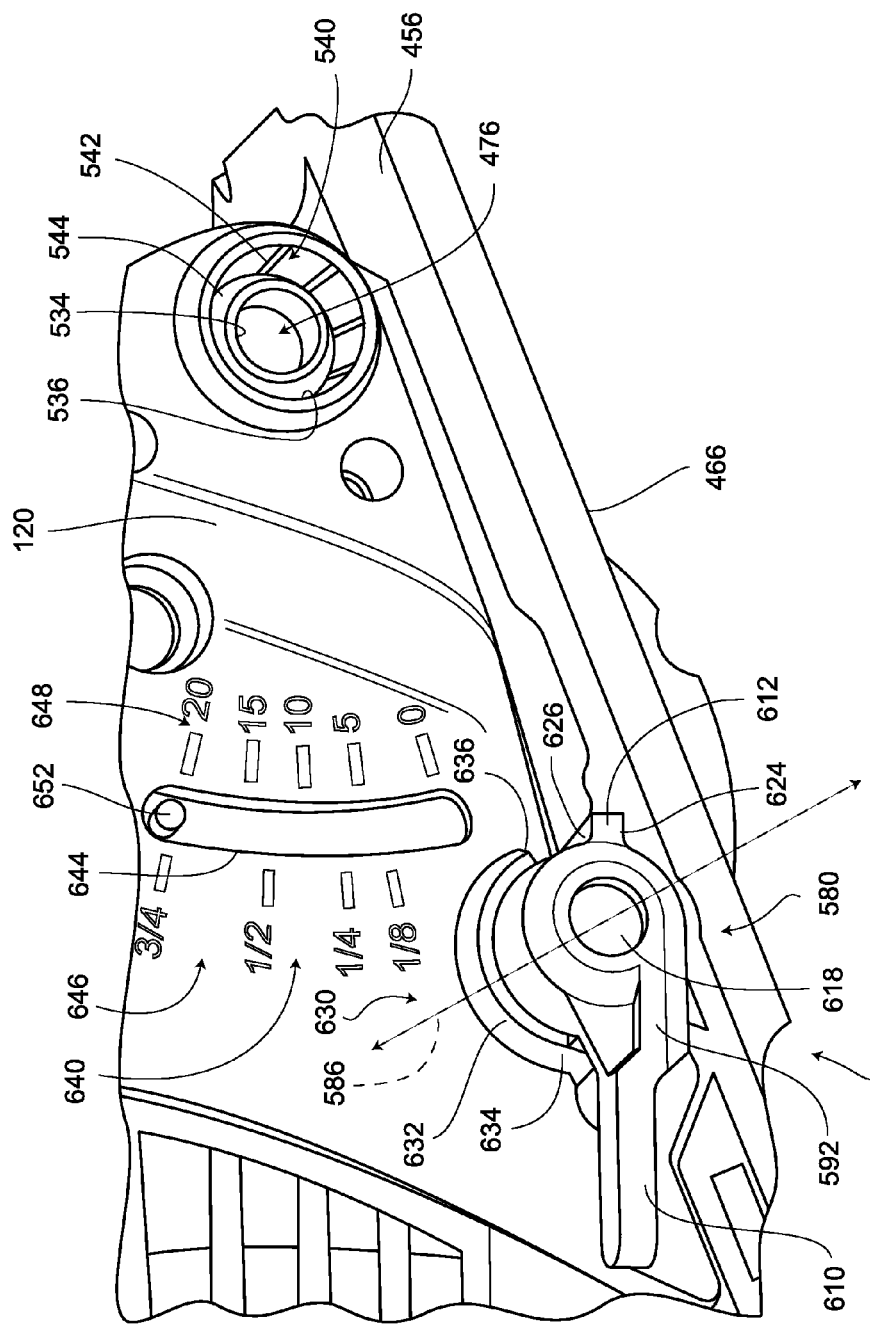
FIG. 27 is a perspective view of a portion of the saw assembly of FIG. 1 showing an inside surface of the dust port.

As shown in FIG. 27, the outlet port 534 is an opening formed in the lower left shell 120. The outlet port 534 is in fluid communication with the hinge receptacle 488 (FIG. 21). The outlet port 534 is also in fluid communication with the opening 480, the dust channel 476, the opening 478, and the inlet port 530. The outlet port 534 is a generally circular port that defines a center point that is aligned with the pivot axis of the foot 456 (FIG. 22).

The connection structure 536 is formed in the lower left shell 120 and defines a receptacle or a circular bore 540 that is concentric with the outlet port 534. The connection structure 536 also includes numerous friction ribs 542 and a wall 544. The friction ribs 542 extend radially inward from the circular bore 540 for approximately one millimeter (1 mm). The friction ribs 542 are generally evenly spaced around the periphery of the circular bore 540. The wall 544 terminates the circular bore 540.

Figure 28:
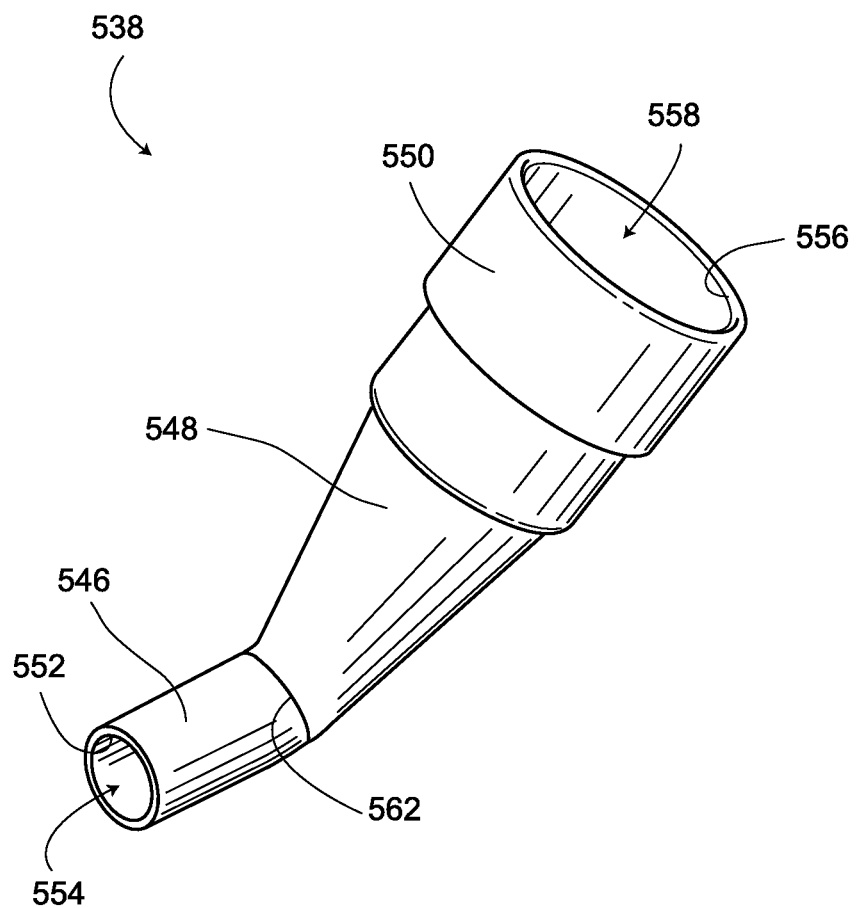
FIG. 28 is a perspective view of the adapter of FIG. 25.

As shown in FIG. 28, the adapter 538 includes a coupling component or inlet structure 546, a funnel portion 548, and an outlet structure 550. The adapter 538 is formed from injection molded thermoplastic. The inlet structure 546 is a generally cylindrical structure defining a central opening 552 and an adapter passage 554. The outside diameter of the inlet structure 546 is approximately equal to an inside diameter of the circular bore 540, such that the inlet structure is configured to mate with the connection structure 536 to secure the adapter 538 to the housing 104. When the inlet structure 546 is mated with the connection structure 536, the adapter passage 554 is in fluid communication with the outlet port 534. The outlet structure 550 is also a generally cylindrical structure defining a central opening 556 and an outlet passage 558.

The funnel portion 548 fluidly connects the adapter passage 554 of the inlet structure 546 to the outlet passage 558 of the outlet structure 550. To this end, the funnel portion defines a dust channel (not shown) that is narrowest near the inlet structure 546 and that is widest near the outlet structure 550.

The funnel portion 548 defines an elbow 562, such that the inlet structure 546 is offset from the outlet structure 550.

As shown in FIG. 26, the dust port assembly 528 is used with a vacuum hose/tube 564, a vacuum source 566, and a collection bin 568 to draw dust generated by the cutting wheel 296, 300 to the collection bin. To use the dust port assembly 528, first the adapter 538 is connected to the saw assembly 100 by inserting the inlet structure 546 into the bore 540 until the inlet structure contacts the bottom wall 544. The exterior of the inlet structure 546 contacts the friction ribs 542 when it is inserted into the connection structure 536, such that a friction fit is established between the connection structure and the inlet structure. Due to the friction fit, the adapter 538 remains in a fixed position relative to the connection structure 536 without user intervention. Nonetheless, the adapter 538 is easily rotated about the pivot axis 492 to a desired position. Next, the vacuum tube 564 is connected to the outlet structure 550 of the adapter 538. The vacuum tube 564 includes a fitting 570 that frictionally fits within the outlet structure 558. To connect the vacuum tube 564 to the adapter 538 the fitting 570 is inserted within the outlet structure 558.

Thereafter, the vacuum source 566 is energized and a workpiece W is cut with the cutting wheel 296, 300. As the cutting wheel 296, 300 moves through the workpiece W dust and debris is generated at a point near the inlet port 530. Accordingly, when the vacuum source 566 is activated air and the dust and debris are drawn into the inlet port 530, through the dust channel 476, through the adapter passage 554, through the dust channel 560, through the outlet passage 558, through a hose passage 572 of the vacuum hose 564, and into the collection bin 568.

Base Lock Assembly

Figure 29:
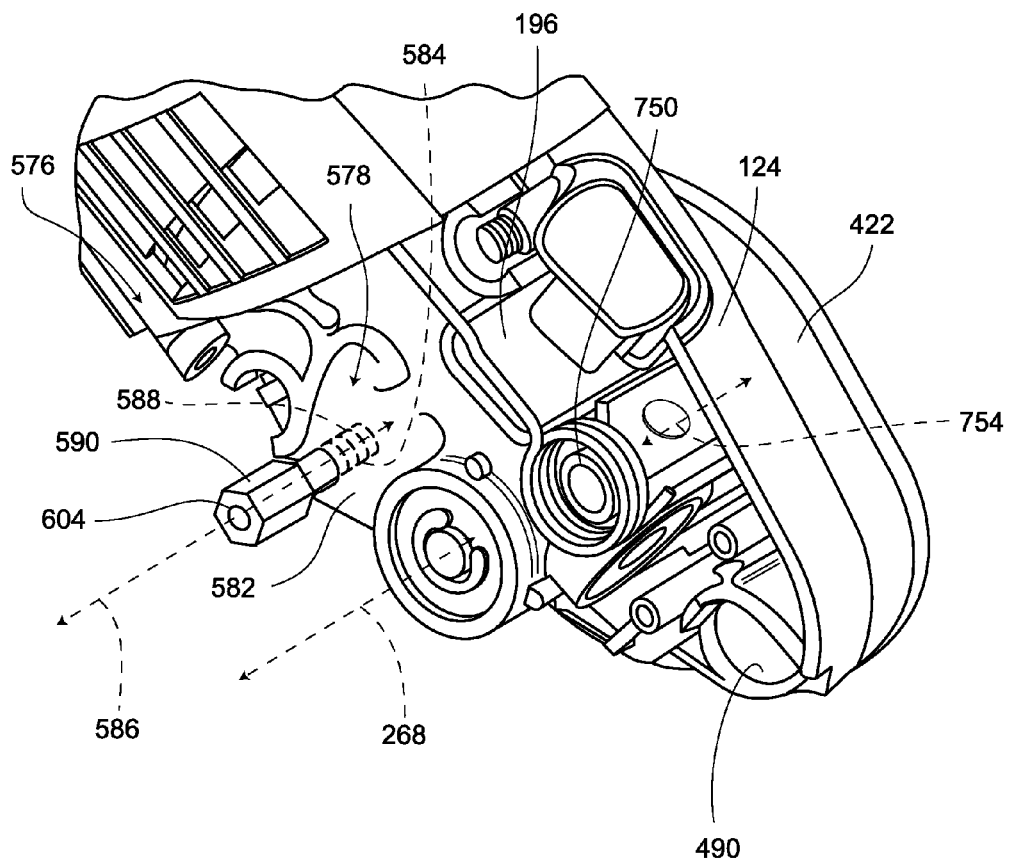
FIG. 29 is a perspective view of a portion of saw assembly of FIG. 1, showing a portion of a base lock assembly.

As shown in FIGS. 22 and 29, the saw assembly 100 includes a base lock assembly 576 having a clamp component 578 (FIG. 29) and a clamp actuator 580 (FIG. 22). With reference to FIG. 29, the clamp component 578 includes a clamping surface 582 and a bore structure 584 (shown in phantom). The clamping surface 582 is a portion of the gear housing 196 that surrounds the bore structure 584. The clamping surface 582 is generally flat and defines a plane that is perpendicular to the workpiece contact plane 434. The clamping surface 582 is positioned within the interior space 128.

The bore structure 584 is formed in the gear housing 196. The bore structure 584 defines a longitudinal axis 586 that is parallel to the axis of rotation 268. The bore structure 584 includes a plurality of internal threads 588 (shown in phantom). The internal threads 588 are left-handed threads.

Figure 30:
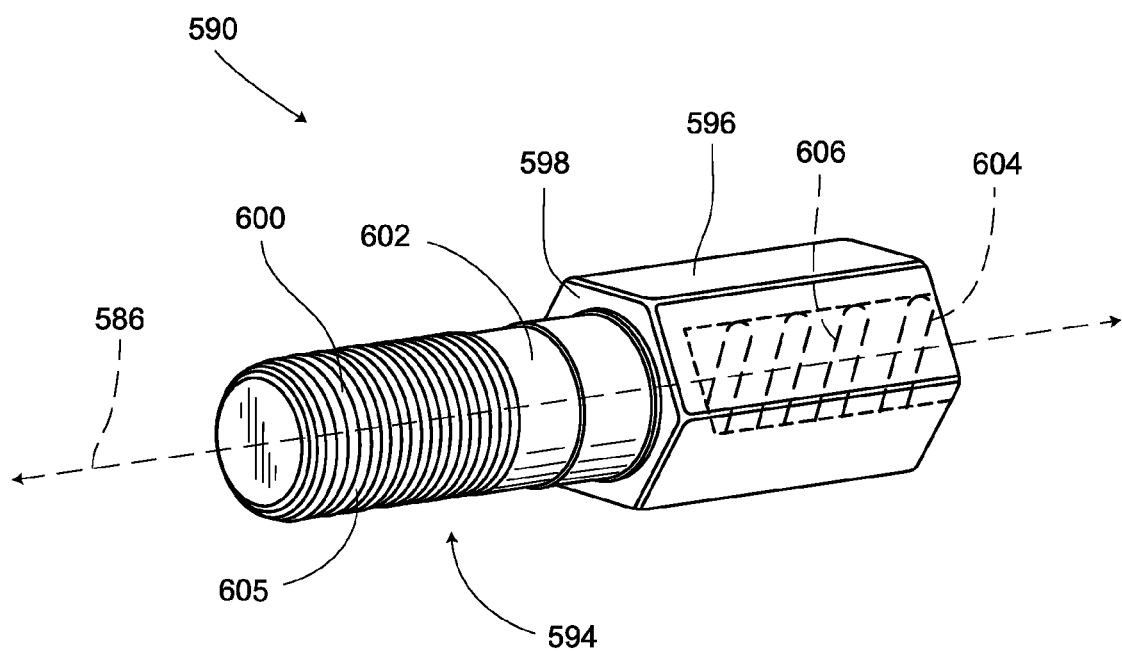
FIG. 30 is a perspective view of a clamp component of the base lock assembly of FIG. 29.

The clamp actuator 580 includes a clamp component 590 (FIG. 29) and a knob 592 (FIG. 22). With reference to FIG. 30, the clamp component 590 includes a post 594, a drive structure 596, and a clamping surface 598. The clamp component 590 is formed from metal. In other embodiments, however, the clamp component 590 is formed from injection molded thermoplastic or another hard material.

The post 594 is generally cylindrical and includes a threaded portion 600 and a smooth portion 602. The post 594 is approximately seventeen millimeters (17 mm) in length. The threaded portion 600 includes a set of external threads 605 and has a length of approximately ten millimeters (10 mm). The external threads 605 are "left-handed" threads that are sized to mesh with the internal threads 588 of the bore structure 584. The smooth portion 602 is positioned between the threaded portion 600 and the drive structure 596. The smooth portion 602 is generally cylindrical and has a length of approximately six millimeters (6 mm) and a diameter of approximately six millimeters (6 mm).

The drive structure 596 is positioned on an end of the clamp component 590 that is opposite the threaded portion 600. The drive structure 596 includes an exterior polygonal-shaped surface, which has six sides and can be driven by an eight millimeter (8 mm) wrench/spanner. The drive structure 596 has width that is wider than a width of the post 594 and a length of approximately nine millimeters (9 mm). The drive structure 596 defines an internally threaded bore 604 centered about a longitudinal axis 586 of the clamp component 590. The threaded bore 604 includes a set of "right-handed" internal threads 606.

The clamping surface 598 is positioned at the junction of the drive structure 596 and the post 594 and is defined by an end surface of the drive structure. The clamping surface 598 defines a plane that is parallel to the plane defined by the clamping surface 582.

Figure 31:
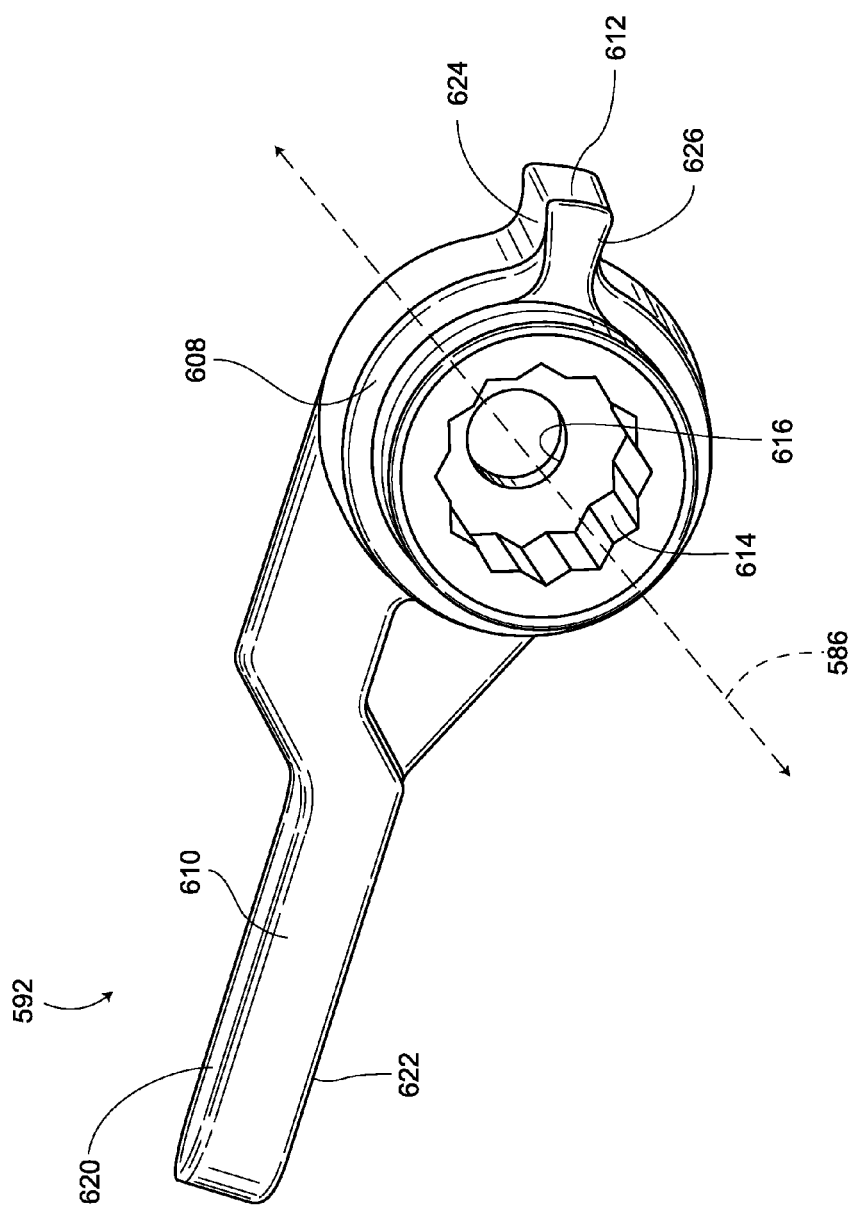
FIG. 31 is a perspective view of a knob of the base lock assembly of FIG. 29.

As shown in FIG. 31, the knob 592 includes a hub 608, a lever 610, and a tab 612 each of which is integrally formed from injection molded thermoplastic. The hub 608 includes a drive structure 614 and an opening 616. The drive structure 614 is correspondingly sized and shaped to mate with the drive structure 596. In particular, the drive structure 614 includes an interior polygonal-shaped surface that mates with the exterior polygonal-shaped surface of the drive structure 596.

The opening 616 extends through the hub 608 and is centered about the longitudinal axis 586 of the clamp component 590. A fastener 618 (FIG. 27) extends through the opening 616 and into the threaded bore 604 to connect the knob 592 to the clamp component 590. When the drive structure 614 is mated with the drive structure 596, rotation of the knob 592 results in rotation of the clamp component 590.

The lever 610 extends from a first side of the hub 608. The lever 610 defines a push surface 620 and a push surface 622. The push surfaces 620, 622 are contacted when rotation of the lever 610 is desired.

The tab 612 extends from a side of the hub 608 opposite the lever 610. The tab 612, which may also be referred to herein as a limiter, includes a contact surface 624 on one side of the tab and a contact surface 626 on an opposite side of the tab.

Figure 32:
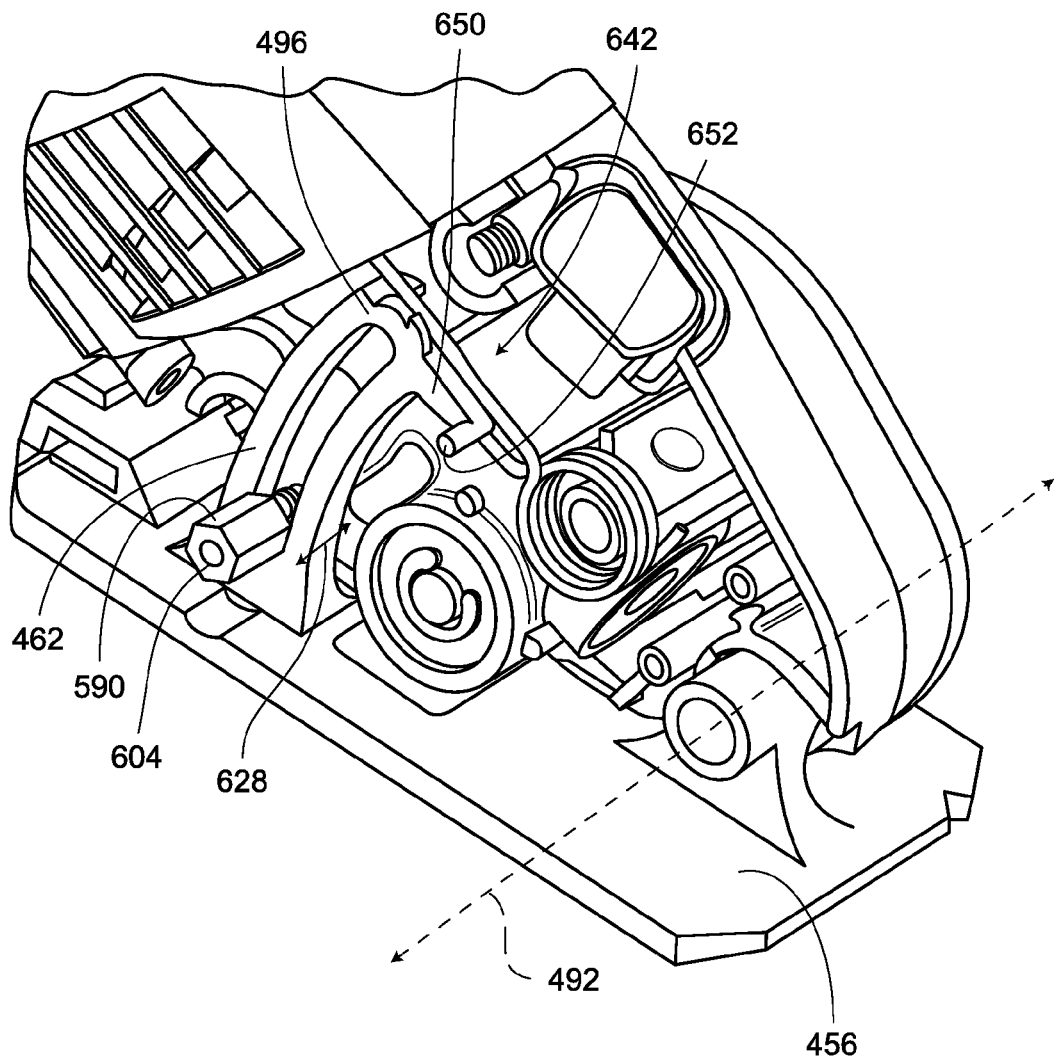
FIG. 32 is a perspective view of a portion of the saw assembly of FIG. 1 showing another portion of the base lock assembly of FIG. 29.

As shown in FIG. 32, when the clamping structure 590 is threadingly received by the bore structure 584, the extension structure 462 extends between the clamping surface 582 and the clamping surface 598. The extension structure 462 remains positioned between the clamping surface 582 and the clamping surface 598 during pivoting of the foot 456 relative to the housing 104

The clamp actuator 580 is rotatable between a first actuator position (an unclamped position) and a second actuator position (a clamped position). When the clamp actuator 580 is in the unclamped position the clamping surface 582 is spaced apart from the clamping surface 598 by an open distance. The open distance is greater than a width 628 of the extension structure 462, such that the extension structure is able to advance between the clamping surface 582 and the clamping surface 598 when the clamp actuator 580 is in the unclamped position. In the unclamped position the base 458 is pivotal about pivot axis 492 relative to the housing 104.

When the clamp actuator 580 is rotated counterclockwise to the clamped position, the clamping surface 598 advances toward the clamping surface 582. In particular, in the clamped position the clamping surface 598 is separated from the clamping surface 582 by a closed distance. The closed distance is less than the open distance and is approximately equal to the width 628 of the extension arm 462. The closed distance positions the clamping surface 598 and the clamping surface 582, such that the extension structure 462 is clamped between the clamping surface 598 and the clamping surface 582 so that pivoting of the base 458 relative to the housing 104 is inhibited.

As shown in FIG. 27, the housing 104 includes a limiter 630 that is positioned to interact with the tab 612 of the base lock assembly 576. In particular, the housing 104 includes a limiter 630 extending from an exterior surface of the lower left shell 120. The limiter 630 includes an arcuate structure 632 attached to the exterior surface. The arcuate structure 632 includes a contact surface 634 at one end and a contact surface 636 at the opposite end. If the arcuate structure 632 were extended to form a circle, a center point of the circle would be aligned with the longitudinal axis 586 of the clamp component 590.

The limiter 630 interacts with the tab 612 to prevent the clamp actuator 580 from being rotated beyond the clamped position and from being rotated beyond the unclamped position. In particular, rotation of the clamp actuator 580 in the clockwise direction (as viewed in FIG. 27) is prevented by physical interaction (i.e. contact) between the contact surface 624 of the tab 612 and the contact surface 634 of the limiter 630. Likewise, rotation of the clamp actuator 580 in the counterclockwise direction (as viewed in FIG. 27) is prevented by physical interaction (i.e. contact) between the contact surface 626 of the tab 612 and the contact surface 636 of the limiter 630.

The limiter 630 and the tab 612 prevent the clamp actuator 580 from becoming over tightened and under tightened. In particular, interaction between the contact surface 624 and the contact surface 634 prevents the clamp actuator 580 from being rotated to a position in which the clamp component 590 becomes separated from the bore structure 584. In this way, the clamp actuator 580 does not become lost or separated from the saw assembly 100. Additionally, the interaction between the contact surface 626 and the contact surface 636 ensures that the when these two surfaces 626, 636 meet the clamp actuator 580 applies a consistent clamping force to the extension structure 462. The consistent clamping force is one that has been determined to fix the pivotal position of the base 458 securely over the life of the saw assembly 100. Accordingly, the limiter 630 and the tab 612 prevents the clamp actuator 580 from being rotated to a rotational position that applies a damaging clamping force to the extension structure 462. The damaging clamping force deforms the extension structure 462 so that it does not pivot about the pivot axis 492 effectively.

Depth Gauge

As shown in FIG. 27, the saw assembly 100 includes a depth gauge assembly 640, which includes an indicator projection 642 (FIG. 32), an indicator opening 644, a first depth gauge portion 646, and a second gauge portion 648. With reference to the foot 456, as shown in FIG. 32, the indictor projection 642 includes an arm 650 and a marker 652. The arm 650 extends from the upper end portion 496 of the extension structure 462. The marker 652 extends from the arm 650 in a direction parallel to the pivot axis 492.

Referring again to FIG. 27, the opening 644 is formed in the lower left shell 120 of the housing 104. The opening 644 has a generally arcuate shape of approximately the same radius as the opening 498 in the extension structure 462. The marker 652 is positioned to extend through the opening 644. The position of the marker 652 within the opening 644 depends on the position of the foot 456 relative to the housing 104. In particular, when the foot 456 is in the position of minimum cutting depth (FIG. 33) the marker 652 is positioned at the bottom of the opening 644, and when the foot 456 is in the position of maximum cutting depth (FIG. 27) the marker 652 is positioned at the top of the opening 644.

The depth gauge portion 646 is positioned on a first side of the opening 644 and includes indicia denoting ⅛ inch, ¼ inch, ½ inch, and ¾ inch cutting depths. The depth gauge portion 648 is positioned on the second side of the opening 644 and includes indicia denoting 0 mm, 5 mm, 10 mm, 15 mm, and 20 mm cutting depths. Both the depth gauge portion 646 and the depth gauge portion 648 are integrally formed into the lower left shell 120.

The depth gauge assembly 640 is used to indicate the distance that the cutting wheel 296, 300 extends below the workpiece contact surface 466. For example, the foot 456 may be moved relative to the housing 104 until the marker 652 is aligned with a desired cutting depth as shown on the depth gauge portion 646 or the depth gauge portion 648. When the desired cutting depth is achieved, the foot 456 is locked in position relative to the housing 104 with the base lock assembly 576.

T-Square Accessory

Figure 34:
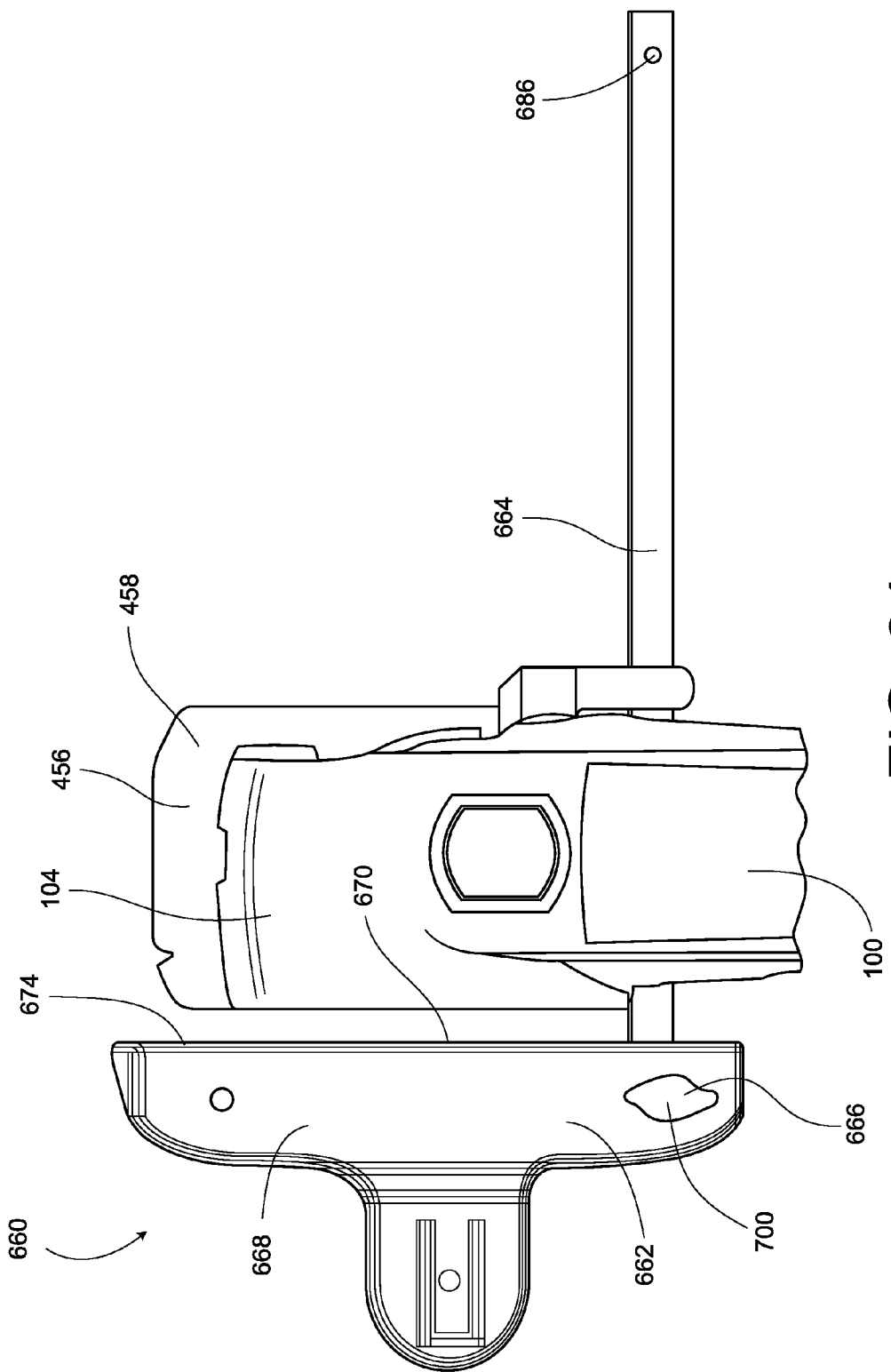
FIG. 34 is a top elevational view of a portion of the saw assembly of FIG. 1 having a T-square assembly attached thereto.
Figure 35:
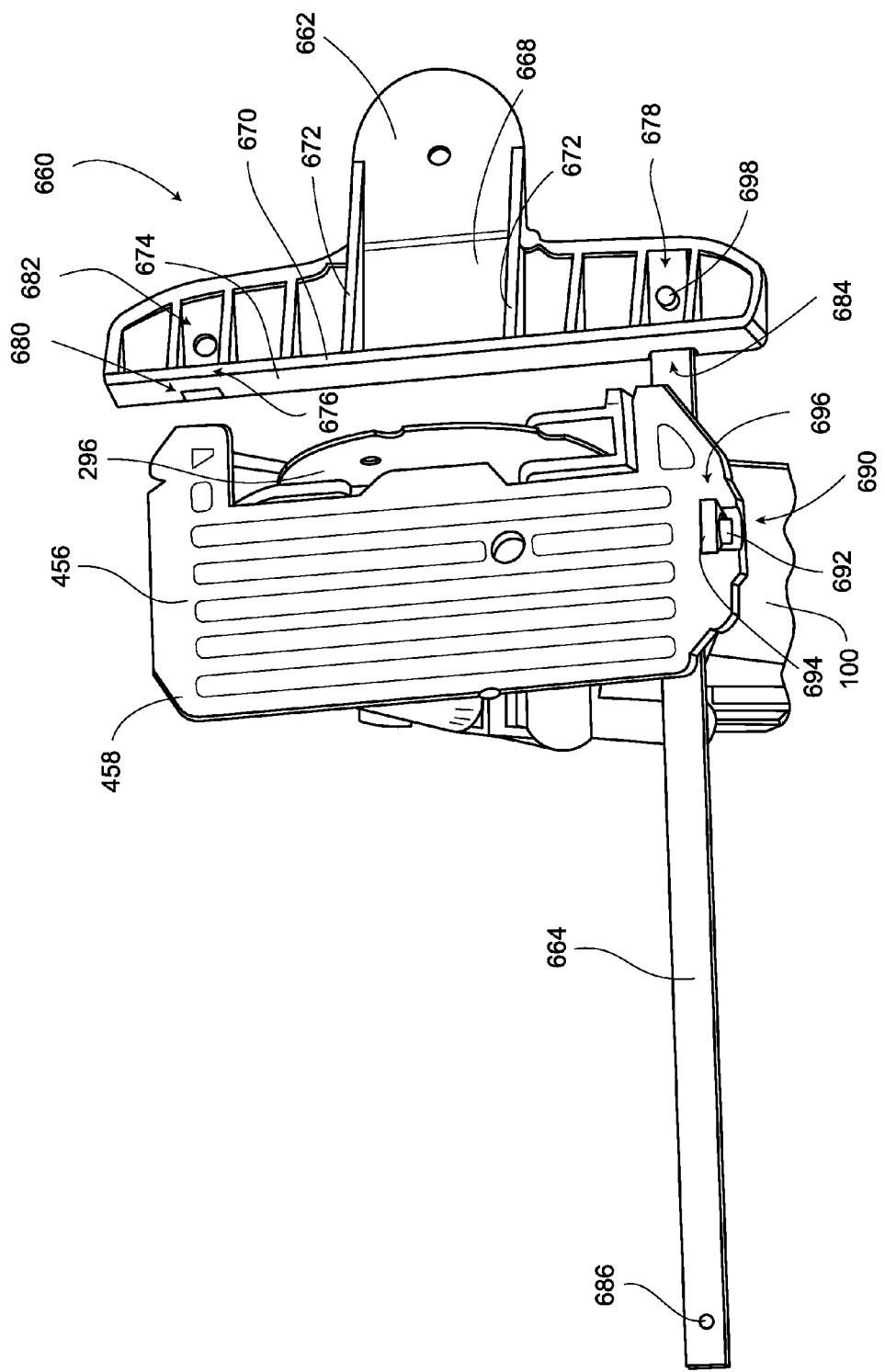
FIG. 35 is a bottom perspective view of a portion of the saw assembly of FIG. 1 and the T-square assembly of FIG. 34.
Figure 36:
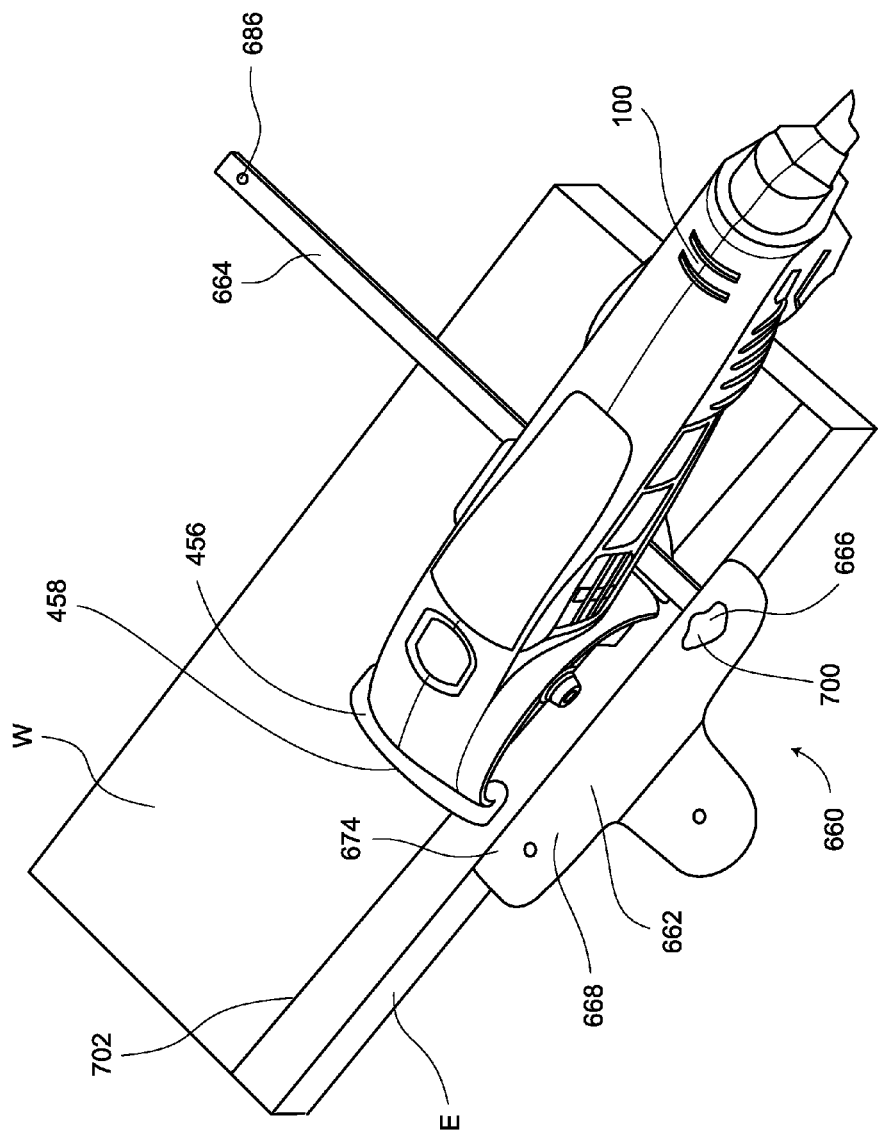
FIG. 36 is a top perspective view of the saw assembly of FIG. 1 and the T-square assembly of FIG. 34 part way though a workpiece cutting operation.

As shown in FIGS. 34 to 36, a T-square 660 may be used with the saw assembly 100. The T-square 660 includes a guide member 662 connected to a positioning rod 664 with a connector 666. The guide member 662 includes a body 668, a guide structure 670, and numerous support ribs 672. The body 668 is a generally flat member from which the guide structure 670 extends. The support ribs 672 are positioned to contact the body 668 and the guide structure 670, thereby increasing the rigidity of the guide member 662. The body 668, the guide structure 670, and the support ribs 672 are integrally molded together in a monolithic part formed from injection molded thermoplastic.

As shown in FIG. 35, the guide structure 670 defines a generally flat guide surface 674. The guide surface 674 is positioned against a workpiece W (see FIG. 36) when the T-square 660 is in use. The guide surface 674 is generally rectangular and has a length of approximately fifteen centimeters (15 cm) and a height of approximately two centimeters (2 cm). The guide surface 674 is free from protrusions or other irregularities that may interfere or prohibit sliding of the guide member 662 against the workpiece W.

The body 668 further defines a rod pocket 676 and a rod pocket 678. The rod pocket 676 defines an opening 680 in the guide structure 670 and an opening 682 in the body 668. The second rod pocket 678 defines an opening 684 in the guide structure 670 and a connector opening (not shown), which is substantially identical to the opening 682.

The positioning rod 664 is a generally straight rod having a generally rectangular cross section. The positioning rod 664 has a length of approximately 25 centimeters (25 cm), a width of approximately 1 centimeter (1 cm) and a thickness of approximately 0.3 centimeters (0.3 cm). The positioning rod 664 defines a threaded opening 686. Another threaded opening is positioned on the opposite end of the positioning rod 664, but is not visible since it is shown having received a portion of the connector 666. The positioning rod 664 is sized to extend through the opening 680 and the opening 684. The positioning rod 664 is formed from metal.

As shown in FIG. 35, the positioning rod 664 is received by the base 458. To this end, the base 458 defines a rod channel 688 (FIG. 3) and includes a connecting structure 690. The rod channel 688 has a length that is parallel to the axis of rotation 268.

The connecting structure 690 includes a fastener 692 and a clamp member provided as a square nut 694. The fastener 692 is threadingly received by the square nut 694. The connecting structure 690 is positioned within a clamp pocket 696 formed in the base 458. The clamp pocket 696 is fluidly connected to the rod channel 688, such that the fastener 692 is at least partially positionable within the rod channel.

The connector 666 includes a fastener 698 extending from a handle 700. The fastener 698 is sized to be threadingly received by the opening 686 in the positioning rod 664. The handle 700 is fixedly connected to the fastener 698.

As shown in FIG. 35, the T-square 660 is assembled and connected to the base 458 by inserting an end portion of the positioning rod 664 into the rod pocket 678. The rod pocket 678 is positioned such that when the positioning rod 664 is received therein, the positioning rod extends from the guide structure 670 in a direction that is perpendicular to the guide surface 674. Next, the connector 666 is used to connect the positioning rod 664 to the guide member 662. Thereafter, the positioning rod 664 is inserted into the rod channel 688 until the guide surface 674 is a predetermined distance from the cutting wheel 296. Thereafter, the fastener 698 is advanced into the rod channel 688 to fix the position of the positioning rod 664.

As shown in FIG. 36, with the T-square 660 connected to the saw assembly 100 a user may make rip cuts in a workpiece W along a desired cut path 702. In particular, to use the T-square 660 the guide surface 674 is positioned against an edge E of the workpiece W. Then the saw assembly 100 is energized and moved along the cut path 702 to advance the cutting wheel 296 through the workpiece W. By maintaining the guide surface 674 against the edge E, the cutting wheel 296 is advanced through the workpiece W by the predetermined distance from the edge E.

Attachment Structures

Figure 33:
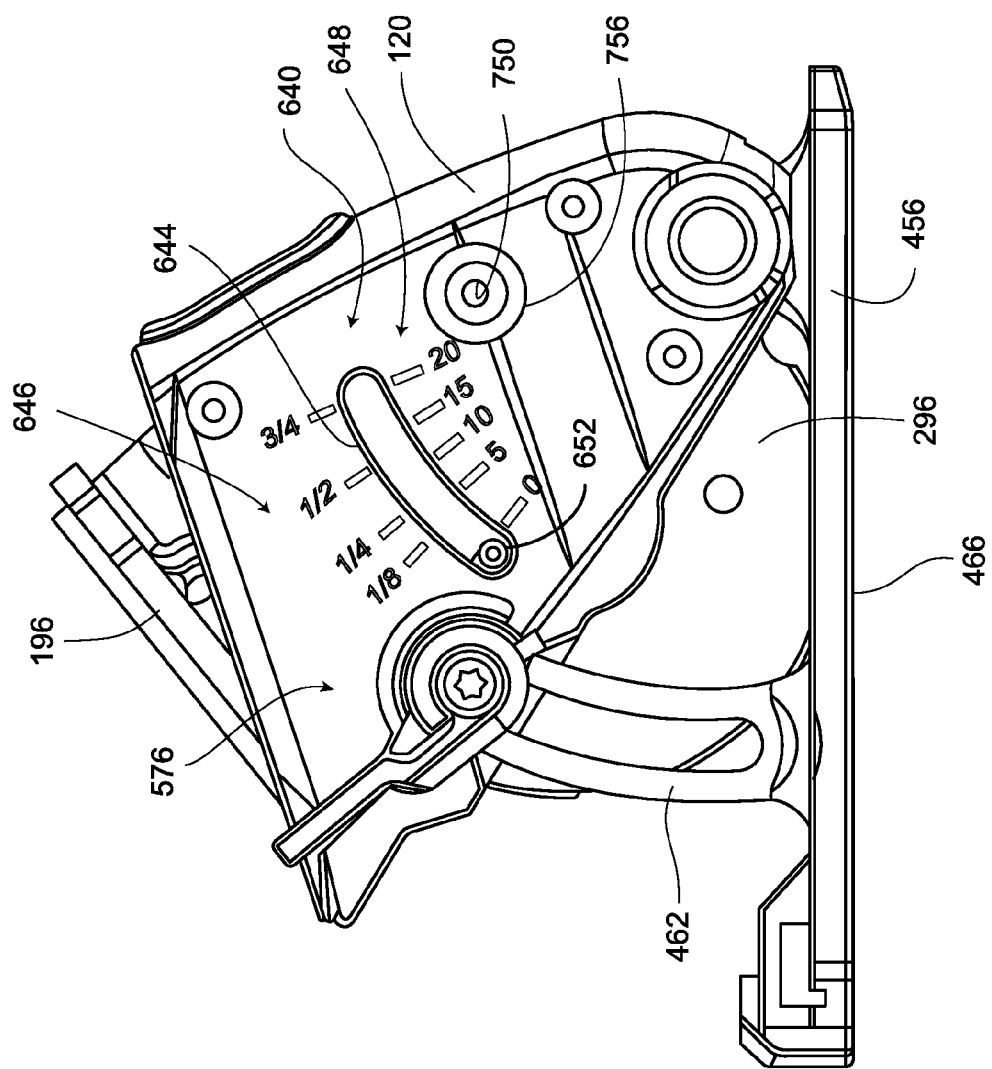
FIG. 33 is a side elevational view of a portion of the saw assembly of FIG. 1 showing a depth gauge and also showing the foot in the position minimum cutting depth.
Figure 37:
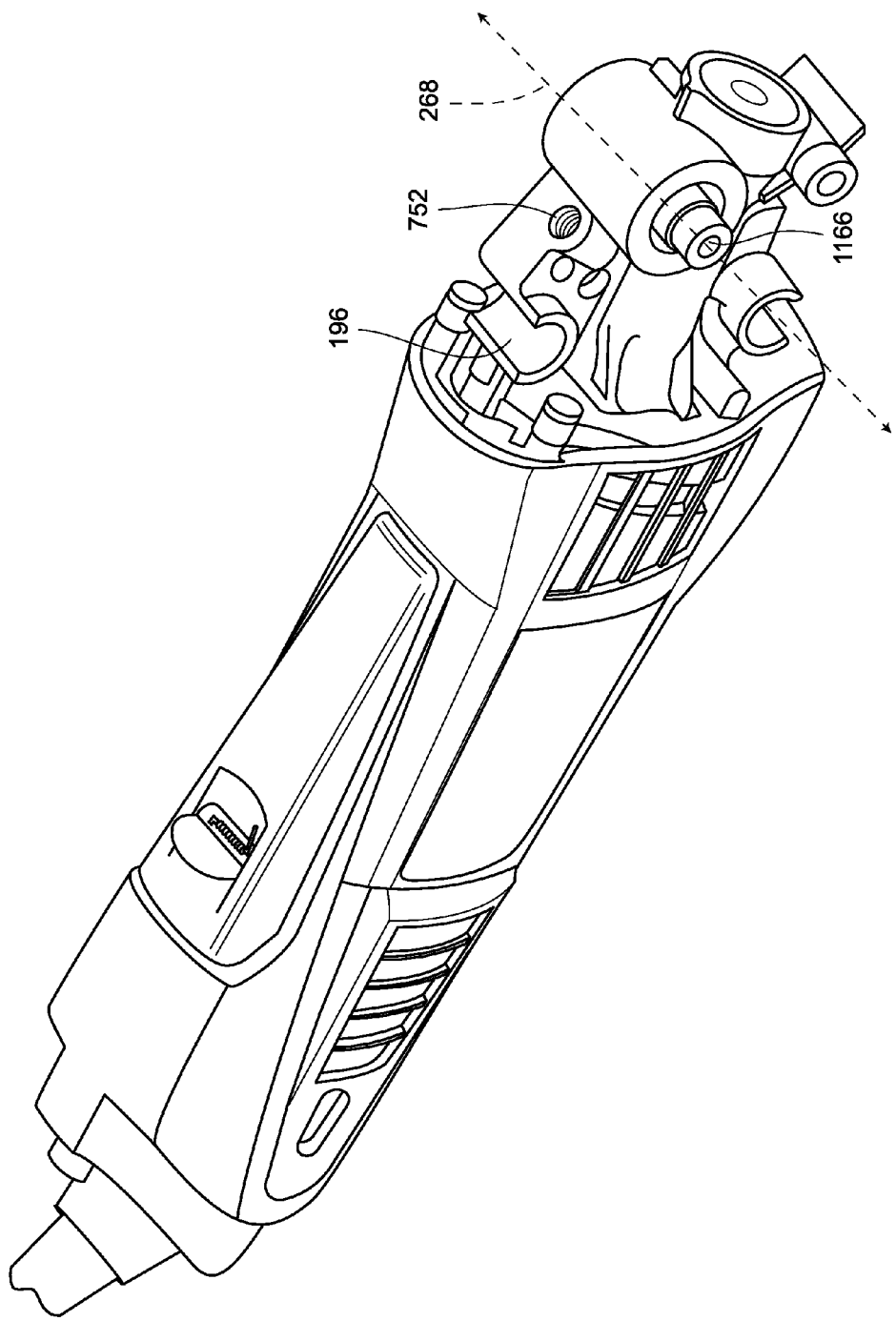
FIG. 37 shows a bottom perspective view of the saw assembly of FIG. 1 with a portion of a housing of the saw assembly removed to show a gear housing of the saw assembly.

As shown in FIGS. 29 and 37, the gear housing 196 includes an attachment bore 750 and an attachment bore 752. The attachment bore 750 defines a longitudinal axis 754 that is parallel to the axis of rotation 268. The attachment bore 750 includes a plurality of internal threads. As shown in FIG. 33, the lower left shell 120, defines a circular opening 756 having a center point positioned in alignment with the longitudinal axis 754.

As shown in FIG. 37, the attachment bore 752 is also formed in the gear housing 196. The attachment bore 752 includes a plurality of internal threads. As shown in FIG. 19, the base 458 defines an opening 758 that is positioned in alignment with the attachment bore 752 when the foot 456 is in the position of the maximum cutting depth. When the foot 456 is moved to positions other than the position of maximum cutting depth, the opening 758 is not positioned in alignment with the attachment bore 752. Both the attachment bore 750 and the attachment bore 752 have the same internal thread count/structure.

The attachment bore 750 and the attachment bore 752 are used to connect accessories (not shown) to the saw assembly 100 or to connect the saw assembly 100 to an accessory element. For example, a handle (not shown) having a shaft with a threaded tip may be threadingly received by the attachment bore 750 by inserting the shaft through the opening 756 and into the attachment bore.

Figure 38:
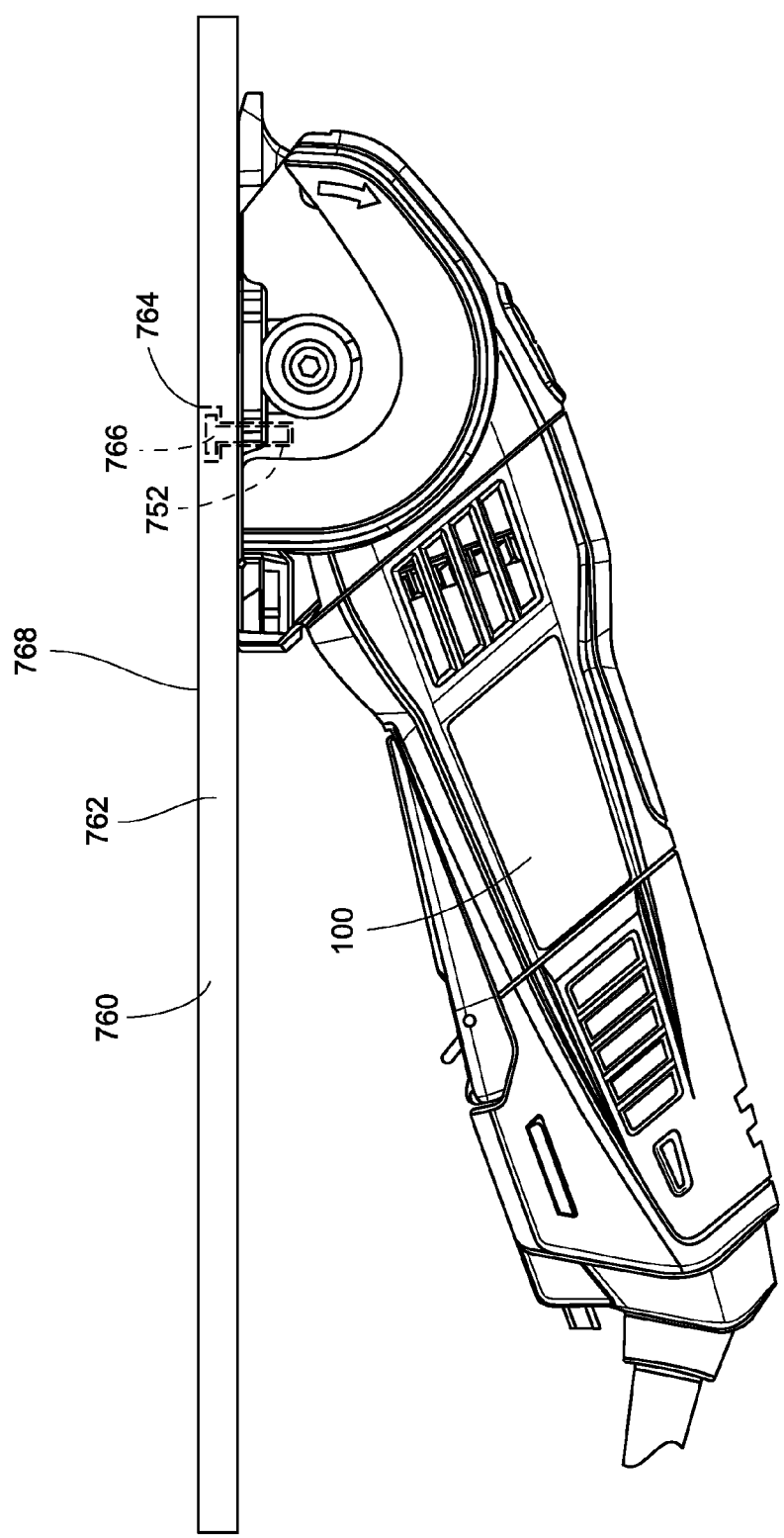
FIG. 38 is a side elevational view showing the saw assembly of FIG. 1 connected to a table saw assembly.

As shown in FIG. 38, for example, the attachment bore 752 may be used to connect the saw assembly 100 to a table saw assembly 760. The table saw assembly 760 includes a table 762 defining a countersunk bore 764 and a cutting wheel opening (not shown). The saw assembly 100 is connected to the table 762 by first positioning the foot 456 in the position of maximum cutting depth. Next, a fastening member 766 is inserted through the bore 764 in the table 762, through the opening 758 in the base 458, and into the threaded bore 752. With the saw assembly 100 connected to the table 762, the cutting wheel 296 (not shown in FIG. 38) extends through the cutting wheel opening and is positioned above a workpiece support surface 768 of the table 762. The saw assembly 100 and table saw assembly 760 are used to cut workpieces W in a manner similar to table saws known to those of ordinary skill in the art.

Miter Cutting Guide Accessory

Figure 39:
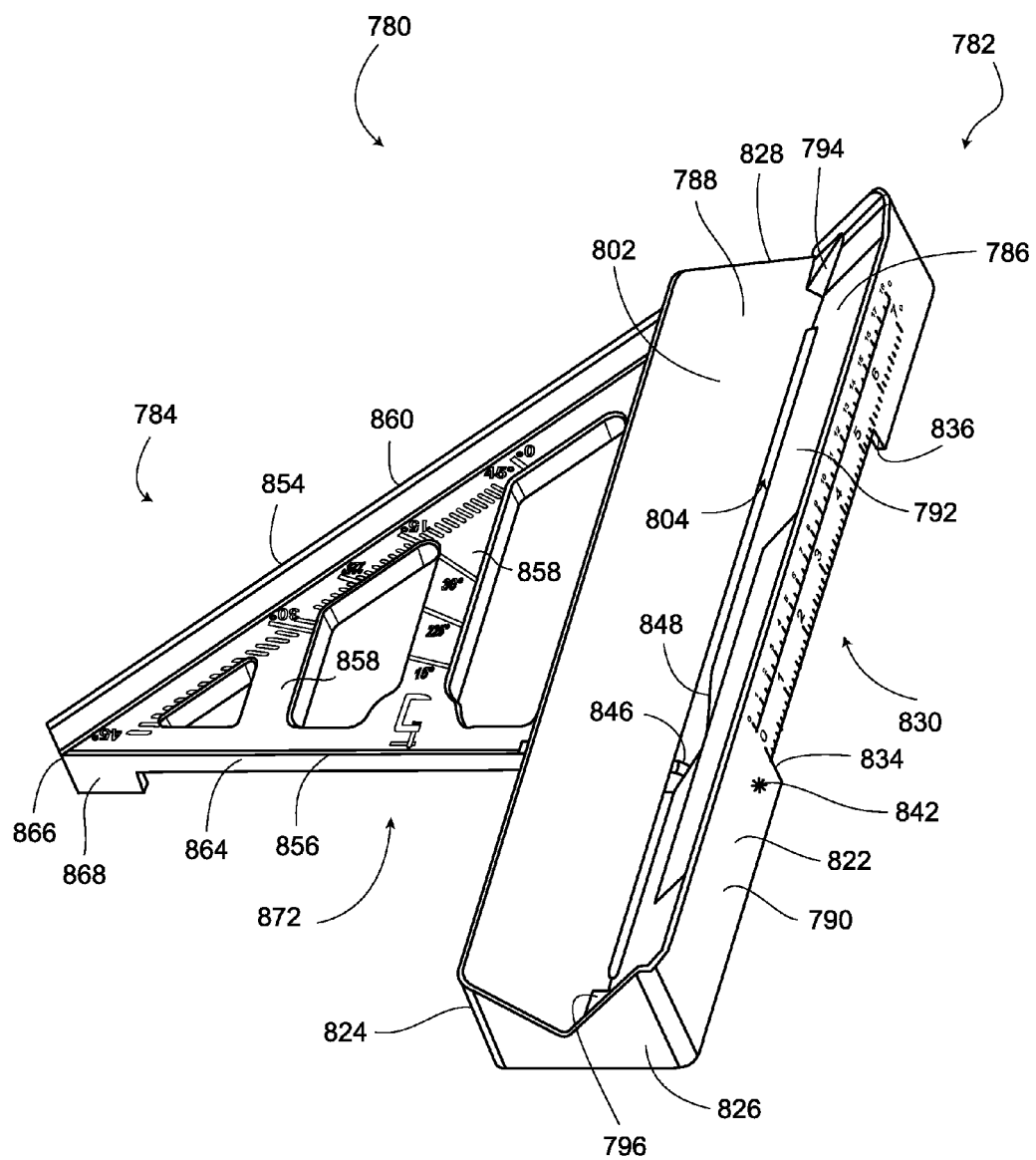
FIG. 39 shows a top perspective view of a cutting guide for use with the saw assembly of FIG. 1.
Figure 40:
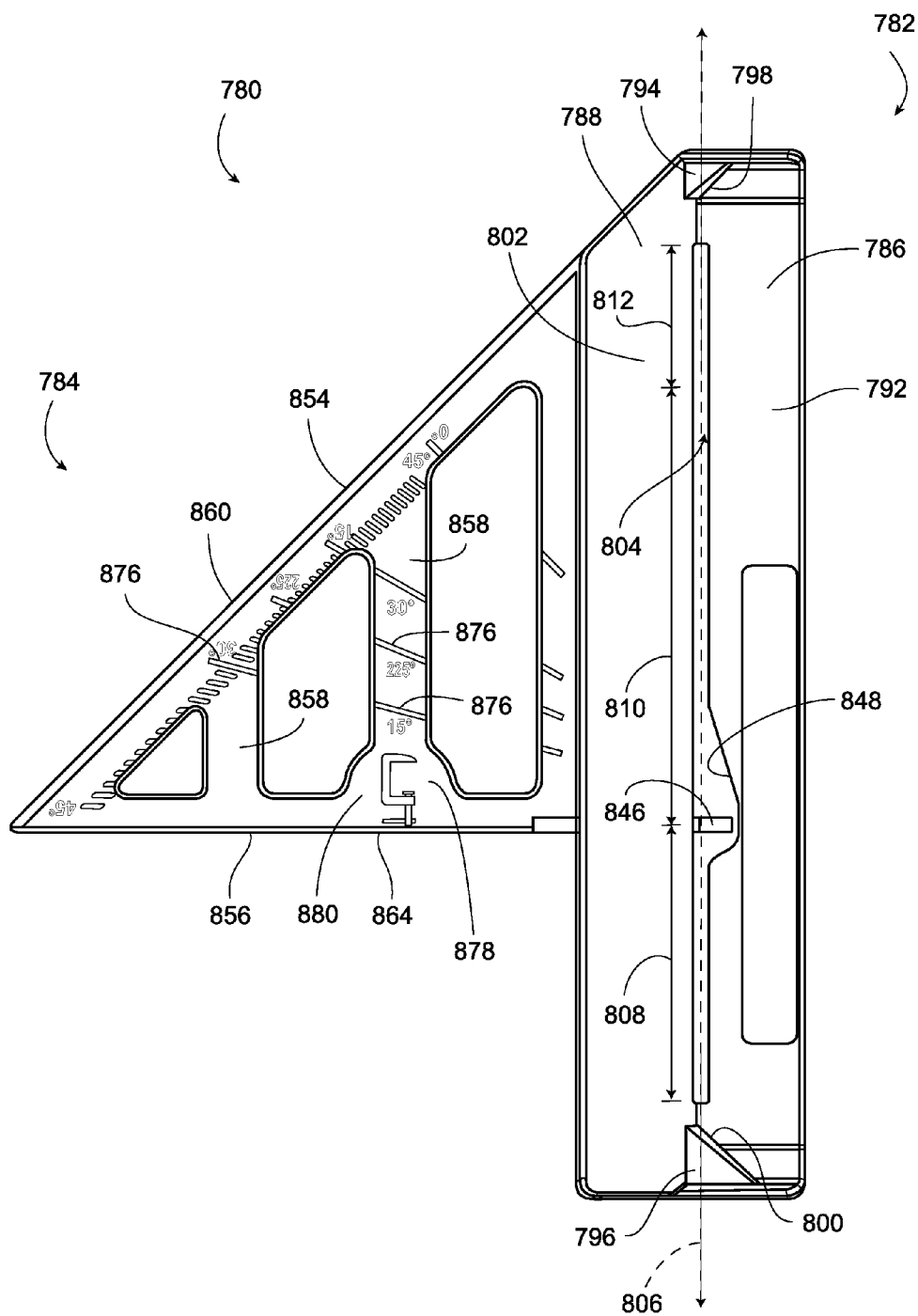
FIG. 40 shows a top plan view of the cutting guide of FIG. 39.

As shown in FIGS. 39 and 40, a cutting guide 780 is provided for use with the saw assembly 100. The cutting guide 780 includes a guide structure 782 and a guide structure 784. The cutting guide 780 is formed from injection molded thermoplastic. The guide structure 782 is provided as a bevel cutting guide. The guide structure 784 is provided as a miter cutting guide.

The guide structure 782 includes a saw support 786 and a saw support 788, both of which are attached to a base 790. The saw support 786 defines a saw contact surface 792, a step structure 794, and a step structure 796. The saw contact surface 792 is a generally flat surface that is positioned in a plane.

The step structure 794 is offset from the saw contact surface 792 and is positioned at a first end of the saw support 786. The step structure 796 is also offset from the saw contact surface 792 and is positioned at an opposite end of the saw support 786. The saw contact surface 792 extends between the step structure 794 and the step structure 796. The step structure 794 and the step structure 796 each define a contact surface 798, 800 that is positioned perpendicular to the plane defined by the saw contact surface 792.

The saw support 788 defines another saw contact surface 802. The saw contact surface 802 is a generally flat surface that is positioned in a plane. The plane defined by the saw contact surface 792 intersects the plane defined by the saw contact surface 802 to define an angle of intersection having a magnitude of ninety degrees (90°). In other embodiments, the angle of intersection has a magnitude greater than eighty degrees (80°) and less than one hundred degrees) (100°).

The saw contact surface 802 is spaced apart from the saw contact surface 792 so as to define a window or an elongated cutting slot 804 therebetween. The cutting slot 804 is oriented along a slot axis 806 and includes a first slot portion 808, a second slot portion 810, and a third slot portion 812. The second slot portion 810 is contiguous with the first slot portion 808 and the third slot portion 812. The second slot portion 810 is interposed between the first slot portion 808 and the third slot portion 812.

Figure 41:
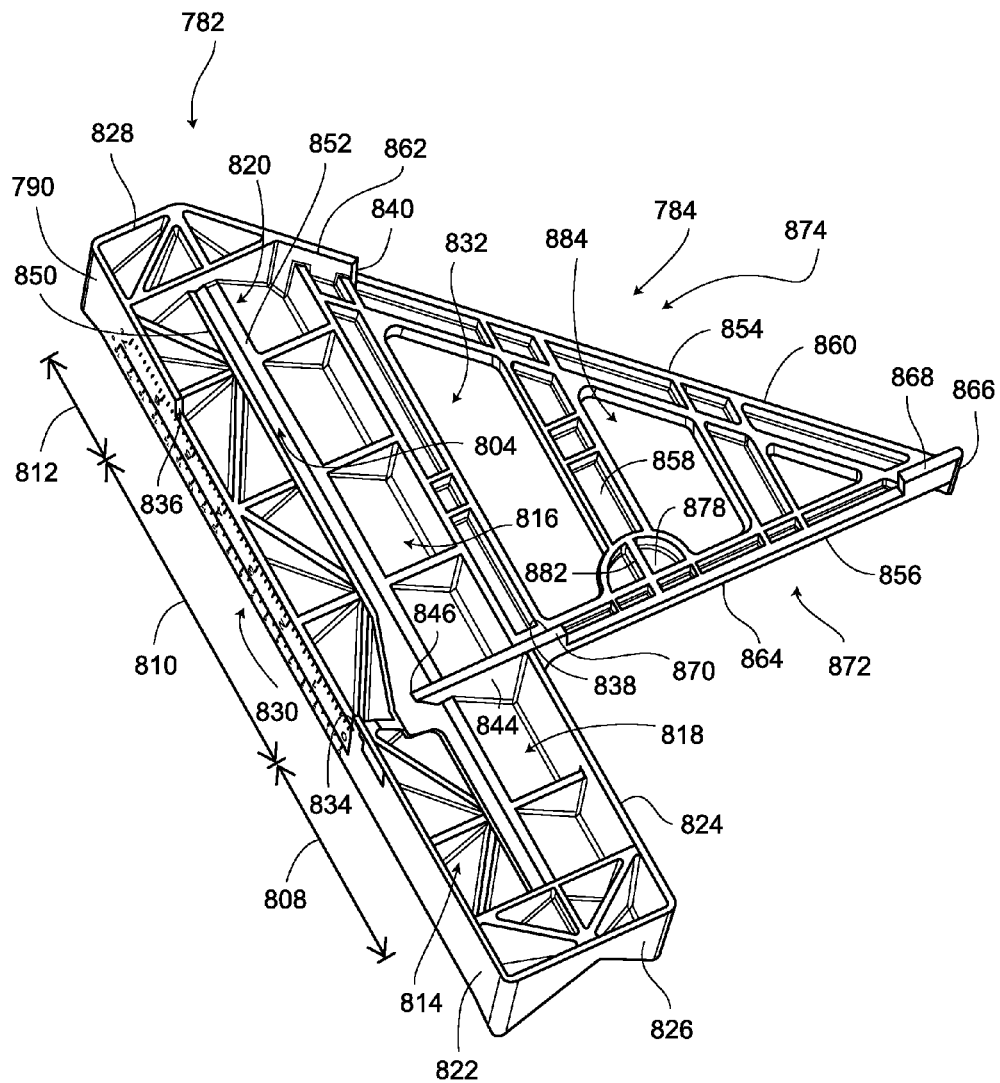
FIG. 41 shows a bottom perspective view of the cutting guide of FIG. 39.

As shown in FIG. 41, the base 790 of the guide structure 782 defines a first cavity 814 positioned below the cutting slot 804. The first cavity 814 includes a first workpiece space 816, a first cutting member start space 818 positioned on a first side of the first workpiece space 816, and a first cutting member end space 820 positioned on an opposite second side of the first workpiece space 816. The first workpiece space 816 is positioned below the second slot portion 810 and receives a workpiece W to be cut by the saw assembly 100 during a cutting operation. The first cutting member start space 818 is positioned below the first slot portion 808 and is where the cutting wheel 300 is positioned at the beginning of the cutting operation. The first cutting member end space 820 is positioned below the third slot space 812 and is where the cutting wheel 300 is positioned at the end of the cutting operation.

The base 790 of the guide structure 782 includes first sidewall 822, a second sidewall 824, and end wall 826, and an end wall 828. The first sidewall 822 and the second sidewall 824 are positioned generally parallel to each other. The end wall 826 extends between the first sidewall 822 and the second sidewall 824 at an end portion of the guide structure 782.

The end wall 828 is positioned at an opposite end portion of the guide structure 782 and extends between the first sidewall 822 and the second sidewall 824.

As shown in FIG. 41, the base 790 of the guide structure 782 defines the first workpiece space 816. Specifically, the workpiece space 816 defined by a first workpiece passage 830 and a second workpiece passage 832. The first workpiece passage 830 is formed in the first sidewall 822 and is defined by a first lateral passage surface 834 that is spaced apart from a second lateral passage surface 836. The second workpiece passage 832 is formed in the second sidewall 824 and is defined by a third lateral passage surface 838 that is spaced apart from a fourth lateral passage surface 840. The first workpiece passage 830 is spaced apart from the second workpiece passage 832 so as to define the first workpiece space 816 therebetween.

The guide structure 782 further includes a guide wall 844 to assist in positioning the cutting guide 780 on a workpiece W. The guide wall 844 is positioned in the cavity 814 and defines a first guide surface portion 846. The guide surface portion 846 is positioned under the cutting slot 804. The guide surface portion 846 and the first lateral passage surface 834 are positioned in a plane that includes both surfaces. The slot axis 806 (FIG. 40) is perpendicular to the plane in which the first lateral passage 834 and the guide surface portion 846 are positioned.

As shown in FIG. 40, the saw support 786 defines a cutout 848 in the saw contact surface 792. The cutout 848 is contiguous with the cutting slot 804. The guide surface portion 846 is positioned under the cutout 848 so that visualization of the guide surface portion is enhanced.

As shown in FIG. 39, the base 790 includes a reference indicia mark 842 positioned on the first sidewall adjacent the first lateral passage surface. The reference indicia mark 842 indicates a pivot point for use with the guide structure 784, as described below.

As shown in FIG. 41, the saw support 786 also defines a first workpiece contact surface 850 and a second workpiece contact surface 852. The first workpiece contact surface 850 is an underside portion of the saw support 786 and is generally parallel to the cutting slot 804. The second workpiece contact surface 852 is an underside portion of the saw support 788 and is generally parallel to the cutting slot 804. The workpiece contact surface 850 and the workpiece contact surface 852 are positioned in the cavity 814. It is noted that the cutting slot 804 may be defined by the first workpiece contact surface 850 being spaced apart from the second workpiece contact surface 852.

As shown in FIG. 39, the guide structure 784 extends from the guide structure 782 and includes a first guide wall 854, a second guide wall 856, and numerous support ribs 858 that extend between the first guide wall and the second guide wall. The first guide wall 854 extends from the base 790 and defines a first guide surface 860. The first guide wall 854 includes a leg 862 (FIG. 41) attached the base 790. The leg 862 supports the guide structure 784 during use of the cutting guide 780.

The second guide wall 856 extends from the base 790 and defines a second guide surface 864. The second guide wall 856 extends perpendicularly from the second sidewall 856 of the base 790. The second guide wall 856 intersects the first guide wall 854 to define a corner 866.

The second guide wall 856 includes a leg 868 and a leg 870 (FIG. 41). The leg 868 extends downwardly from the second guide wall 856 and, in particular, extends downwardly from the corner 866. The leg 870 extends downwardly from the second guide wall 856. The leg 868 and the leg 870 are spaced apart to define a third workpiece passage 872. The leg 868 and the leg 862 are spaced apart to define a fourth workpiece passage 874.

The first guide wall 854 and the second guide wall 856 form an angle having a magnitude between thirty degrees (30°) and sixty degrees (60°). The angle between the first guide wall 854 and the second guide wall 856 is forty five degrees (45°). The angle between the first guide wall 854 and the second guide wall 856 is used to make miter cuts in the workpiece W at the angle. The guide structure 784 includes numerous reference indicia 876 (FIG. 40) and magnitudes formed on the first guide wall 854, the second guide wall 856, and the ribs 858. The second indicia 876 are used to position the guide structure 784 when making cuts that are different than the angle between the first guide wall 856 and the second guide wall 856.

The guide structure 784 further includes a clamp structure 878 extending from the second guide wall 856. The clamp structure 878 includes a flat clamp surface 880 and numerous support ribs 882. The clamp structure 878 receives a clamping force, which connects the cutting guide 780 to a workpiece W. The flat clamp surface 880 typically contacts a clamp member and the support ribs 882 increase the structural integrity of the cutting guide 780 so that it is not deformed or otherwise damage as a result of the clamping force.

As shown in FIG. 41, the guide structure 784 includes a second workpiece space 884 that receives a workpiece W. The second workpiece space 884 is defined by the third workpiece passage 872 and the fourth workpiece passage 874. The second workpiece space 884 is aligned with the first workpiece space 816, such that a workpiece W extending through the first workpiece passage 830 extends through the first workpiece space and the second workpiece space.

Figure 42:
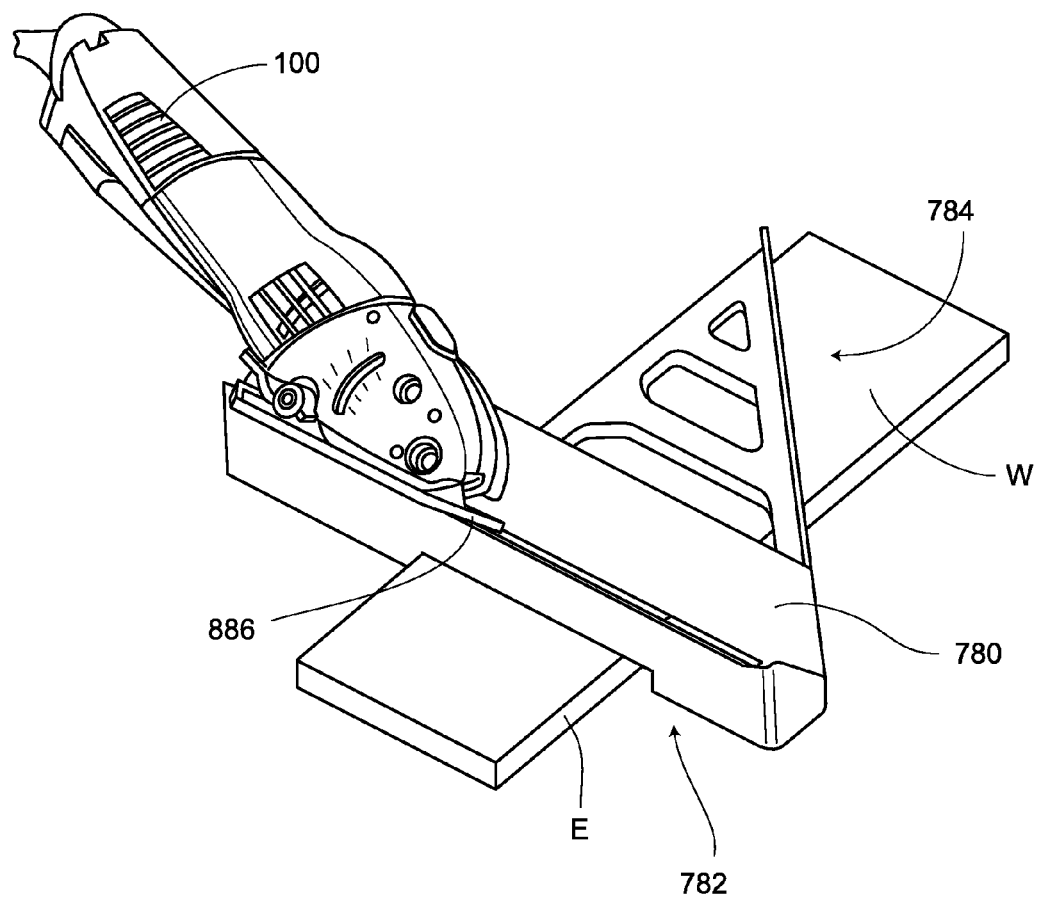
FIG. 42 shows a top perceptive view of the saw assembly of FIG. 1 and the cutting guide of FIG. 39, the saw assembly positioned to make a bevel cut through a workpiece.
Figure 43:
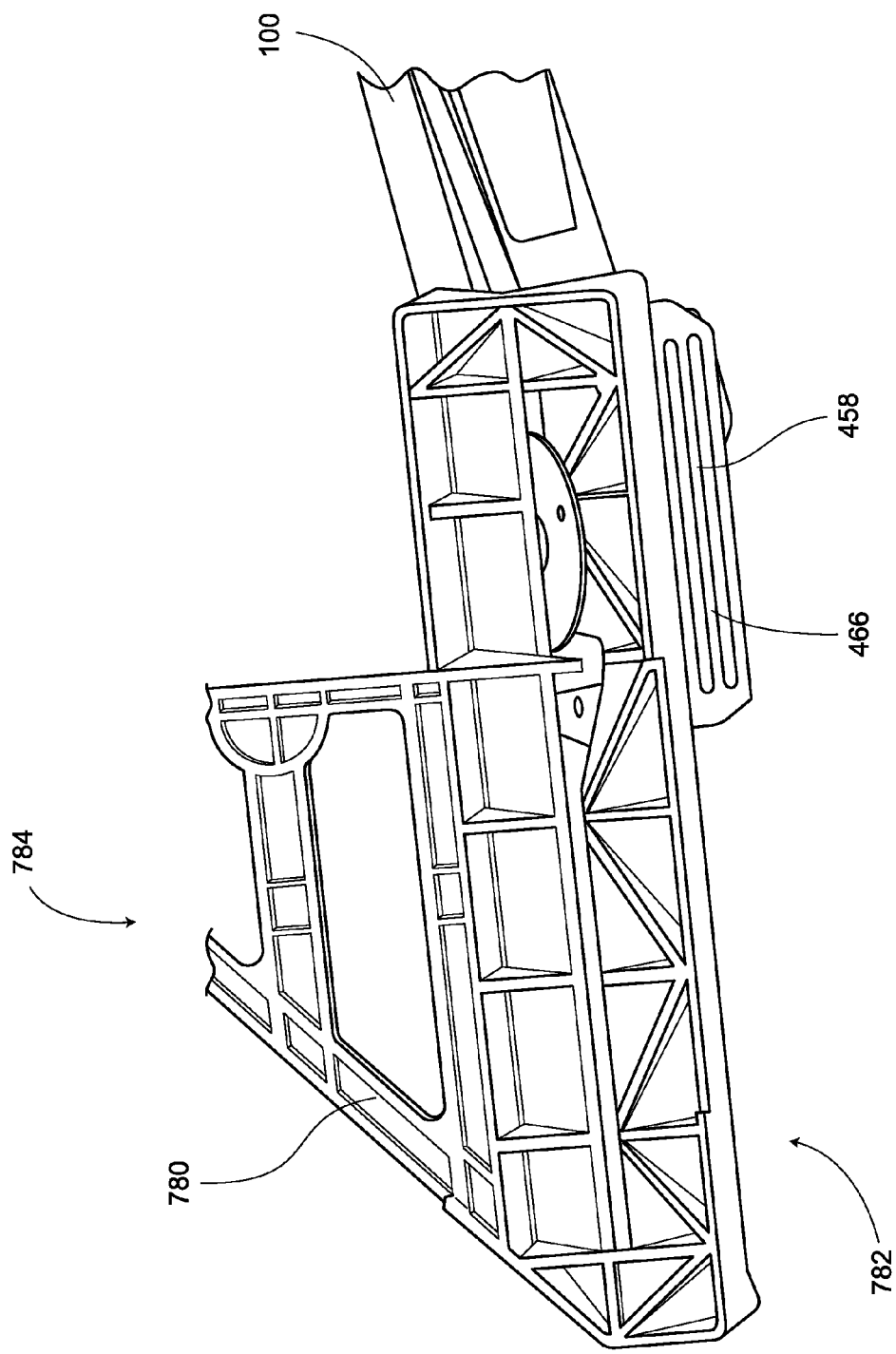
FIG. 43 shows a bottom perspective view of the saw assembly of FIG. 1 and the cutting guide of FIG. 39, with the cutting wheel of the saw assembly extending through a cutting slot of the cutting guide.

As shown in FIGS. 42 and 43, in operation, the cutting guide 780 is used to make bevel cuts and miter cuts on a workpiece W with the saw assembly 100 being equipped with the flush cutting wheel 300. The guide structure 782 is used to make a bevel cut. First, the workpiece W is positioned in the workpiece space 816. The workpiece W is positioned against the first lateral passage surface 834, the guide wall 844, the leg 868, the first workpiece contact surface 850, and the second workpiece contact surface 852. This arrangement positions the cutting slot 804 perpendicularly to the edge E of the workpiece W.

Next, the user "fine tunes" the position of the cutting guide 780 on the workpiece W. To do this, the user looks through the cutout 848 and locates first guide surface portion 846. The guide surface portion 846 is positioned a predetermined distance from the desired cutting path through the workpiece W. Accordingly, the position of the cutting guide 780 is adjusted until the guide surface portion 846 is the predetermined distance from the desired cutting path. Thereafter, a clamp (not shown) is affixed to the clamp structure 878 and the workpiece W to prevent further movement of the cutting guide 780 relative to the workpiece.

The user next positions the saw assembly 100 on the cutting guide 780 with the workpiece contact surface 466 of the foot 456 positioned against the first saw contact surface 792 and with the flange 428 positioned against the second saw contact surface 802. The first guide structure 782 supports the saw assembly 100 on two sides to ensure that the saw assembly 100 is maintained at the proper bevel angle for the duration of the cut.

As shown in FIG. 43, the flush cutting wheel 300 extends though the cutting slot 804 into the cutting member start space 818 of the cavity 814. The start space 818 of the cavity 814 provides the user with a region in which the saw assembly 100 can be energized to bring the cutting wheel 300 up to full rotational speed without the cutting wheel being in contact with the workpiece W. After the saw assembly 100 is energized the saw assembly 100 is moved toward the end wall 828 through the workpiece to cut the workpiece at a bevel angle of forty five degrees (45°).

The saw assembly 100 is moved toward the end wall 828 with the workpiece contact surface 466 positioned against the first saw contact surface 792 until the leading sidewall 886 of the foot 456 contacts the step structure 794, which is positioned to stop any additional forward movement of the saw assembly 100. At this point the cutting operation is complete and the user may release the paddle 344 to deenergize the electric motor 136. It is noted that the step structure 796 stops movement of the saw assembly 100 in the reward direction by contacting a trailing sidewall 888 of the base 458.

The guide structure 784 is used to make miter cuts with the saw assembly 100. To prepare the saw assembly 100 to make miter cuts the user typically connects the flat cutting wheel 296 to the arbor assembly 148; although, the flush cutting wheel 300 is also usable. Next, the cutting guide 780 is positioned on the workpiece W. In particular, the workpiece W is positioned against the guide wall 844 and the leg 868 in the first workpiece space 816 and the second workpiece space 884. Next the flange 428 is positioned against the first guide surface 860. Thereafter, the rotating cutting wheel 296 is moved through the workpiece with the flange 428 being maintained against the first guide surface 860.

In the above configuration, the first guide surface 860 is positioned to make a forty five degree (45°) miter cut through the workpiece. The cutting guide 780 is pivotable about the first lateral passage surface 834 to a desired cutting angle as indicated by the indicia 876.

Crown Molding Cutting Guide

As shown in FIGS. 44 to 47, a cutting guide 900 is provided for use with the saw assembly 100. The cutting guide 900 includes a first guide structure 902 connected to a second guide structure 904 by an intermediate part 906. The cutting guide 900 is formed from injection molded thermoplastic.

Figure 44:
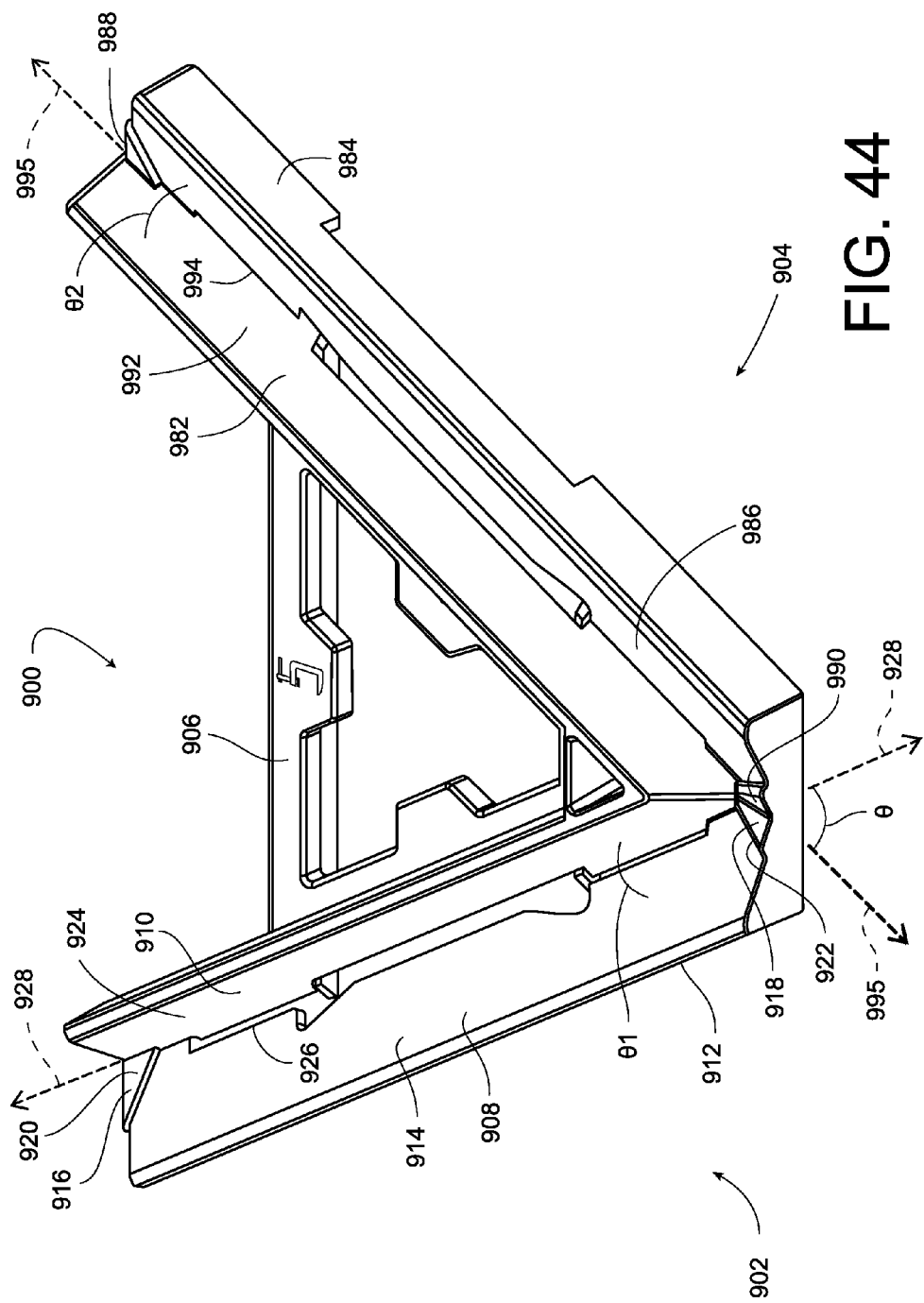
FIG. 44 shows a top perspective view of a cutting guide for use with the saw assembly of FIG. 1.

As shown in FIG. 44, the first guide structure 902 includes a first saw support 908 and a second saw support 910, both of which are attached to a base 912. The first saw support 908 defines a first saw contact surface 914, a first step structure 916, and a second step structure 918. The first saw contact surface 914 is a generally flat surface that is positioned in a plane.

The first step structure 916 is offset from the first saw contact surface 914 and is positioned at a first end of the first saw support 908. The second step structure 918 is also offset from the first saw contact surface 914 and is positioned at an opposite second end of the first saw support 908. The first step structure 916 and the second step structure 918 each define a contact surface 920, 922 that is positioned perpendicular to the plane defined by the first saw contact surface 914.

The second saw support 910 defines a second saw contact surface 924. The second saw contact 924 surface is a generally flat surface that is positioned in a plane. The plane defined by the first saw contact surface 914 intersects the plane defined by the second saw contact surface 924 to define an angle of intersection Θ1 having a magnitude of ninety degrees (90°). In other embodiments, the angle of intersection Θ1 has a magnitude greater than eighty degrees (80°) and less than one hundred degrees (100°).

Figure 45:
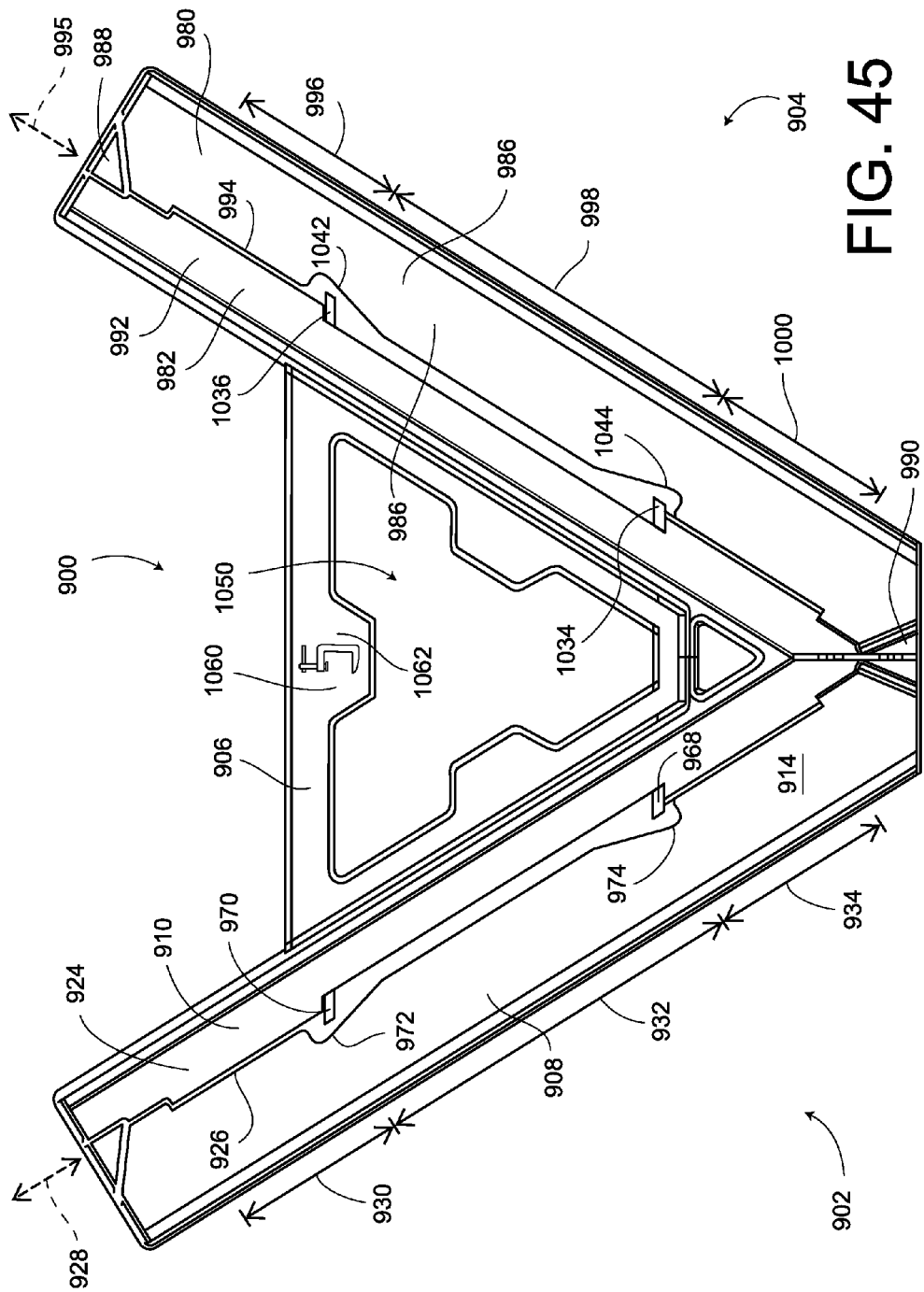
FIG. 45 shows a top plan view of the cutting guide of FIG. 44.

As shown in FIG. 45, the second saw contact surface 924 is spaced apart from the first saw contact surface 914 to as to define a first elongated cutting slot 926 therebetween. The cutting slot 926 is oriented along a slot axis 928 and includes a first slot portion 930, a second slot portion 932, and a third slot portion 934. The second slot portion 932 is contiguous with the first slot portion 930 and the third slot portion 934. The second slot portion 932 is interposed between the first slot portion 930 and the third slot portion 934.

Figure 47:
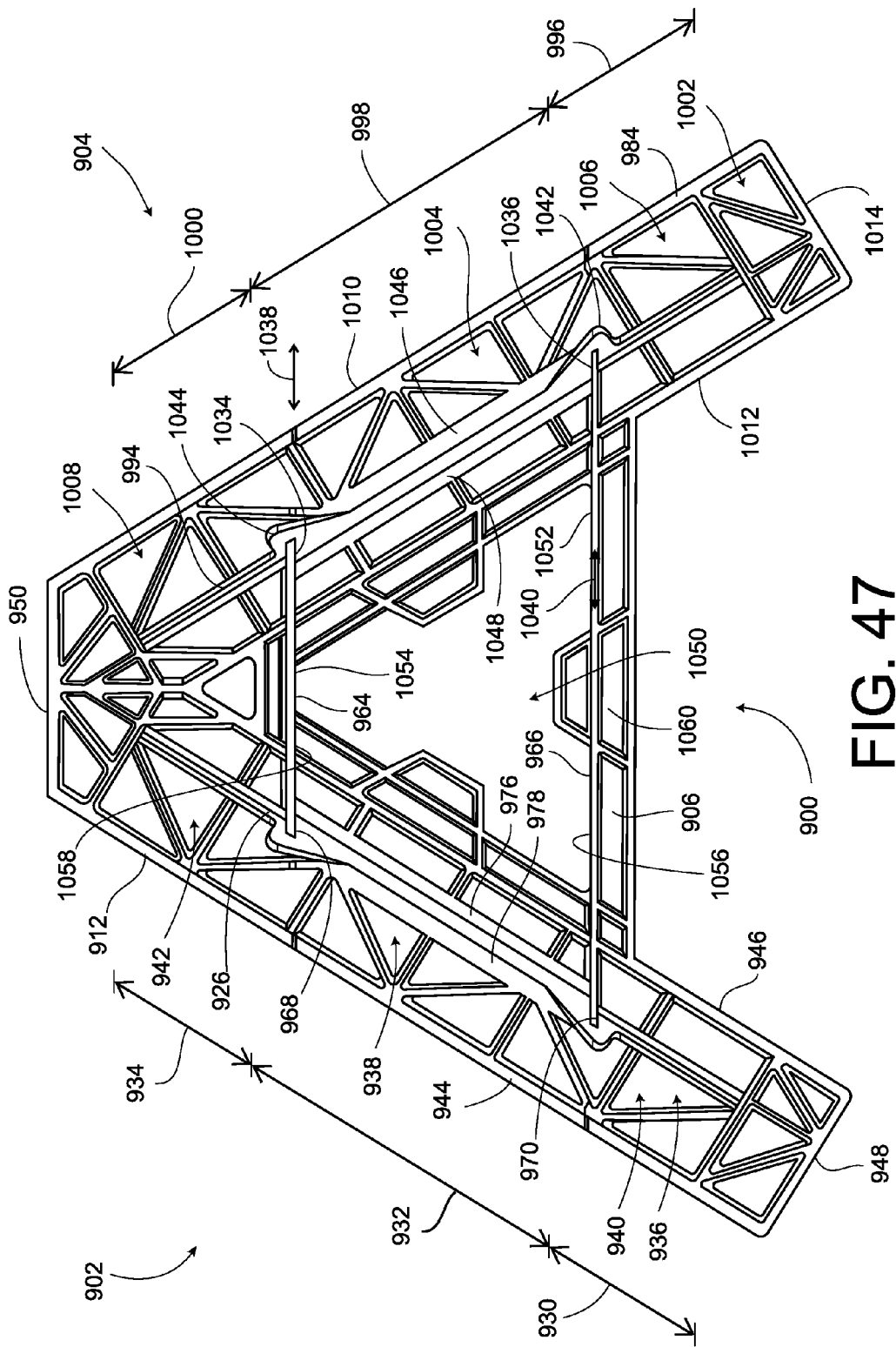
FIG. 47 shows a bottom plan view of the cutting guide of FIG. 44.

With reference to FIG. 47, the base 912 of the first guide structure 902 defines a first cavity 936 positioned below the cutting slot 926. The first cavity 936 includes a first workpiece space 938, a first cutting member start space 940 positioned on a first side of the first workpiece space, and a first cutting member end space 942 positioned on an opposite second side of the first workpiece space. The first workpiece space 938 is positioned below the second slot portion 932 and receives a workpiece W to be cut by the saw assembly 100 during a cutting operation. The first cutting member start space 940 is positioned below the first slot portion 930 and is where the cutting wheel 300 is positioned at the beginning of the cutting operation. The first cutting member end space 942 is positioned below the third slot portion 934 and is where the cutting wheel 300 is positioned at the end of the cutting operation.

The base 912 of the first guide structure 902 includes a first sidewall 944, a second sidewall 946, an end wall 948, and a common end wall 950. The first sidewall 944 and the second sidewall 946 are positioned generally parallel to each other. The first end wall 948 extends between the first sidewall 944 and the second sidewall 946. The common end wall 950 is positioned at a guide end portion of the first guide structure 902 and extends between the first sidewall 944 and the second sidewall 946 and also the sidewalls of the guide structure 904.

Figure 46:
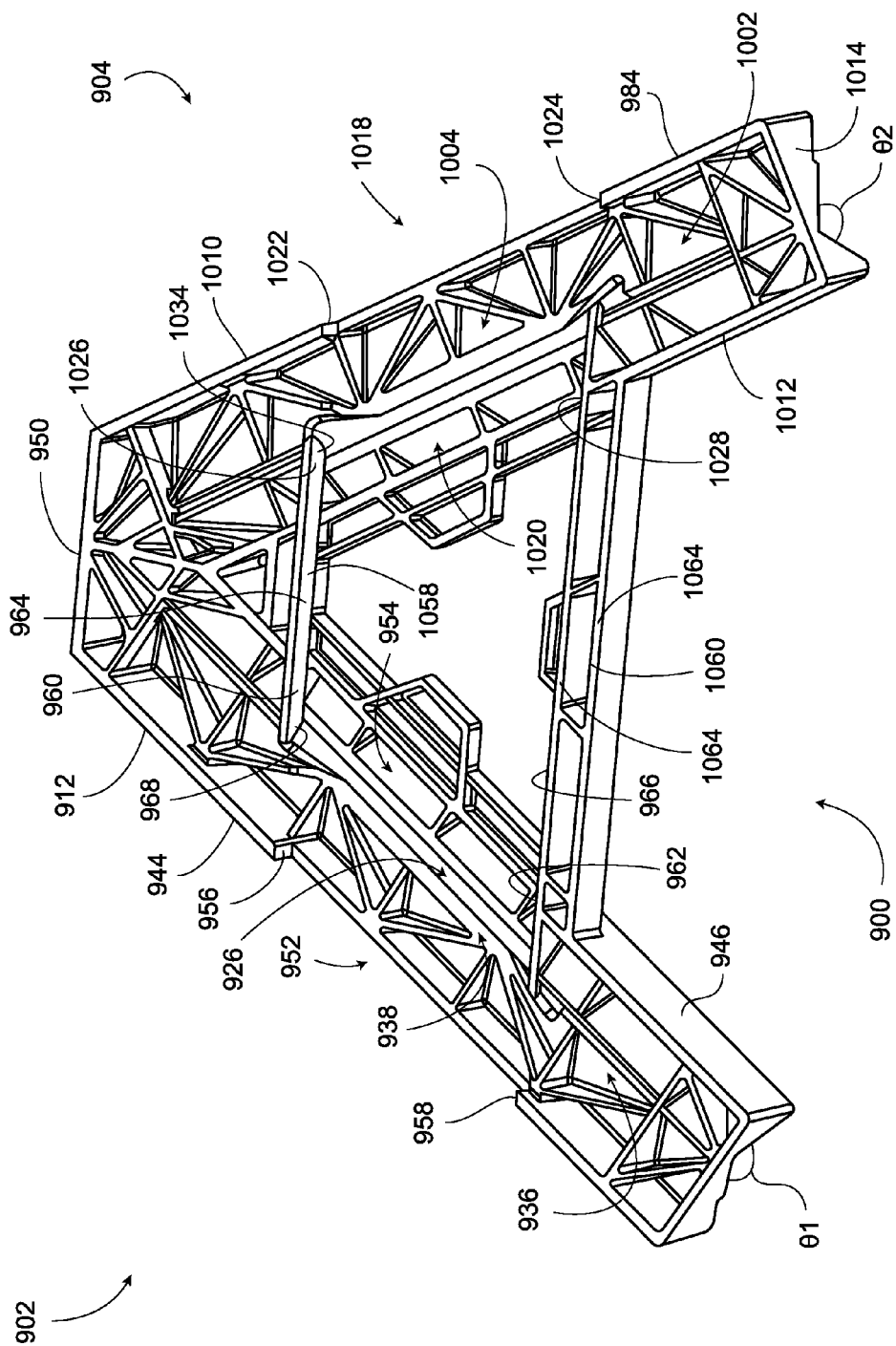
FIG. 46 shows a bottom perspective view of the cutting guide of FIG. 44.

As shown in FIG. 46, the base 912 of the first guide structure 902 defines the first workpiece space 938. The workpiece space 938 is defined by a first workpiece passage 952 and a second workpiece passage 954. The first workpiece passage 952 is formed in the first sidewall 944 and is defined by a first passage surface 956 that is spaced apart from a second passage surface 958. The second workpiece passage 954 is formed in the second sidewall 946 and is defined by a third passage surface 960 that is spaced apart from a fourth passage surface 962. The first workpiece passage 952 is spaced apart from the second workpiece passage 954 so as to define the first workpiece space 938 therebetween.

As shown in FIG. 47, the first guide structure 902 includes a first guide wall 964 and a second guide wall 966 to assist in positioning the cutting guide 900 on a workpiece W. The first guide wall 964 is positioned in the cavity 936 and defines a first guide surface portion 968. The second guide wall 966 is positioned in the cavity 936 and defines a second guide surface portion 970. The first guide surface portion 968 and the second guide surface portion 970 are positioned under the cutting slot 926.

As shown in FIG. 45, the first saw support 908 defines a first cutout 972 and a second cutout 974 in the first saw contact surface 914. The first cutout 972 and the second cutout 974 are each contiguous with the cutting slot 926. The guide surface portion 968 is positioned under the first cutout 974 so that visualization of the first guide surface portion is enhanced. The guide surface portion 970 is positioned under the second cutout 972 so that visualization of the second guide surface portion is enhanced.

With reference to FIG. 47, the first guide structure 902 also defines a first workpiece contact surface 976 and a second workpiece contact surface 978. The first workpiece contact surface 976 is an underside portion of the saw support 910 that is generally parallel to the cutting slot 926. The second workpiece contact surface 978 is an underside portion of the saw support 908 that is generally parallel to the cutting slot 926. The workpiece contact surface 976 and the workpiece contact surface 978 are positioned in the cavity 936.

The guide structure 904 is substantially identical to the guide structure 902. However, for completeness the guide structure 904 is described in detail. The guide structure 904 includes a saw support 980 and a saw support 982, both of which are attached to a base 984. The first saw support 980 defines a first saw contact surface 986, a first step structure 988, and a second step structure 990.

The second saw support 982 of the guide structure 904 defines a second saw contact surface 992. The plane defined by the first saw contact surface 986 intersects the plane defined by the second saw contact surface 992 to define an angle of intersection Θ2 having a magnitude of ninety degrees (90°). In other embodiments, the angle of intersection Θ2 has a magnitude greater than eighty degrees (80°) and less than one hundred degrees (100°).

The second saw contact surface 992 is spaced apart from the first saw contact surface 986 so as to define a cutting slot 994 therebetween. The cutting slot 994 is oriented along a slot axis 995 and includes a first slot portion 996, a second slot portion 998, and a third slot portion 1000. The slot axis 995 and the slot axis 928 intersect at an acute angle Θ (FIG. 44). The acute angle Θ has a magnitude that is greater than forty five degrees (45°) and less than seventy five degrees (75°).

As shown in FIGS. 46 and 47, the base 984 of the guide structure 904 defines a cavity 1002 positioned below the cutting slot 994. The cavity 1002 includes a workpiece space 1004, a cutting member start space 1006 positioned on a first side of the first workpiece space 1004, and a first cutting member end space 1008 positioned on an opposite second side of the first workpiece space 1004. The first workpiece space 1004 is positioned below the second slot portion 998 and receives a workpiece W to be cut by the saw assembly 100 during a cutting operation. The first cutting member start space 1006 is positioned below the first slot portion 996 and is where the cutting wheel 300 is positioned at the beginning of the cutting operation. The first cutting member end space 1008 is positioned below the third slot space 1000 and is where the cutting wheel 300 is positioned at the end of the cutting operation.

The base 984 of guide structure 904 includes first sidewall 1010, a second sidewall 1012, and end wall 1014, and the common sidewall/end wall 950. The first sidewall 1010 and the second sidewall 1012 are positioned generally parallel to each other. The first end wall 1014 extends between the first sidewall 1010 and the second sidewall 1012. The common end wall 950 is positioned at a guide end portion of the first guide structure 902 and extends between the first sidewall 1010, the second sidewall 1012, and the also the sidewalls 944, 946 of the other guide structure 902.

As shown in FIG. 46, the base 984 of the guide structure 904 defines the workpiece space 1004. The workpiece space 1004 is defined by a first workpiece passage 1018 and a second workpiece passage 1020. The first workpiece passage 1018 is formed in the first sidewall 1010 and is defined by a first passage surface 1022 that is spaced apart from a second passage surface 1024. The second workpiece passage 1020 is formed in the second sidewall 1012 and is defined by a third passage surface 1026 that is spaced apart from a fourth passage surface 1028. The first workpiece passage 1018 is spaced apart from the second workpiece passage 1020 so as to define the workpiece space 1004 therebetween.

The guide structure 904 includes the guide wall 964 and the guide wall 966 to assist in positioning the cutting guide 900 on a workpiece. The first guide wall 964 is positioned in the cavity 1002 and defines a first guide surface portion 1034. The first guide surface portion 1034 is positioned under the cutting slot 994. The passage surface 956, the passage surface 1022, the guide surface portion 968, and the guide surface portion 1034 lie in a plane 1038. The second guide wall 966 is positioned in the cavity 1002 and defines a second guide surface portion 1036. The second guide surface portion 1036 is positioned under the cutting slot 994. The passage surface 958, the passage surface 1024, the guide surface portion 970, and the guide surface portion 1036 all lie in a second plane 1040 that is parallel to the plane 1038.

The saw support 980 defines a cutout 1042 and a cutout 1044 in the first saw contact surface 986. The cutout 1042 and the cutout 1044 are each contiguous with the cutting slot 994. The guide surface portion 1036 is positioned under the cutout 1042 so that visualization of the guide surface portion 1036 is enhanced. The guide surface portion 1034 is positioned under the cutout 1044 so that visualization of the guide surface portion 1034 is enhanced.

The guide structure 904 also defines a first workpiece contact surface 1046 and a second workpiece contact surface 1048. The first workpiece contact surface 1046 is an underside portion of the saw support 980 that is generally parallel to the cutting slot 994. The second workpiece contact surface 1048 is an underside portion of the saw support 982 that is generally parallel to the cutting slot 994. The workpiece contact surface 1046 and the workpiece contact surface 1048 are positioned in the cavity 1002.

The intermediate part 906 is positioned between first guide structure 902 and the second guide structure 904. The intermediate part 906 is connected to the sidewall 946 and the sidewall 1012 and fixes the position of the guide structure 902 relative to the guide structure 904. An interguide space 1050 is defined below the intermediate part 906. Since the guide structure 902 is spaced apart from the guide structure 904 a space exists therebetween and is referred to as the interguide space 1050.

The intermediate part 906 includes a first abutment structure 1052 and a second abutment structure 1054. The first abutment structure 1052 is located in the cavity 1002, the interguide space 1050, and the cavity 936. Accordingly, the abutment structure 1052 is positioned under both the cutting slot 926 and the cutting slot 994. The abutment structure 1052 defines an abutment surface 1056 against which a workpiece is positioned during cutting operations. The abutment structure 1052 includes the guide wall portion 970 and the guide wall portion 1036. The passage surface 958, the passage surface 1024, and the abutment surface 1056 lie in the plane 1040.

The abutment structure 1054 is located in the cavity 936, the interguide space 1050, and the cavity 1002. Accordingly, the abutment structure 1054 is positioned under both the cutting slot 926 and the cutting slot 994. The abutment structure 1054 defines an abutment surface 1058 against which a workpiece is positioned during cutting operations. The abutment structure 1054 includes the guide wall portion 968 and the guide wall portion 1034. The passage surface 956, the passage surface 1022, and the abutment surface 1058 lie in the plane 1038.

The intermediate part 906 further includes a clamp structure 1060 including a flat clamp surface 1062 and numerous support ribs 1064 The clamp structure 1060 receives a clamping force, which connects the cutting guide 900 to the workpiece. The support ribs 1064 increase the structural integrity of the cutting guide 900 so that it is not deformed or otherwise damaged as a result of the clamping force.

In operation, the cutting guide 900 is used to guide the cutting wheel 300 of the saw assembly 100 through a workpiece. Specifically, the cutting guide 900 is used to make a compound miter cut in a workpiece. A compound miter cut is a cut that is beveled and mitered. These type of cuts are frequency performed when cutting sections of crown molding to be joined at an inside or an outside corner of the room.

To make a cut with the cutting guide 900 the workpiece is positioned in one or more of the workpiece space 938 and the workpiece space 1004. An edge of the workpiece is positioned against one or more of the abutment surface 1056 and the abutment surface 1058. The cutting guide 900 is moved along the workpiece until the desired line of cut is aligned with the one of the guide surface portions 968, 970, 1034, 1036 which are visible through the cutouts 972, 974, 1042, 1044. Depending on the desired cutting orientation a face of the workpiece may be positioned against or away from the workpiece contact surfaces 976, 978, 1046, 1048. Also, the saw assembly 100 should be equipped with the flush cutting wheel 300 when being used with the cutting guide 900. After the cutting guide 900 has been aligned, a cutting operation is performed in same manner as is performed with the bevel guide structure 782 described above.

Figure 48:
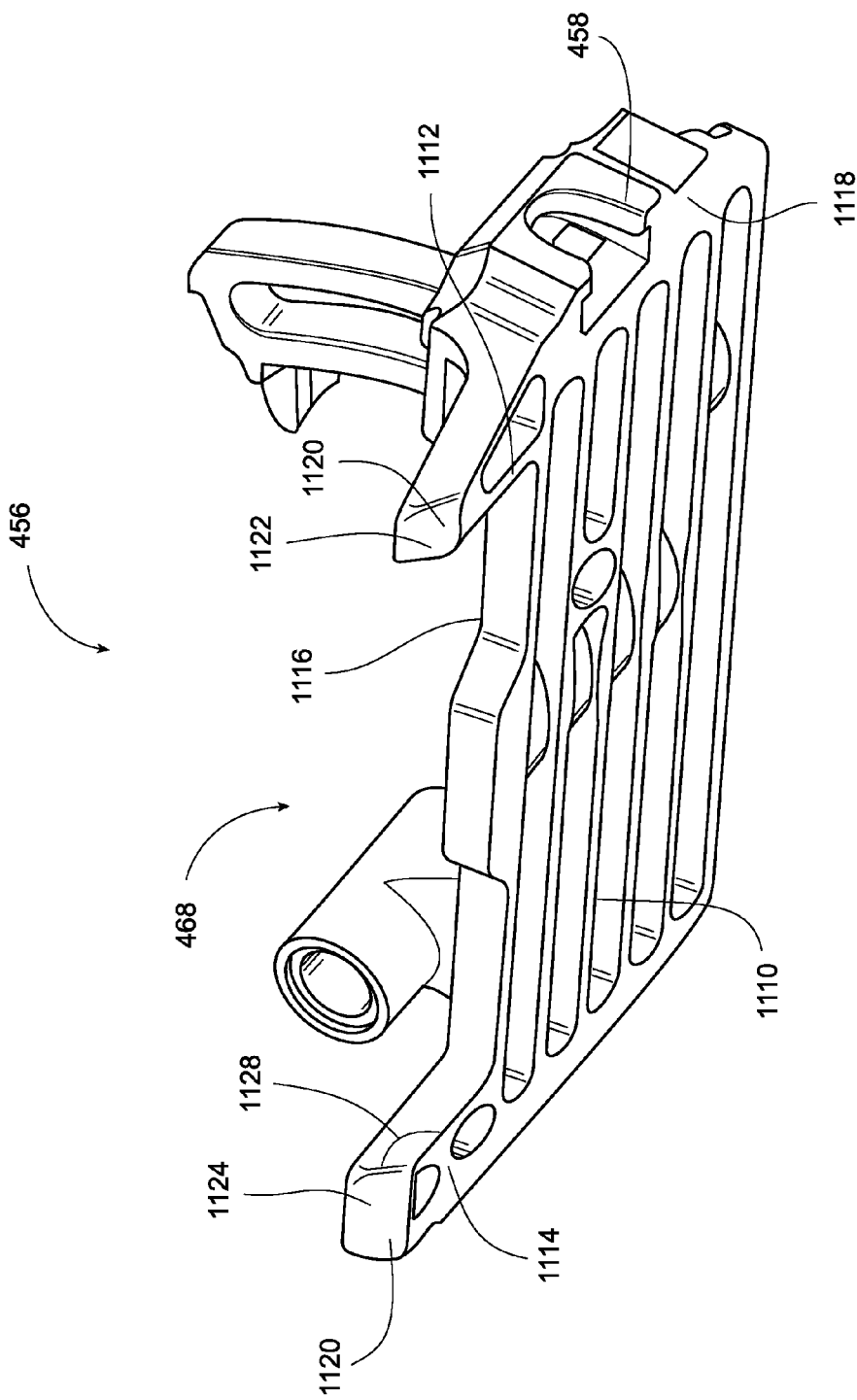
FIG. 48 shows a bottom perspective view of the foot of the saw assembly of FIG. 1 in isolation.
Figure 49:
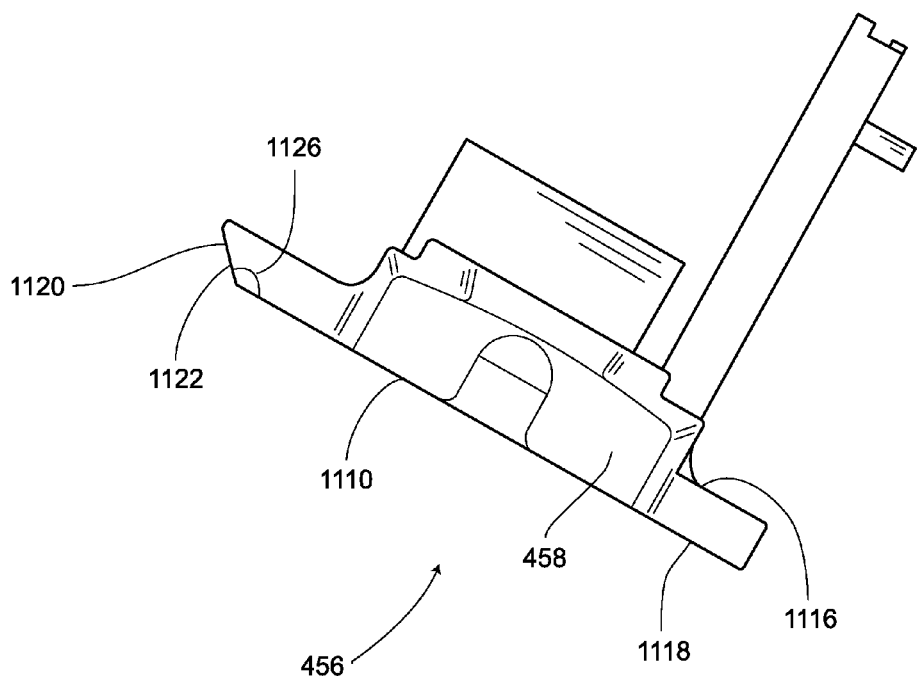
FIG. 49 shows a rear perspective view of the foot of the saw assembly of FIG. 1 in isolation.

Features of the Foot Related to Miter Cutting Guide and Crown Molding Cutting Guide The foot 456 of the saw assembly 100 is suited for operation with the miter cutting guide 780 and the crown molding cutting guide 900. As shown in FIGS. 48 and 49, the base 458 of the foot 456 includes a main portion 1110, a first cantilevered portion 1112, and a second cantilevered portion 1114. The main portion 1110 includes an upper base surface 1116, a lower base surface 1118, and a lateral sidewall surface 1120. The lower base surface 1118 is positioned against the saw contact surface 792 during cutting operations in which the cutting guide 780 is used. The lateral sidewall 1120 surface extends between the lower base surface 1118 and the upper base surface 1116.

The first cantilevered portion 1112 extends laterally from the main portion 1110 and terminates to define a leading surface 1122 of the lateral sidewall surface 1120. The leading surface 1122 is beveled with respect to the lower base surface 1118. The second cantilevered portion 1114 also extends laterally from the main portion 1110 and terminates to define a trailing surface 1124 of the lateral sidewall surface 1120. The trailing surface 1124 is also beveled with respect to the lower base surface 1118. The first cantilevered portion 1112 and the second cantilevered portion 1114 are spaced apart from each other to define the cutting member opening or cutting wheel passage 468.

As shown in FIG. 49, when the base 458 is viewed in a cross section the leading surface 1122 and the lower base surface 1118 define an angle 1126 of approximately one hundred thirty five degrees (135°). Similarly, when the base 458 is viewed in cross section the trailing surface 1124 and the lower base surface 1118 define an angle 1128 of approximately one hundred thirty five degrees (135°). In another embodiment of the foot 456, the angle defined by the leading surface 1122 and lower base surface 1118 and the angle defined by the trailing surface 1124 and the lower base surface 1118 may be greater than one hundred twenty degrees) (120°) and less than one hundred fifty degrees (150°).

Figure 50:
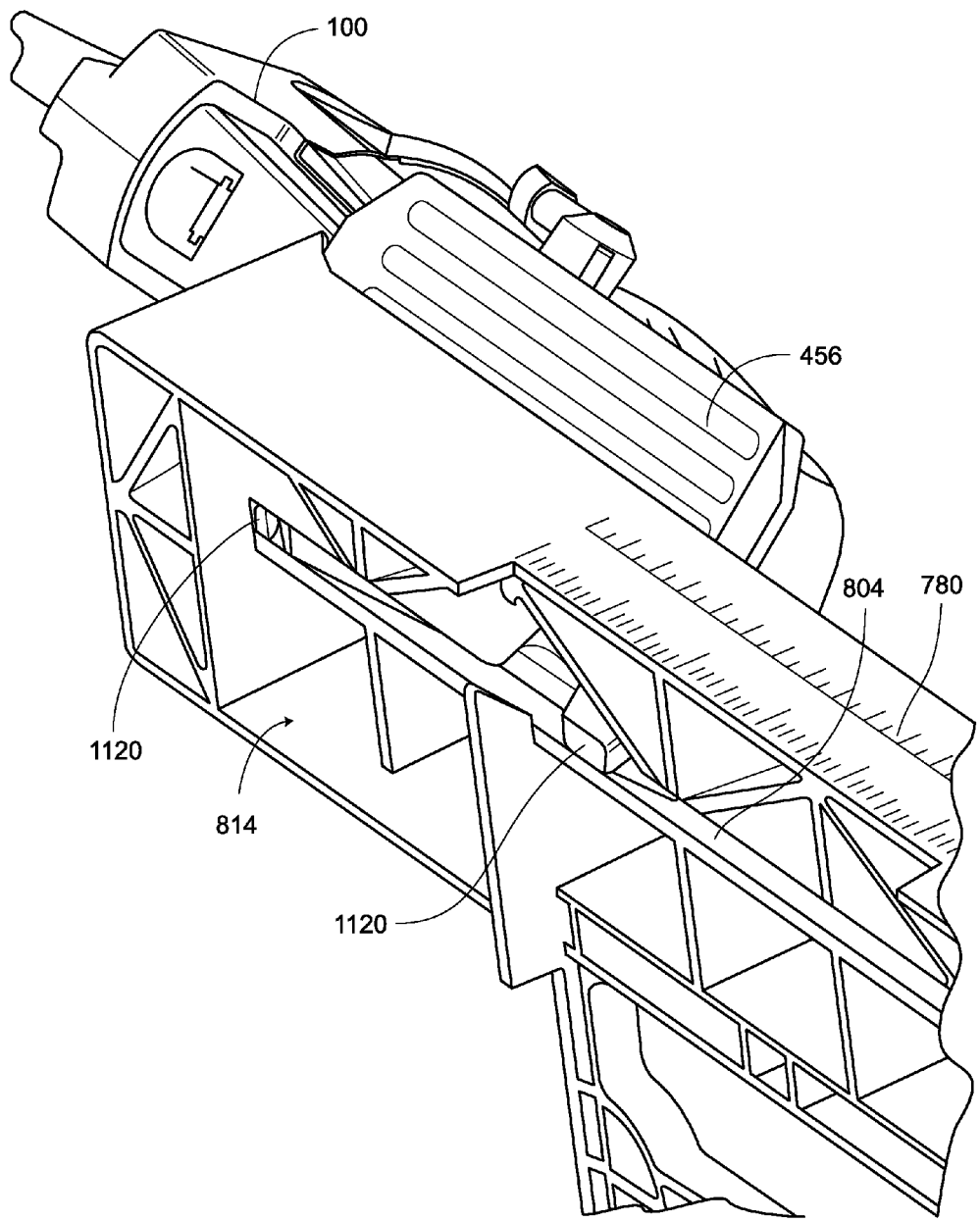
FIG. 50 is a bottom perspective view of the saw assembly of FIG. 1 and the cutting guide of FIG. 39.

As shown in FIG. 50, the above-described structure of the foot 456 prevents any portion of the foot from extending below the cutting slot 804 during cutting operations in which the cutting guide 780 and the cutting guide 900 are utilized. If the foot 456 were to extend below the cutting slot 804 and into the cavity 814, the foot would abut the workpiece W as the user attempts to slide the saw assembly 100 toward workpiece, thereby preventing cutting of the workpiece. Accordingly, the foot 456 enables the flush cutting wheel 300 to extend through the cutting slot 804, while preventing the base 458 from extending through the cutting slot (i.e. the base is spaced apart from the cutting slot) when the lower base surface 1118 is positioned in contact with the saw contact surface 792 (FIG. 39) and the flange 428 is positioned in contact with the saw contact surface 802 (FIG. 39).

Additionally, as described above with respect to the guard assembly 422, the beveled surface 450 of the guard ensures that the guard is spaced apart from the cutting slot 804 and ensures that no portion of the guard assembly 422 extends through the cutting slot where it could abut the workpiece and interfere with a cutting operation.

Deburring Accessory

Figure 53:
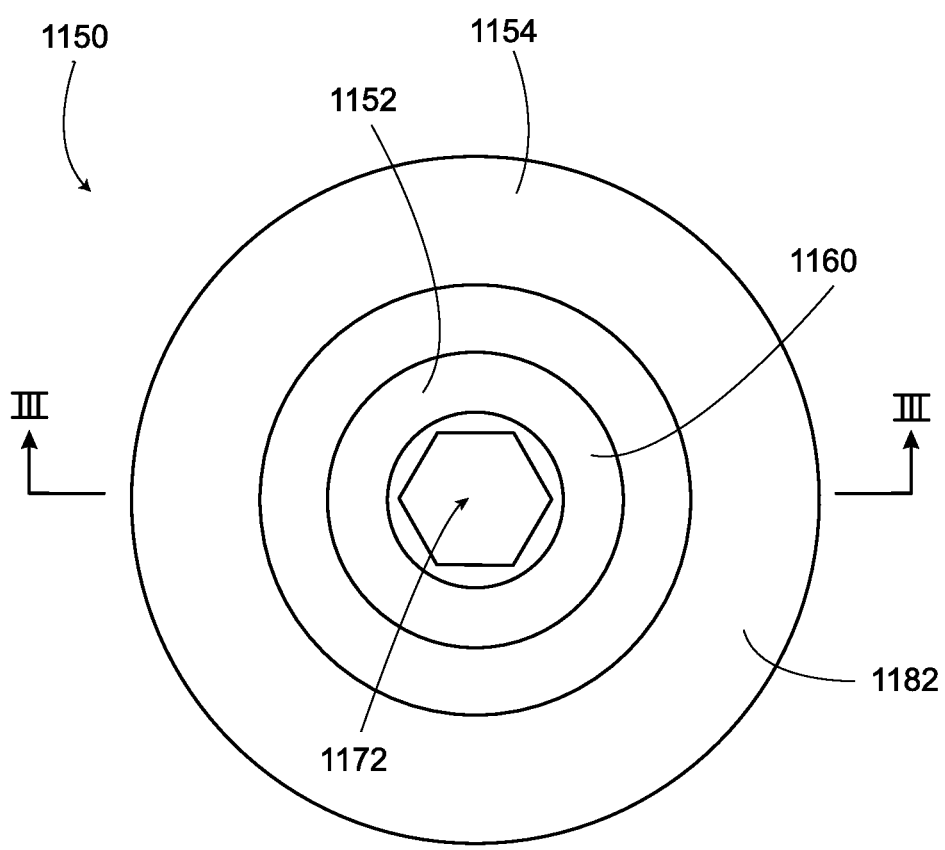
FIG. 53 is a top plan view of the deburring accessory of FIG. 51.
Figure 54:
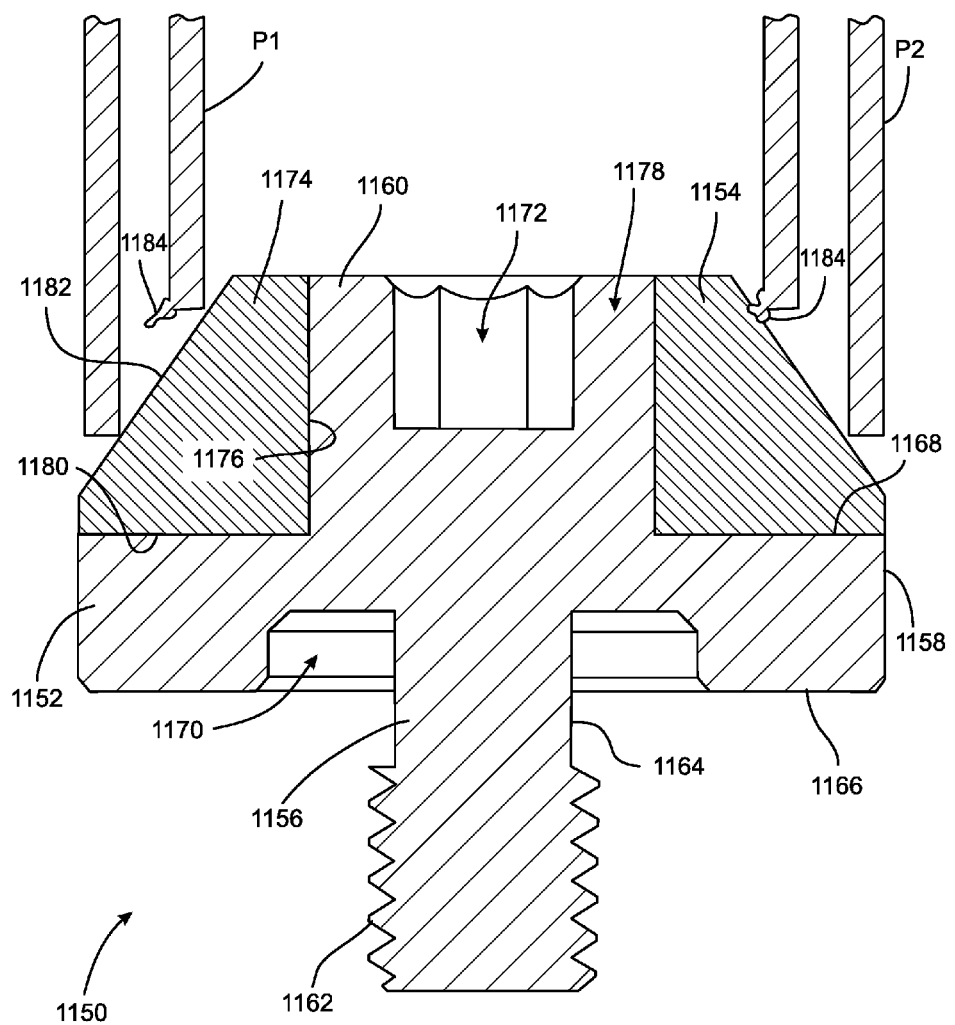
FIG. 54 is a cross sectional view taken along the line III-III of FIG. 53 showing the deburring accessory positioned to deburr a first pipe and a second pipe.

As shown in FIGS. 51 to 54, the saw assembly 100 is includes a fastener assembly or a deburring accessory 1150. The deburring accessory 1150 includes a fastener structure or support structure 1152 and an abrasive member or abrasive element 1154. As shown in FIG. 54, the support structure 1152 includes a post or a shaft 1156, a platform or a shoulder 1158, and a drive portion or a head 1160. The support structure 1152 is formed from metal. In another embodiment of the deburring accessory 1150, the support structure 1152 is formed from hard plastic.

The shaft 1156 includes a threaded portion 1162 and an unthreaded portion 1164. The threaded portion 1162 includes a set of external threads sized to be threadingly received by the opening 1167 (FIG. 37) in the driveshaft 260 of the arbor assembly 148 to connect the deburring accessory 1150 to the saw assembly 100. The unthreaded portion 1164 extends from the threaded portion 1162.

The shoulder 1158 extends from the unthreaded portion 1164 and from the head 1160. The shoulder 1158 includes a lower clamping surface or a lower seat 1166 that is positioned against the cutting wheel 296, an upper support surface or an upper seat 1168 that supports the abrasive element 1154, and a washer recess 1170. The shoulder 1158 defines a generally circular periphery and has a diameter of approximately twenty one millimeters (21 mm). The upper seat 1168 extends from the head 1160 for approximately six millimeters (6.0 mm). The washer recess 1170 is defined in the shoulder 1158 and is located adjacent to the lower seat 1166. The washer recess 1170 extends around the shaft 1156.

As shown in FIG. 53, the head 1160 extends from the shoulder 1158 and the unthreaded portion 1164. The head 1160 defines a generally circular periphery and has a diameter of approximately nine millimeters (9.0 mm). The head 1160 defines a tool opening or a recess 1172 having a drive surface. The recess 1172 is polygonal-shaped and is configured to receive a fastening tool, such as a hex key (not shown).

The abrasive element 1154 is connected to the head 1160 and the shoulder 1158. The abrasive element 1154 includes a grinding stone 1174 defining an interior surface 1176 and a central passage 1178, a lower surface 1180, and an exterior side surface having a tapered exterior surface portion 1182. The abrasive element 1154 is secured to the support structure 1152 so that the head 1160 is located within the central passage 1178. In particular, the interior surface 1176 is secured to an exterior side surface of the drive portion and the lower surface 1180 is secured to the upper seat 1168.

Figure 51:
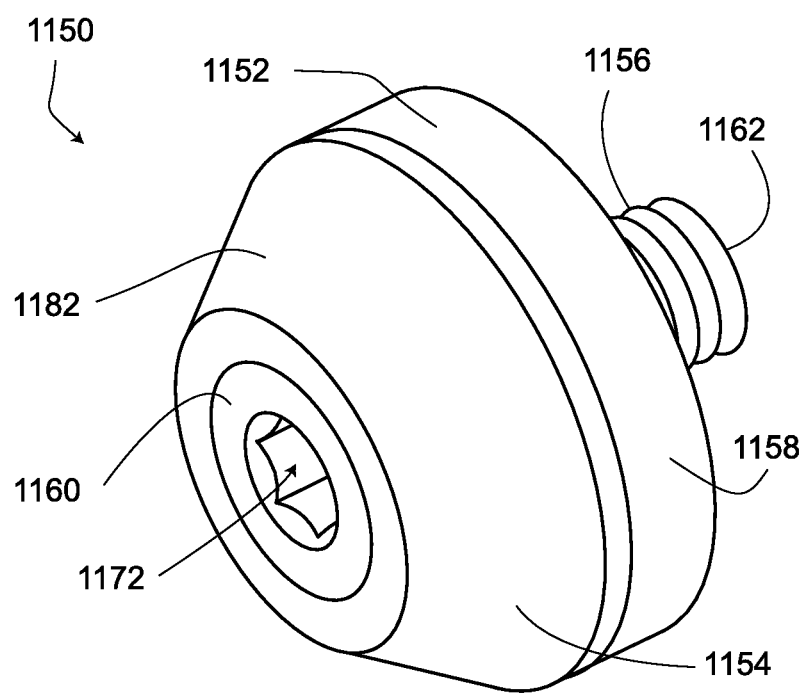
FIG. 51 is a perspective view of a deburring accessory for use with the saw assembly of FIG. 1.
Figure 52:
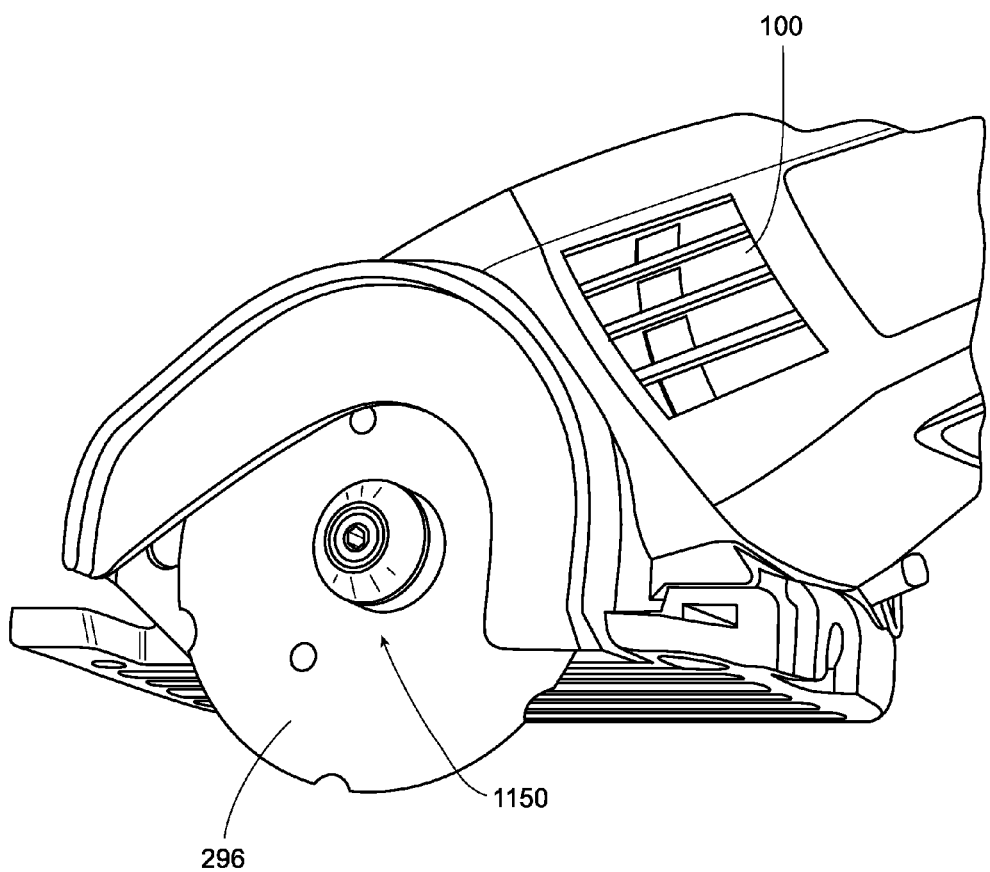
FIG. 52 is a perspective view of the deburring accessory of FIG. 51 connected to the power saw of FIG. 1.

As shown in FIG. 51, the tapered exterior surface 1182 is a generally conical deburring surface. At the bottom of the deburring surface (nearest the shoulder 1158) the abrasive element has a width of approximately twenty one millimeters (21 mm). At the top of the deburring surface (positioned furthest from the shoulder 1158) the abrasive element 1157 has a width of approximately thirteen millimeters (13.0 mm).

The grinding stone 1174 of the abrasive element is formed from aluminum oxide. Specifically, the abrasive element may be provided as the aluminum oxide as provided in the Dremel 952 Aluminum Oxide Grinding Stone manufactured by the Robert Bosch Tool Corporation. In an alternative embodiment of the deburring accessory 1150, the abrasive element 1154 is formed from silicon carbide, such as the silicon carbide as provided in the Dremel 84922 Silicon Carbide Grinding Stone manufactured by the Robert Bosch Tool Corporation. In yet another alternative embodiment of the deburring accessory 1150 the abrasive element 1154 is formed from industrial diamonds, any alumina-based abrasive, cubic boron nitride ("CBN"), and the like.

The deburring accessory 1150 is used to secure the cutting wheel 296 to the saw assembly 100 in place of the arbor bolt 284 (FIG. 1) and the washer 292 (FIG. 1). The threaded portion 1162 is threaded into the opening 1167 in the driveshaft 260. When the deburring accessory 1150 is tightened onto the driveshaft 260, the cutting wheel 296 is clamped between the lower surface 1180 and the spacer 288 (FIG. 1) for rotation with the driveshaft.

After securing the deburring accessory 1150 and the cutting wheel 296 to the driveshaft 260, the saw assembly is used to perform a cutting operation on a pipe or other tubular structure. As a result of the cutting operation a burr 1184 (FIG. 54) is formed on the cut edge of the pipe.

After performing the cutting operating, the deburring accessory 1150 is used to remove the burr 1184 without requiring any changes or configuration of the saw assembly 100. The abrasive element 1154 of the deburring accessory 1150 is used to smooth the cut edge of a pipe, tube, or conduit that has been cut by the cutting wheel 296. Specifically, the abrasive element 1154 is used to remove the burr or ridge formed on the cut end of the pipe after the pipe is cut with the cutting wheel. To use the abrasive element 1154, the rotating conical deburring surface 1182 is urged against the burr or ridge to wear away the bun or ridge.

As shown in FIG. 54, the conical shape of the abrasive element 1154 uniformly removes the bun or ridge from the inside edge of the pipe P1, P2. The conical deburring surface 1182 is positionable against the inside edge of a pipe having an inside diameter that is greater than the diameter of the top of the deburring surface and that is less than the diameter of the bottom of the deburring surface. The pipe P1 has an inside diameter of approximately one half inch (0.5 in), and the pipe P2 has an inside diameter of approximately the three quarters of one inch (0.75 in). The abrasive element 1154 uniformly removes the burr 1184 or ridge since the conical deburring surface 1182 contacts most or all of the inside edge of the pipe at the same time.

In addition to being usable with the saw assembly 100, the deburring accessory 1150 is also usable with other saw assemblies, grinders, and power cutting tools. For example, the deburring accessory 1150 is usable with circular saws and grinders that are typically used to cut metal pipe/conduit. Additionally, the deburring accessory 1150 is usable with, for example, portable band saws, which are typically used to cut metal pipe/conduit.

In another embodiment of the deburring accessory 1150, the head 1160 and the shaft 1156 are connected together and are separate from the shoulder 1158 and the abrasive member 1154. In this embodiment, the head 1160 and the shaft 1156 are provided as a separate bolt (not shown) that is similar to the arbor bolt 284 (FIG. 1). The shoulder 1158 defines an opening having a diameter larger than a diameter of the shaft 1156, but smaller than the diameter/width of the head 1160 so that the head is positioned against the shoulder when the deburring accessory 1150 is connected to the saw assembly 100.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A drivetrain for a saw assembly, comprising:
   a housing defining an interior space;
   a motor positioned in said housing and having a motor shaft, said motor being configured to rotate said motor shaft about a first axis;
   a worm gear positioned in said housing and having a worm gear shaft, wherein rotation of said motor shaft causes rotation of said worm gear shaft;
   a drive member operatively coupled to said worm gear, wherein rotation of said worm gear shaft causes movement of said drive member in a repeating pattern;
   wherein said worm gear shaft includes a bore structure defining a blind bore and an opening leading to said blind bore,
   wherein said bore structure defines a set of internal threads that are spaced apart from said opening,
   wherein said motor shaft includes a set of external threads, and
   wherein said set of external threads are located within said blind bore and meshingly engaged with said set of internal threads so as to couple said worm gear shaft to said motor shaft.

2. The drivetrain of claim 1, wherein (i) said motor shaft includes a first motor shaft end portion and an opposite second motor shaft end portion, and (ii) said worm gear shaft includes a first worm gear shaft end portion and an opposite second worm gear shaft end portion, said opposite second worm gear shaft end portion including said bore structure, further comprising;
   a first bearing assembly supporting said first motor shaft end portion;
   a second bearing assembly supporting said second motor shaft end portion; and
   a third bearing assembly supporting said first worm gear shaft end portion.

3. The drivetrain of claim 2, wherein:
   said first bearing assembly is a first floating bearing assembly,
   said second bearing assembly is a second floating bearing assembly, and
   said third bearing assembly is a third floating bearing assembly.

4. The drivetrain of claim 1, wherein:
   said worm gear includes a first set of gear teeth,
   said drive member includes a second set of gear teeth, and
   said first set of gear teeth is meshingly engaged with said second set of gear teeth.

5. The drivetrain of claim 1, wherein rotation of said motor shaft causes rotation of said worm gear shaft about said first axis.

6. The drivetrain of claim 5, wherein:
   rotation of said worm gear shaft about said first axis causes rotation of said drive member about a second axis, and
   said first axis is not coincident with said second axis.

7. The drivetrain of claim 6, wherein:
   said first axis lies in a first plane, said second axis lies in a second plane, and
said first plane is perpendicular to said second plane.

8. The drivetrain of claim 1, wherein:
said motor shaft defines a shoulder, and
said opening of said bore structure is positioned adjacent to said shoulder.

9. The drivetrain of claim 1, wherein:
said motor shaft includes a motor shaft end portion that defines a motor shaft end, and
said set of external threads are (i) located on said motor shaft end portion, and (ii) juxtaposed to said motor shaft end.

10. A drivetrain for a saw assembly, comprising:
a housing defining an interior space;
a motor positioned in said housing and having a motor shaft, said motor being configured to rotate said motor shaft about a first axis;
a worm gear positioned in said housing and having a worm gear shaft, wherein rotation of said motor shaft causes rotation of said worm gear shaft;
a drive member operatively coupled to said worm gear, wherein rotation of said worm gear shaft causes movement of said drive member in a repeating pattern;
wherein one of said worm gear shaft and said motor shaft includes a bore structure defining a bore and an opening leading to said bore,
wherein said bore structure defines a set of internal threads that are spaced apart from said opening,
wherein the other of said worm gear shaft and said motor shaft includes a set of external threads, and
wherein said set of external threads are located within said bore and meshingly engaged with said set of internal threads so as to couple said worm gear shaft to said motor shaft.

11. The drivetrain of claim 10, wherein (i) said motor shaft includes a first motor shaft end portion and an opposite second motor shaft end portion, and (ii) said worm gear shaft includes a first worm gear shaft end portion and an opposite second worm gear shaft end portion, said opposite second worm gear shaft end portion including said bore structure, further comprising;
a first bearing assembly supporting said first motor shaft end portion;
a second bearing assembly supporting said second motor shaft end portion; and
a third bearing assembly supporting said first worm gear shaft end portion.

12. The drivetrain of claim 11, wherein:
said first bearing assembly is a first floating bearing assembly,
said second bearing assembly is a second floating bearing assembly, and
said third bearing assembly is a third floating bearing assembly.

13. The drivetrain of claim 10, wherein:
said worm gear includes a first set of gear teeth,
said drive member includes a second set of gear teeth, and
said first set of gear teeth is meshingly engaged with said second set of gear teeth.

14. The drivetrain of claim 10, wherein rotation of said motor shaft causes rotation of said worm gear shaft about said first axis.

15. The drivetrain of claim 14, wherein:
rotation of said worm gear shaft about said first axis causes rotation of said drive member about a second axis, and
said first axis is not coincident with said second axis.

16. The drivetrain of claim 15, wherein:
said first axis lies in a first plane,
said second axis lies in a second plane, and
said first plane is perpendicular to said second plane.

17. The drivetrain of claim 10, wherein:
said motor shaft defines a shoulder, and
said opening of said bore structure is positioned adjacent to said shoulder.

18. The drivetrain of claim 10, wherein:
said motor shaft includes a motor shaft end portion that defines a motor shaft end, and
said set of external threads are (i) located on said motor shaft end portion, and (ii) juxtaposed to said motor shaft end.

19. The drivetrain of claim 10, wherein:
wherein said worm gear shaft includes said bore structure, and
wherein said motor shaft includes said set of external threads.

* * * * *